United States Patent
Seino et al.

(10) Patent No.: US 12,465,049 B2
(45) Date of Patent: Nov. 11, 2025

(54) PEST CONTROL METHOD, AND PEST CONTROL AGENT COMPOSITION AND PEST CONTROL AGENT SET

(71) Applicant: Nippon Soda Co., Ltd., Tokyo (JP)

(72) Inventors: Hiroyuki Seino, Kanagawa (JP); Tomohiro Amano, Fukushima (JP)

(73) Assignee: Nippon Soda Co., Ltd., Tokyo (JP)

( * ) Notice: Subject to any disclaimer, the term of this patent is extended or adjusted under 35 U.S.C. 154(b) by 894 days.

(21) Appl. No.: 17/760,719

(22) PCT Filed: Sep. 15, 2020

(86) PCT No.: PCT/JP2020/034888
§ 371 (c)(1),
(2) Date: Mar. 15, 2022

(87) PCT Pub. No.: WO2021/054315
PCT Pub. Date: Mar. 25, 2021

(65) Prior Publication Data
US 2022/0338475 A1 Oct. 27, 2022

(30) Foreign Application Priority Data
Sep. 20, 2019 (JP) .................. 2019-172166

(51) Int. Cl.
| | | |
|---|---|---|
| A01N 37/32 | (2006.01) | |
| A01N 33/18 | (2006.01) | |
| A01N 47/34 | (2006.01) | |
| A01N 47/12 | (2006.01) | |
| A01P 7/04 | (2006.01) | |

(52) U.S. Cl.
CPC ............ *A01N 37/32* (2013.01); *A01N 33/18* (2013.01); *A01N 47/34* (2013.01); *A01N 47/12* (2013.01); *A01P 7/04* (2021.08)

(58) Field of Classification Search
CPC .................. A01N 37/32; A01N 33/18
See application file for complete search history.

(56) References Cited

U.S. PATENT DOCUMENTS
2013/0231479 A1 9/2013 Furukawa et al.
2017/0035711 A1 2/2017 Iwasa FOREIGN PATENT DOCUMENTS
| WO | WO-2012/050041 A1 | 4/2012 |
| WO | WO-2015/163280 A1 | 10/2015 |
| WO | WO-2016/013633 A1 | 1/2016 |
| WO | WO-2017/069154 A1 | 4/2017 |
| WO | WO-2019/198592 A1 | 10/2019 |

*Primary Examiner* — Shawquia Jackson
(74) *Attorney, Agent, or Firm* — Csaba Henter; Millen, White, Zelano & Branigan, P.C.

(57) ABSTRACT

It is to provide a method which does not have problem with safety and enables controlling various pests even at a low dosage, and a pest control agent composition and a pest control agent set which are suitable to be used for the method. At least one selected from a compound of formula (I) (wherein, $R^1$ represents a hydrogen atom, a substituted or unsubstituted C1-6 alkyl group, etc., $R^2$ represents a hydrogen atom or a C1-6 alkyl group, $R^1$ and $R^2$ optionally form a C2-6 alkylene group together, $R^3$ and $R^4$ each independently represent a hydrogen atom or a C1-6 alkyl group, $R^5$ represents a substituted or unsubstituted C1-6 alkyl group or a substituted or unsubstituted C2-6 alkynyl group, Y represents a C1-6 haloalkyl group, X represents a halogeno group, a C1-6 alkyl group, or the like) and a salt thereof is used with an insecticidal or acaricidal active component.

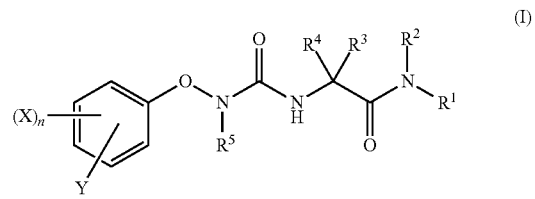

(I)

8 Claims, No Drawings

PEST CONTROL METHOD, AND PEST CONTROL AGENT COMPOSITION AND PEST CONTROL AGENT SET

TECHNICAL FIELD

The present invention relates to a pest controlling method, and a pest control agent composition and a pest control agent set. The present invention relates more specifically to a method which does not have a problem with safety and enables controlling various pests even at a low dosage, and a pest control agent composition and a pest control agent set which are suitable to be used for the method.

CROSS-REFERENCE TO RELATED APPLICATIONS

The present application is the U.S. National Stage of PCT/JP2020/034888, filed Sep. 15, 2020, which claims priority to Japan Patent Application No. 2019-172166, filed on Sep. 20, 2019, the contents of which are incorporated herein.

BACKGROUND ART

Patent Document 1 and Patent Document 3 disclose that urea compounds having specific structures are useful as acaricides. Patent Document 2 discloses that a urea compound having a specific structure is useful as an animal drug.

PRIOR ART DOCUMENTS

Patent Documents

Patent Document 1: International Publication No. WO 2012/050041A1

Patent Document 2: International Publication No. WO 2015/163280A1

Patent Document 3: International Publication No. WO 2016/013633A1

SUMMARY OF THE INVENTION

Object to be Solved by the Invention

An object of the present invention is to provide a method which does not have a problem with safety and enables controlling various pests even at a low dosage, and a pest control agent composition and a pest control agent set which are suitable to be used for the method.

Means to Solve the Object

The present inventors have investigated earnestly to achieve the above-mentioned object and consequently completed the present invention, which includes the following aspects.

That is, the present invention includes the following aspects.

[1]

A pest controlling method, comprising applying to a subject at least one selected from a compound of formula (I):

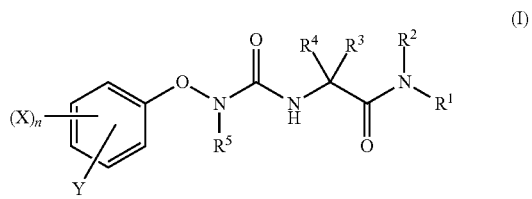

(wherein, in formula (I),
$R^1$ represents a hydrogen atom, a substituted or unsubstituted C1-6 alkyl group, a substituted or unsubstituted C2-6 alkenyl group, a substituted or unsubstituted C2-6 alkynyl group, a substituted or unsubstituted C3-8 cycloalkyl group, or a substituted or unsubstituted C6-10 aryl group,
$R^2$ represents a hydrogen atom or a C1-6 alkyl group,
$R^1$ and $R^2$ optionally form a C2-6 alkylene group together,
$R^3$ and $R^4$ each independently represent a hydrogen atom or a C1-6 alkyl group,
$R^5$ represents a substituted or unsubstituted C1-6 alkyl group or a substituted or unsubstituted C2-6 alkynyl group,
Y represents a C1-6 haloalkyl group,
X represents a halogeno group, a C1-6 alkyl group, or a C1-6 haloalkyl group, and
n represents a chemically acceptable number of X, and represents any integer of 0 to 4, and Xs are the same or different when n is 2 or more)
and a salt thereof, with an insecticidal or acaricidal active component.

[2]

The pest controlling method according to [1], wherein the insecticidal or acaricidal active component is an active ingredient of an insecticide or an acaricide having a mechanism of action classified according to the IRAC code.

[3]

The pest controlling method according to [1], wherein the insecticidal or acaricidal active component is at least one selected from the group consisting of
alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, chlordane, endosulfan, ethiprole, fipronil, flufiprole, acrinathrin, allethrin, d-cis-trans allethrin, d-trans allethrin, bifenthrin, bioallethrin, bioallethrin S-cyclopentenyl-isomer, bioresmethrin, cycloprothrin, cyfluthrin, β-cyfluthrin (beta-cyfluthrin), cyhalothrin, λ-cyhalothrin (lambda-cyhalothrin), γ-cyhalothrin (gamma-cyhalothrin), cypermethrin, α-cypermethrin (alpha-cypermethrin), β-cypermethrin (beta-cypermethrin), θ-cypermethrin (theta-cypermethrin), ξ-cypermethrin (zeta-cypermethrin), cyphenothrin[(1R)-trans-isomers], deltamethrin, empenthrin[(EZ)-(1R)-isomers], esfenvalerate, etofenprox, fenpropathrin, fenvalerate, flucythrinate, flumethrin, z-fluvalinate (tau-fluvalinate), halfenprox, imiprothrin, kadethrin, permethrin, phenothrin[(1R)-trans-isomer], prallethrin, pyrethrins, resmethrin, silafluofen, tefluthrin, tetramethrin, tetramethrin[(1R)-isomers], tralomethrin, transfluthrin, κ-bifenthrin (kappa-bifenthrin), chloroprallethrin, heptafluthrin, meperfluthrin, ε-metofluthrin (epsilon-metofluthrin), momfluorothrin, ε-momfluorothrin (epsilon-momfluorothrin), κ-tefluthrin (kappa-tefluthrin), tetramethylfluthrin, bioethanomethrin, DDT, methoxychlor, acetamiprid, clothianidin, dinotefuran, imidacloprid, nitenpyram, thiacloprid, thiamethoxam, nicotine, sulfoxaflor, flupyradifurone, triflumezopyrim, dicloromezotiaz, flupyrimin, spinetoram, spinosad, abamectin, emamectin-benzoate, lepimectin, milbemectin, doramectin, eprinomectin, ivermectin, moxidectin, selamectin, hydroprene, kinoprene, methoprene, fenoxycarb, pyriproxifen, methyl bromide, alkyl halides, chloropicrin, sodium aluminum fluoride, sulfuryl fluoride, borax, boric acid, disodium octaborate, sodium borate, sodium metaborate, tartar emetic, dazomet, metam, pymetrozine, pyrifluquinazon, afidopyropen, clofentezine, diflovidazin, hexythiazox, etoxazole, *B. t.* subsp. *israelensis, B. t.* subsp. *aizawai, B. t.* subsp. *kurstaki, B. t.* subsp. *tenebrionis*, proteins contained in *B. t.* crops (*B. t.* crop proteins): Cry1Ab, Cry1Ac, Cry1Fa, Cry1A.105, Cry2Ab, Vip3A, mCry3A, Cry3Ab, Cry3Bb, and Cry34Ab1/Cry35Ab1, *Bacillus sphaericus*, diafenthiuron, azocyclotin, cyhexatin, fenbutatin-oxide, propargite, tetradifon, chlorfenapyr, DNOC (4,6-dinitro-o-cresol), sulfluramid, bensultap, cartap hydrochloride, thiocyclam, thiosultap-sodium, bistrifluron, chlorfluazuron, diflubenzuron, flucycloxuron, flufenoxuron, hexaflumuron, lufenuron, novaluron, noviflumuron, teflubenzuron, triflumuron, buprofezin, cyromazine, chromafenozide, halofenozid, methoxyfenozide, tebufenozide, amitraz, hydramethylnon, acequinocyl, fluacrypyrim, bifenazate, fenazaquin, fenpyroximate, pyridaben, pyrimidifen, tebufenpyrad, tolfenpyrad, rotenone, indoxacarb, metaflumizone, spirodiclofen, spiromesifen, spirotetramat, spiropidion, aluminum phosphide (Al-phosphide), calcium phosphide (Ca-phosphide), phosphine, zinc phosphide (Zn-phosphide), calcium cyanide (Ca-cyanide), sodium cyanide (Na-cyanide), potassium cyanide (K-cyanide), cyenopyrafen, cyflumetofen, pyflubumide, chlorantraniliprole, cyantraniliprole, cyclaniliprole, flubendiamide, cyhalodiamide, tetrachlorantraniliprole, tetraniliprole, flonicamid, broflanilide, fluxametamide, isocycloseram, afoxolaner, fluralaner, lotilaner, sarolaner, azadirachtin, benzoximate, bromopropylate, chinomethionat, dicofol, lime sulfur, mancozeb, pyridalyl, sulfur, acynonapyr, benzpyrimoxan, flometoquin, fluhexafon, oxazosulfyl, and tyclopyrazoflor.

[4]
The pest controlling method according to [1], wherein the insecticidal or acaricidal active component is at least one selected from the group consisting of a mite growth inhibitor, a glutamatergic chloride ion (chlorine ion) channel (GluCl) allosteric modulator, a mitochondrial electron transport system complex I inhibitor (METI), a nicotinic acetylcholine receptor (nAChR) competitive modulator, a mitochondrial ATP synthetase inhibitor, and a GABAergic chloride ion (chlorine ion) channel allosteric modulator.

[5]
The pest controlling method according to [1], wherein the insecticidal or acaricidal active component is at least one selected from the group consisting of hexythiazox, abamectin, fenpyroximate, acetamiprid, propargite, and acynonapyr.

[6]
The pest controlling method according to [1], wherein the compound of formula (I) is a compound of formula (II) or formula (III):

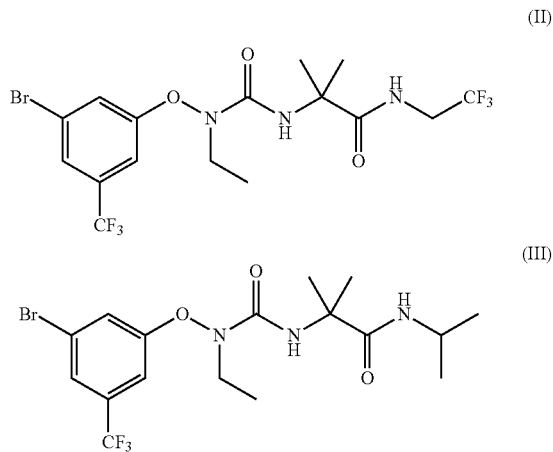

[7]
The pest controlling method according to any one of [1] to [6], wherein the pest is an insect or a mite.

[8]
A pest control agent composition, comprising: at least one selected from a compound of formula (I):

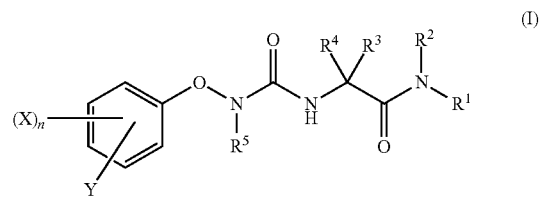

(wherein, in formula (I),
$R^1$ represents a hydrogen atom, a substituted or unsubstituted C1-6 alkyl group, a substituted or unsubstituted C2-6 alkenyl group, a substituted or unsubstituted C2-6 alkynyl group, a substituted or unsubstituted C3-8 cycloalkyl group, or a substituted or unsubstituted C6-10 aryl group,
$R^2$ represents a hydrogen atom or a C1-6 alkyl group,
$R^1$ and $R^2$ optionally form a C2-6 alkylene group together, R³ and R⁴ each independently represent a hydrogen atom or a C1-6 alkyl group, R⁵ represents a substituted or unsubstituted C1-6 alkyl group or a substituted or unsubstituted C2-6 alkynyl group, Y represents a C1-6 haloalkyl group, X represents a halogeno group, a C1-6 alkyl group, or a C1-6 haloalkyl group, and n represents a chemically acceptable number of X, and represents any integer of 0 to 4, and Xs are the same or different when n is 2 or more)

and a salt thereof; and an insecticidal or acaricidal active component.

[9]

The pest control agent composition according to [8], wherein the insecticidal or acaricidal active component is an active ingredient of an insecticide or an acaricide having a mechanism of action classified according to the IRAC code.

[10]

The pest control agent composition according to [8], wherein the insecticidal or acaricidal active component is at least one selected from the group consisting of alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, chlordane, endosulfan, ethiprole, fipronil, flufiprole, acrinathrin, allethrin, d-cis-trans allethrin, d-trans allethrin, bifenthrin, bioallethrin, bioallethrin S-cyclopentenyl-isomer, bioresmethrin, cycloprothrin, cyfluthrin, β-cyfluthrin (beta-cyfluthrin), cyhalothrin, λ-cyhalothrin (lambda-cyhalothrin), γ-cyhalothrin (gamma-cyhalothrin), cypermethrin, α-cypermethrin (alpha-cypermethrin), β-cypermethrin (beta-cypermethrin), θ-cypermethrin (theta-cypermethrin), ξ-cypermethrin (zeta-cypermethrin), cyphenothrin[(1R)-trans-isomers], deltamethrin, empenthrin[(EZ)-(1R)-isomers], esfenvalerate, etofenprox, fenpropathrin, fenvalerate, flucythrinate, flumethrin, z-fluvalinate (tau-fluvalinate), halfenprox, imiprothrin, kadethrin, permethrin, phenothrin[(1R)-trans-isomer], prallethrin, pyrethrins, resmethrin, silafluofen, tefluthrin, tetramethrin, tetramethrin[(1R)-isomers], tralomethrin, transfluthrin, κ-bifenthrin (kappa-bifenthrin), chloroprallethrin, heptafluthrin, meperfluthrin, ε-metofluthrin (epsilon-metofluthrin), momfluorothrin, s-momfluorothrin (epsilon-momfluorothrin), κ-tefluthrin (kappa-tefluthrin), tetramethylfluthrin, bioethanomethrin, DDT, methoxychlor, acetamiprid, clothianidin, dinotefuran, imidacloprid, nitenpyram, thiacloprid, thiamethoxam, nicotine, sulfoxaflor, flupyradifurone, triflumezopyrim, dicloromezotiaz, flupyrimin, spinetoram, spinosad, abamectin, emamectin-benzoate, lepimectin, milbemectin, doramectin, eprinomectin, ivermectin, moxidectin, selamectin, hydroprene, kinoprene, methoprene, fenoxycarb, pyriproxifen, methyl bromide, alkyl halides, chloropicrin, sodium aluminum fluoride, sulfuryl fluoride, borax, boric acid, disodium octaborate, sodium borate, sodium metaborate, tartar emetic, dazomet, metam, pymetrozine, pyrifluquinazon, afidopyropen, clofentezine, diflovidazin, hexythiazox, etoxazole, *B. t.* subsp. *israelensis*, *B. t.* subsp. *aizawai*, *B. t.* subsp. *kurstaki*, *B. t.* subsp. *tenebrionis*, proteins contained in *B. t.* crops (*B. t.* crop proteins): Cry1Ab, Cry1Ac, Cry1Fa, Cry1A.105, Cry2Ab, Vip3A, mCry3A, Cry3Ab, Cry3Bb, and Cry34Ab1/Cry35Ab1, *Bacillus sphaericus*, diafenthiuron, azocyclotin, cyhexatin, fenbutatin-oxide, propargite, tetradifon, chlorfenapyr, DNOC (4,6-dinitro-o-cresol), sulfluramid, bensultap, cartap hydrochloride, thiocyclam, thiosultap-sodium, bistrifluron, chlorfluazuron, diflubenzuron, flucycloxuron, flufenoxuron, hexaflumuron, lufenuron, novaluron, noviflumuron, teflubenzuron, triflumuron, buprofezin, cyromazine, chromafenozide, halofenozid, methoxyfenozide, tebufenozide, amitraz, hydramethylnon, acequinocyl, fluacrypyrim, bifenazate, fenazaquin, fenpyroximate, pyridaben, pyrimidifen, tebufenpyrad, tolfenpyrad, rotenone, indoxacarb, metaflumizone, spirodiclofen, spiromesifen, spirotetramat, spiropidion, aluminum phosphide (Al-phosphide), calcium phosphide (Ca-phosphide), phosphine, zinc phosphide (Zn-phosphide), calcium cyanide (Ca-cyanide), sodium cyanide (Na-cyanide), potassium cyanide (K-cyanide), cyenopyrafen, cyflumetofen, pyflubumide, chlorantraniliprole, cyantraniliprole, cyclaniliprole, flubendiamide, cyhalodiamide, tetrachlorantraniliprole, tetraniliprole, flonicamid, broflanilide, fluxametamide, isocycloseram, afoxolaner, fluralaner, lotilaner, sarolaner, azadirachtin, benzoximate, bromopropylate, chinomethionat, dicofol, lime sulfur, mancozeb, pyridalyl, sulfur, acynonapyr, benzpyrimoxan, flometoquin, fluhexafon, oxazosulfyl, and tyclopyrazoflor.

[11]

The pest control agent composition according to [8], wherein the insecticidal or acaricidal active component is at least one selected from the group consisting of a mite growth inhibitor, a glutamatergic chloride ion (chlorine ion) channel (GluCl) allosteric modulator, a mitochondrial electron transport system complex I inhibitor (METI), a nicotinic acetylcholine receptor (nAChR) competitive modulator, a mitochondrial ATP synthetase inhibitor, and a GABAergic chloride ion (chlorine ion) channel allosteric modulator.

[12]

The pest control agent composition according to [8], wherein the insecticidal or acaricidal active component is at least one selected from the group consisting of hexythiazox, abamectin, fenpyroximate, acetamiprid, propargite, and acynonapyr.

[13]

The pest control agent composition according to [8], wherein the compound of formula (I) is a compound of formula (II) or formula (III):

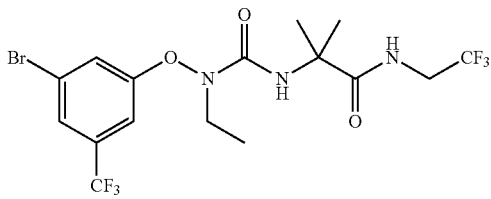

(II)

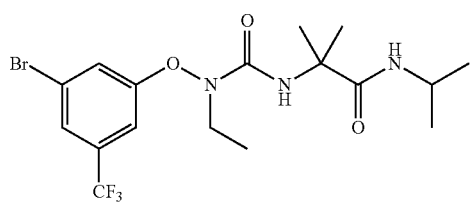

(III)

[14]
The pest control agent composition according to any one of [8] to [13], wherein the pest is an insect or mite.

[15]
A pest control agent set, wherein the pest control agent set is produced by gathering at least one selected from a compound of formula (I):

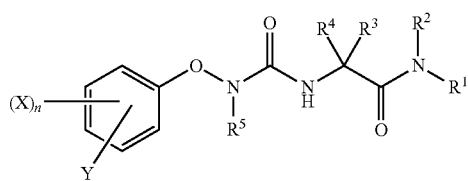

(I)

(wherein, in formula (I),
$R^1$ represents a hydrogen atom, a substituted or unsubstituted C1-6 alkyl group, a substituted or unsubstituted C2-6 alkenyl group, a substituted or unsubstituted C2-6 alkynyl group, a substituted or unsubstituted C3-8 cycloalkyl group, or a substituted or unsubstituted C6-10 aryl group,
$R^2$ represents a hydrogen atom or a C1-6 alkyl group,
$R^1$ and $R^2$ optionally form a C2-6 alkylene group together,
$R^3$ and $R^4$ each independently represent a hydrogen atom or a C1-6 alkyl group,
$R^5$ represents a substituted or unsubstituted C1-6 alkyl group or a substituted or unsubstituted C2-6 alkynyl group,
Y represents a C1-6 haloalkyl group,
X represents a halogeno group, a C1-6 alkyl group, or a C1-6 haloalkyl group, and
n represents a chemically acceptable number of X, and represents any integer of 0 to 4, and Xs are the same or different when n is 2 or more)
and a salt thereof, and a composition comprising an insecticidal or acaricidal active component, into one without mixing the compound and the composition.

The pest control agent set according to [15], wherein the insecticidal or acaricidal active component is an active ingredient of an insecticide or an acaricide having a mechanism of action classified according to the IRAC code.

[17]
The pest control agent set according to [15], wherein the insecticidal or acaricidal active component is at least one selected from the group consisting of
alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb, acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl 0-(methoxyaminothio-phosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, chlordane, endosulfan, ethiprole, fipronil, flufiprole, acrinathrin, allethrin, d-cis-trans allethrin, d-trans allethrin, bifenthrin, bioallethrin, bioallethrin S-cyclopentenyl-isomer, bioresmethrin, cycloprothrin, cyfluthrin, β-cyfluthrin (beta-cyfluthrin), cyhalothrin, λ-cyhalothrin (lambda-cyhalothrin), γ-cyhalothrin (gamma-cyhalothrin), cypermethrin, α-cypermethrin (alpha-cypermethrin), β-cypermethrin (beta-cypermethrin), θ-cypermethrin (theta-cypermethrin), ξ-cypermethrin (zeta-cypermethrin), cyphenothrin[(1R)-trans-isomers], deltamethrin, empenthrin[(EZ)-(1R)-isomers], esfenvalerate, etofenprox, fenpropathrin, fenvalerate, flucythrinate, flumethrin, z-fluvalinate (tau-fluvalinate), halfenprox, imiprothrin, kadethrin, permethrin, phenothrin [(1R)-trans-isomer], prallethrin, pyrethrins, resmethrin, silafluofen, tefluthrin, tetramethrin, tetramethrin[(1R)-isomers], tralomethrin, transfluthrin, κ-bifenthrin (kappa-bifenthrin), chloroprallethrin, heptafluthrin, meperfluthrin, ε-metofluthrin (epsilon-metofluthrin), momfluorothrin, ε-momfluorothrin (epsilon-momfluorothrin), κ-tefluthrin (kappa-tefluthrin), tetramethylfluthrin, bioethanomethrin, DDT, methoxychlor, acetamiprid, clothianidin, dinotefuran, imidacloprid, nitenpyram, thiacloprid, thiamethoxam, nicotine, sulfoxaflor, flupyradifurone, triflumezopyrim, dicloromezotiaz, flupyrimin, spinetoram, spinosad, abamectin, emamectin-benzoate, lepimectin, milbemectin, doramectin, eprinomectin, ivermectin, moxidectin, selamectin, hydroprene, kinoprene, methoprene, fenoxycarb, pyriproxifen, methyl bromide, alkyl halides, chloropicrin, sodium aluminum fluoride, sulfuryl fluoride, borax, boric acid, disodium octaborate, sodium borate, sodium metaborate, tartar emetic, dazomet, metam, pymetrozine, pyrifluquinazon, afidopyropen, clofentezine, diflovidazin, hexythiazox, etoxazole, B. t. subsp. israelensis, B. t. subsp. aizawai, B. t. subsp. kurstaki, B. t. subsp. tenebrionis, proteins contained in B. t. crops (B. t. crop proteins): Cry1Ab, Cry1Ac, Cry1Fa, Cry1A.105, Cry2Ab, Vip3A, mCry3A, Cry3Ab, Cry3Bb, and Cry34Ab1/Cry35Ab1, Bacillus sphaericus, diafenthiuron, azocyclotin, cyhexatin, fenbutatin-oxide, propargite, tetradifon, chlorfenapyr, DNOC (4,6-dinitro-o-cresol), sulfluramid, bensultap, cartap hydrochloride, thiocyclam, thiosultap-sodium, bistrifluron, chlorfluazuron, diflubenzuron, flucycloxuron, flufenoxuron, hexaflumuron, lufenuron, novaluron, noviflumuron, teflubenzuron, triflumuron, buprofezin, cyromazine, chromafenozide, halofenozid, methoxyfenozide, tebufenozide, amitraz, hydramethylnon, acequinocyl, fluacrypyrim, bifenazate, fenazaquin, fenpyroximate, pyridaben, pyrimidifen, tebufenpyrad, tolfenpyrad, rotenone, indoxacarb, metaflumizone, spirodiclofen, spiromesifen, spirotetramat, spiropidion, aluminum phosphide (Al-phosphide), calcium phosphide (Ca-phosphide), phosphine, zinc phosphide (Zn-phosphide), calcium cyanide (Ca-cyanide), sodium cyanide (Na-cyanide), potassium cyanide (K-cyanide), cyenopyrafen, cyflumetofen, pyflubumide, chlorantraniliprole, cyantraniliprole, cyclaniliprole, flubendiamide, cyhalodiamide, tetrachlorantraniliprole, tetraniliprole, flonicamid, broflanilide, fluxametamide, isocycloseram, afoxolaner, fluralaner, lotilaner, sarolaner, azadirachtin, benzoximate, bromopropylate, chinomethionat, dicofol, lime sulfur, mancozeb, pyridalyl, sulfur, acynonapyr, benzpyrimoxan, flometoquin, fluhexafon, oxazosulfyl, and tyclopyrazoflor.

[18]
The pest control agent set according to [15], wherein the insecticidal or acaricidal active component is at least one selected from the group consisting of a mite growth inhibitor, a glutamatergic chloride ion (chlorine ion) channel (GluCl) allosteric modulator, a mitochondrial electron transport system complex I inhibitor (METI), a nicotinic acetylcholine receptor (nAChR) competitive modulator, a mitochondrial ATP synthetase inhibitor, and a GABAergic chloride ion (chlorine ion) channel allosteric modulator.

[19]
The pest control agent set according to [15], wherein the insecticidal or acaricidal active component is at least one selected from the group consisting of hexythiazox, abamectin, fenpyroximate, acetamiprid, propargite, and acynonapyr.

[20]
The pest control agent set according to [15], wherein the compound of formula (I) is a compound of formula (II) or formula (III):

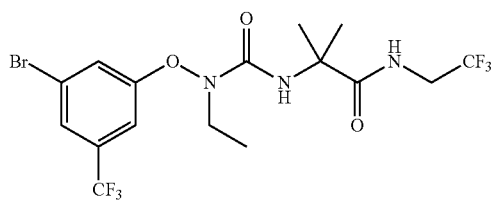

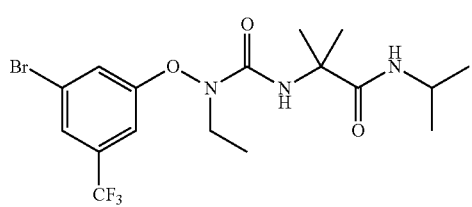

[21]
The pest control agent set according to any one of [15] to [20], wherein the pest control agent set is produced by further gathering at least one selected from the group consisting of a measuring cup, a measuring dropper, a mixing tank, gloves, a mask, and protective goggles into one.

[22]
A pest control agent set, wherein the pest control agent set is produced by gathering the pest control agent composition according to any one of [8] to [14] and at least one selected from the group consisting of a measuring cup, a measuring dropper, a mixing tank, gloves, a mask, and protective goggles into one.

[23]
The pest control agent set according to any one of [15] to [20], wherein the pests are insects or mites.

Effects of the Invention

According to a controlling method of the present invention, pests such as insects and mites may be more safely controlled at a lower dosage. In a method for controlling pests, especially in the controlling method of the present invention, a pest control agent composition and a pest control agent set of the present invention may be suitably used. The pest control agent composition of the present invention may be suitably used especially for insecticide and acaricide for agriculture and horticulture.

Since the pest control agent composition of the present invention contains a compound of formula (I) or a salt thereof (hereinafter referred to as a "compound A") and an insecticidal or acaricidal active component (hereinafter referred to as a "compound B") at a ratio suitable for application objects, trouble in measuring and mixing the compound A and the compound B may be saved. The pest control agent composition of the present invention is packaged, bottled, boxed, and canned depending on the dosage form, and may be stored or transported.

Since chemical compositions required for application operation is gathered into one, the pest control agent set of the present invention save trouble in obtaining chemicals individually, and is excellent in convenience in storage and transport.

MODE OF CARRYING OUT THE INVENTION

A method for controlling pests of the present invention comprises applying a compound A with a compound B to an object.

The compound A is a compound of formula (I) or a salt thereof.

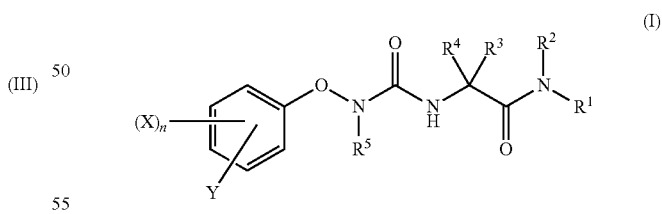

In formula (I),
R$^1$ represents a hydrogen atom, a substituted or unsubstituted C1-6 alkyl group, a substituted or unsubstituted C2-6 alkenyl group, a substituted or unsubstituted C2-6 alkynyl group, a substituted or unsubstituted C3-8 cycloalkyl group, or a substituted or unsubstituted C6-10 aryl group,
R$^2$ represents a hydrogen atom or a C1-6 alkyl group,
R$^1$ and R$^2$ optionally form a C2-6 alkylene group together,
R$^3$ and R$^4$ each independently represent a hydrogen atom or a C1-6 alkyl group, R⁵ represents a substituted or unsubstituted C1-6 alkyl group or a substituted or unsubstituted C2-6 alkynyl group, Y represents a C1-6 haloalkyl group, X represents a halogeno group, a C1-6 alkyl group, or a C1-6 haloalkyl group, and n represents a chemically acceptable number of X, and represents any integer of 0 to 4, and Xs are the same or different when n is 2 or more.

In the present invention, the term "unsubstituted" means a group consisting only of a core. Only the name of a group consisting of a core without the term "substituted" means an "unsubstituted" group unless otherwise specified.

By contrast, the term "substituted" means that any hydrogen atom of a group consisting of a core is replaced by a group (substituent) having a structure that is the same as or different from that of the core. Thus, the "substituent" means another group bound to the group consisting of a core. The number of the substituent may be one or more. Two or more substituents are the same or different.

Terms such as "C1-6" mean that the number of carbon atoms in the group consisting of a core is 1 to 6, and the like. This number of carbon atoms does not include the number of carbon atoms present in the substituent. For example, a butyl group having an ethoxy group as a substituent is classified into a C2 alkoxy C4 alkyl group.

The "substituent" is not particularly limited as long as the substituent is chemically acceptable and produces the effect of the present invention. Hereinafter, a group capable of serving as the "substituent" is exemplified:

a C1-6 alkyl group such as a methyl group, an ethyl group, a n-propyl group, an i-propyl group, a n-butyl group, a s-butyl group, an i-butyl group, a t-butyl group, a n-pentyl group, and a n-hexyl group;

a C2-6 alkenyl group such as a vinyl group, a 1-propenyl group, a 2-propenyl group (allyl group), a 1-butenyl group, a 2-butenyl group, a 3-butenyl group, a 1-methyl-2-propenyl group, and a 2-methyl-2-propenyl group;

a C2-6 alkynyl group such as an ethynyl group, a 1-propynyl group, a 2-propynyl group, a 1-butynyl group, a 2-butynyl group, a 3-butynyl group, and a 1-methyl-2-propynyl group;

a C3-8 cycloalkyl group such as a cyclopropyl group, a cyclobutyl group, a cyclopentyl group, a cyclohexyl group, and a cubanyl group;

a C6-10 aryl group such as a phenyl group and a naphthyl group;

a C6-10 aryl C1-6 alkyl group such as a benzyl group and a phenethyl group;

a 3- to 6-membered heterocyclyl group;

a 3- to 6-membered heterocyclyl C1-6 alkyl group;

a hydroxy group;

a C1-6 alkoxy group such as a methoxy group, an ethoxy group, a n-propoxy group, an i-propoxy group, a n-butoxy group, a s-butoxy group, an i-butoxy group, and a t-butoxy group;

a C2-6 alkenyloxy group such as a vinyloxy group, an allyloxy group, a propenyloxy group, and a butenyloxy group;

a C2-6 alkynyloxy group such as an ethynyloxy group and a propargyloxy group;

a C6-10 aryloxy group such as a phenoxy group and a naphthoxy group;

a C6-10 aryl C1-6 alkoxy group such as a benzyloxy group and a phenethyloxy group;

a 5- or 6-membered heteroaryloxy group such as a thiazolyloxy group and a pyridyloxy group;

a 5- or 6-membered heteroaryl C1-6 alkyloxy group such as a thiazolylmethyloxy group and a pyridylmethyloxy group;

a formyl group;

a C1-6 alkylcarbonyl group such as an acetyl group and a propionyl group;

a formyloxy group;

a C1-6 alkylcarbonyloxy group such as an acetyloxy group and a propionyloxy group;

a C6-10 arylcarbonyl group such as a benzoyl group;

a C1-6 alkoxycarbonyl group such as a methoxycarbonyl group, an ethoxycarbonyl group, a n-propoxycarbonyl group, an i-propoxycarbonyl group, a n-butoxycarbonyl group, and a t-butoxycarbonyl group;

a C1-6 alkoxycarbonyloxy group such as a methoxycarbonyloxy group, an ethoxycarbonyloxy group, a n-propoxycarbonyloxy group, an i-propoxycarbonyloxy group, a n-butoxycarbonyloxy group, and a t-butoxycarbonyloxy group;

a carboxy group;

a halogeno group such as a fluoro group, a chloro group, a bromo group, and an iodo group;

a C1-6 haloalkyl group such as a chloromethyl group, a chloroethyl group, a trifluoromethyl group, a 1,2-dichloro-n-propyl group, a 1-fluoro-n-butyl group, and a perfluoro-n-pentyl group;

a C2-6 haloalkenyl group such as a 2-chloro-1-propenyl group and a 2-fluoro-1-butenyl group;

a C2-6 haloalkynyl group such as a 4,4-dichloro-1-butynyl group, a 4-fluoro-1-pentynyl group, and a 5-bromo-2-pentynyl group;

a C1-6 haloalkoxy group such as a trifluoromethoxy group, a 2-chloro-n-propoxy group, and a 2,3-dichlorobutoxy group;

a C2-6 haloalkenyloxy group such as a 2-chloropropenyloxy group and a 3-bromobutenyloxy group;

a C1-6 haloalkylcarbonyl group such as a chloroacetyl group, a trifluoroacetyl group, and a trichloroacetyl group;

an amino group;

a C1-6 alkyl-substituted amino group such as a methylamino group, a dimethylamino group, and a diethylamino group;

a C6-10 arylamino group such as an anilino group and a naphthylamino group;

a C6-10 aryl C1-6 alkylamino group such as a benzylamino group and a phenethylamino group; a formylamino group;

a C1-6 alkylcarbonylamino group such as an acetylamino group, a propanoylamino group, a butyrylamino group, and an i-propylcarbonylamino group;

a C1-6 alkoxycarbonylamino group such as a methoxycarbonylamino group, an ethoxycarbonylamino group, a n-propoxycarbonylamino group, and an i-propoxycarbonylamino group;

an unsubstituted or substituted aminocarbonyl group such as an aminocarbonyl group, a dimethylaminocarbonyl group, a phenylaminocarbonyl group, a N-phenyl-N-methylaminocarbonyl group, and a 2,2,2-trifluoroethylaminocarbonyl group;

an imino C1-6 alkyl group such as an iminomethyl group, a (1-imino)ethyl group, and a (1-imino)-n-propyl group;

a substituted or unsubstituted N-hydroxyimino C1-6 alkyl group such as a N-hydroxy-iminomethyl group, a (1-

(N-hydroxy)-imino)ethyl group, a (1-(N-hydroxy)-imino)propyl group, a N-methoxy-iminomethyl group, and a (1-(N-methoxy)-imino)ethyl group;
an aminocarbonyloxy group;
a C1-6 alkyl-substituted aminocarbonyloxy group such as an ethylaminocarbonyloxy group and a dimethylaminocarbonyloxy group;
a mercapto group;
a C1-6 alkylthio group such as a methylthio group, an ethylthio group, a n-propylthio group, an i-propylthio group, a n-butylthio group, an i-butylthio group, a s-butylthio group, and a t-butylthio group;
a C1-6 haloalkylthio group such as a trifluoromethylthio group and a 2,2,2-trifluoroethylthio group;
a C6-10 arylthio group such as a phenylthio group and a naphthylthio group;
a 5- or 6-membered heteroarylthio group such as a thiazolylthio group and a pyridylthio group;
a C1-6 alkylsulfinyl group such as a methylsulfinyl group, an ethylsulfinyl group, and a t-butylsulfinyl group;
a C1-6 haloalkylsulfinyl group such as a trifluoromethylsulfinyl group and a 2,2,2-trifluoroethylsulfinyl group;
a C6-10 arylsulfinyl group such as a phenylsulfinyl group;
a 5- or 6-membered heteroarylsulfinyl group such as a thiazolylsulfinyl group and a pyridylsulfinyl group;
a C1-6 alkylsulfonyl group such as a methylsulfonyl group, an ethylsulfonyl group, and a t-butylsulfonyl group;
a C1-6 haloalkylsulfonyl group such as a trifluoromethylsulfonyl group and a 2,2,2-trifluoroethylsulfonyl group;
a C6-10 arylsulfonyl group such as a phenylsulfonyl group;
a 5- or 6-membered heteroarylsulfonyl group such as a thiazolylsulfonyl group and a pyridylsulfonyl group;
a C1-6 alkylsulfonyloxy group such as a methylsulfonyloxy group, an ethylsulfonyloxy group, and a t-butylsulfonyloxy group;
a C1-6 haloalkylsulfonyloxy group such as a trifluoromethylsulfonyloxy group and a 2,2,2-trifluoroethylsulfonyloxy group;
a tri-C1-6 alkyl-substituted silyl group such as a trimethylsilyl group, a triethylsilyl group, and a t-butyldimethylsilyl group;
a tri-C6-10 aryl-substituted silyl group such as a triphenylsilyl group;
a cyano group; and
a nitro group.

For these "substituents", any hydrogen atom in each substituent may be replaced by a group having a distinct structure. In this case, as the "substituent", a C1-6 alkyl group, a C1-6 haloalkyl group, a C1-6 alkoxy group, a C1-6 haloalkoxy group, a halogeno group, a cyano group, a nitro group, or the like may be exemplified.

The "3- to 6-membered heterocyclyl group" described above contains 1 to 4 heteroatoms selected from the group consisting of a nitrogen atom, an oxygen atom, and a sulfur atom as ring-constituting atoms. The heterocyclyl group may be either monocyclic or polycyclic. The polycyclic heterocyclyl group has at least one hetero ring, and the remaining ring(s) may be any of a saturated alicyclic ring, an unsaturated alicyclic ring and an aromatic ring. As the "3- to 6-membered heterocyclyl group", a 3- to 6-membered saturated heterocyclyl group, a 5- or 6-membered heteroaryl group, a 5- or 6-membered partially unsaturated heterocyclyl group or the like may be exemplified.

As the 3- to 6-membered saturated heterocyclyl group, an aziridinyl group, an epoxy group, a pyrrolidinyl group, a tetrahydrofuranyl group, a thiazolidinyl group, a piperidyl group, a piperazinyl group, a morpholinyl group, a dioxolanyl group, a dioxanyl group or the like may be exemplified.

As the 5-membered heteroaryl group, a pyrrolyl group, a furyl group, a thienyl group, an imidazolyl group, a pyrazolyl group, an oxazolyl group, an isoxazolyl group, a thiazolyl group, an isothiazolyl group, a triazolyl group, an oxadiazolyl group, a thiadiazolyl group, a tetrazolyl group, or the like may be exemplified.

As the 6-membered heteroaryl group, a pyridyl group, a pyrazinyl group, a pyrimidinyl group, a pyridazinyl group, a triazinyl group, or the like may be exemplified.

In formula (I), $R^1$ represents a hydrogen atom, a substituted or unsubstituted C1-6 alkyl group, a substituted or unsubstituted C2-6 alkenyl group, a substituted or unsubstituted C2-6 alkynyl group, a substituted or unsubstituted C3-8 cycloalkyl group, or a substituted or unsubstituted C6-10 aryl group.

The "C1-6 alkyl group" of $R^1$ may be linear or branched. As the alkyl group, a methyl group, an ethyl group, a n-propyl group, a n-butyl group, a n-pentyl group, a n-hexyl group, an i-propyl group, an i-butyl group, a s-butyl group, a t-butyl group, an i-pentyl group, a neopentyl group, a 2-methylbutyl group, an i-hexyl group, or the like may be exemplified.

As specific examples of the "substituted C1-6 alkyl group", the following may be exemplified:
a C1-6 haloalkyl group such as a fluoromethyl group, a chloromethyl group, a bromomethyl group, a difluoromethyl group, a dichloromethyl group, a dibromomethyl group, a trifluoromethyl group, a trichloromethyl group, a tribromomethyl group, a 1-chloroethyl group, a 2,2-difluoroethyl group, a 2,2,2-trifluoroethyl group, a 2-chloro-2,2-difluoroethyl group, a 2,2,2-trichloroethyl group, a pentafluoroethyl group, a 3,3,3-trifluoropropyl group, a 2,2,3,3,3-pentafluoropropyl group, a 4-fluorobutyl group, a 2,2,3,3,4,4,4-heptafluorobutyl group, a 4-chlorobutyl group, a 2,2,2-trifluoro-1-trifluoromethylethyl group, a 1,1,1,3,3,3-hexafluoropropan-2-yl group, a perfluoropropan-2-yl group, a perfluorohexyl group, a perchlorohexyl group, and a 2,4,6-trichlorohexyl group;
a C3-8 cycloalkyl C1-6 alkyl group such as a cyclopropylmethyl group, a 2-cyclopropylethyl group, a cyclopentylmethyl group, a 2-cyclohexylethyl group, and a 2-cyclooctylethyl group;
a cyano C1-6 alkyl group such as a cyanomethyl group;
a C1-6 alkoxy carbonyl C1-6 alkyl group such as an ethoxycarbonylmethyl group;
a substituted or unsubstituted aminocarbonyl C1-6 alkyl group (preferably a C1-6 haloalkylaminocarbonyl C1-6 alkyl group) such as a 2,2,2-trifluoroethylaminocarbonylmethyl group;
a C1-6 alkylthio C1-6 alkyl group such as 2-(methylthio)ethyl group; or the like.

As a substituent on the "C1-6 alkyl group" of $R^1$, a halogeno group such as a fluoro group, a chloro group, a bromo group, and an iodo group; a C1-6 alkoxycarbonyl group such as a methoxy carbonyl group, an ethoxycarbonyl group, a n-propoxycarbonyl group, an i-propoxycarbonyl group, a n-butoxycarbonyl group, and a t-butoxycarbonyl group; a substituted or unsubstituted aminocarbonyl group (preferably a C1-6 haloalkylaminocarbonyl group) such as a 2,2,2-trifluoroethylaminocarbonyl group; a C1-6 alkylthio group such as a methylthio group, an ethylthio group, a n-propylthio group, an i-propylthio group, a n-butylthio group, an i-butylthio group, a s-butylthio group, and a t-butylthio group; a C3-8 cycloalkyl group such as a cyclopropyl group, a cyclobutyl group, a cyclopentyl group, a cyclohexyl group, and a cubanyl group; and a cyano group may be preferably exemplified.

As the "C2-6 alkenyl group" of $R^1$, a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group, a 5-hexenyl group, or the like may be exemplified.

As the "C2-6 alkynyl group" of $R^1$, an ethynyl group, a 1-propynyl group, a 2-propynyl group, a 1-butynyl group, a 2-butynyl group, a 3-butynyl group, a 1-methyl-2-propynyl group, a 2-methyl-3-butynyl group, a 1-pentynyl group, a 2-pentynyl group, a 3-pentynyl group, a 4-pentynyl group, a 1-methyl-2-butynyl group, a 2-methyl-3-pentynyl group, a 1-hexynyl group, a 1,1-dimethyl-2-butynyl group, or the like may be exemplified.

As a substituent on the "C2-6 alkenyl group" or the "C2-6 alkynyl group" of $R^1$, a halogeno group such as a fluoro group, a chloro group, a bromo group, and a iodo group; and a cyano group may be preferably exemplified.

As the "C3-8 cycloalkyl group" of $R^1$, a cyclopropyl group, a cyclobutyl group, a cyclopentyl group, a cyclohexyl group, or the like may be exemplified.

The "C6-10 aryl group" of $R^1$ is a group formed by removing one hydrogen on a ring of a monocyclic or polycyclic aromatic hydrocarbon. As the "C6-10 aryl group", a phenyl group, a naphthyl group, or the like may be exemplified.

As a substituent on the "C3-8 cycloalkyl group" or the "C6-10 aryl group" of $R^1$, a halogeno group such as a fluoro group, a chloro group, a bromo group, and an iodo group; a C1-6 haloalkyl group such as a trifluoromethyl group, 2,2,2-trifluoroethyl group, and a perfluoroethyl group; and a cyano group may be preferably exemplified.

In formula (I), $R^2$ represents a hydrogen atom, or a C1-6 alkyl group.

As the "C1-6 alkyl group" of $R^2$, the same as specifically illustrated in $R^1$ may be exemplified.

$R^1$ and $R^2$ optionally form a C2-6 alkylene group together.

As the "C2-6 alkylene group" which $R^1$ and $R^2$ form together, an ethylene group, a propane-1,3-diyl group (also called a trimethylene group), a propane-1,2-diyl group (also called a propylene group), a butane-1,4-diyl group, a butane-1,3-diyl group, a butane-1,2-diyl group, a pentane-1,5-diyl group, or the like may be exemplified.

In formula (I), $R^3$ and $R^4$ each independently represent a hydrogen atom or a C1-6 alkyl group.

As the "C1-6 alkyl group" of $R^3$ or $R^4$, the same as specifically illustrated in $R^1$ may be exemplified.

In formula (I), $R^5$ represents a substituted or unsubstituted C1-6 alkyl group or a substituted or unsubstituted C2-6 alkynyl group.

As the "substituted or unsubstituted C1-6 alkyl group" or the "substituted C2-6 alkynyl group" of $R^5$, the same as specifically illustrated in $R^1$ may be exemplified.

In formula (I), Y represents a C1-6 haloalkyl group.

As the "C1-6 haloalkyl group" of Y, the same as specifically illustrated in $R^1$ may be exemplified.

In formula (I), X represents a halogeno group, a C1-6 alkyl group, or a C1-6 haloalkyl group.

As the "halogeno group" of X, a fluoro group, a chloro group, a bromo group, an iodo group, or the like may be exemplified.

As the "C1-6 alkyl group" and the "C1-6 haloalkyl group" of X, the same as specifically illustrated in $R^1$ may be exemplified.

In formula (I), n represents a chemically acceptable number of X, and represents any integer of 0 to 4, and Xs are the same or different when n is 2 or more.

A salt of the compound (I) is not particularly limited as long as the salt is agriculturally or horticulturally acceptable. For example, a salt of an inorganic acid such as hydrochloric acid and sulfuric acid; a salt of an organic acid such as acetic acid and lactic acid; a salt of an alkali metal such as lithium, sodium and potassium; a salt of an alkaline earth metal such as calcium and magnesium; a salt of a transition metal such as iron and copper; a salt of an organic base such as triethylamine, tributylamine, pyridine, and hydrazine; an ammonium salt; or the like may be exemplified.

The compound A is preferably a compound of formula (II) or (III):

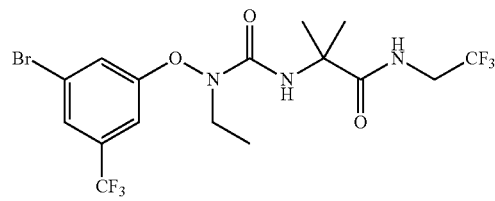

(II)

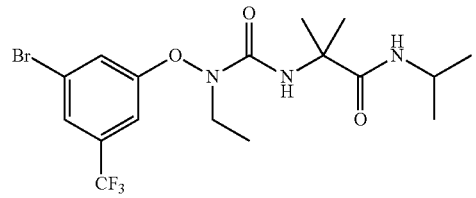

(III)

The compound B is an insecticidal or acaricidal active component, and is preferably an active ingredient of an insecticide or an acaricide having a mechanism of action classified according to the IRAC code.

As the insecticide or the acaricide having a mechanism of action classified according to the IRAC code, (1A) an acetylcholine esterase (AChE) inhibitor (carbamate-based), (1B) an acetylcholine esterase (AChE) inhibitor (organophosphorus-based), (2) a GABAergic chloride ion (chlorine ion) channel blocker, (3A) a sodium channel modulator (pyrethroid-based), (3B) a sodium channel modulator (DDTs), (4) a nicotinic acetylcholine receptor (nAChR) competitive modulator, (5) a nicotinic acetylcholine receptor (nAChR) allosteric modulator, (6) a glutamatergic chloride ion (chlorine ion) channel (GluCl) allosteric modulator, (7) a juvenile hormone mimetic agent, (8) other nonspecific (multisite) inhibitors, (9) a chordotonal organ TRPV channel modulator, (10) a mite growth inhibitor, (11) a microorganism-derived insect midgut lining membrane destructive agent, (12) a mitochondrial ATP synthetase inhibitor, (13) an oxidative phosphorylation uncoupler which disrupts proton gradients, (14) a nicotinic acetylcholine receptor (nAChR)

channel blocker, (15) a chitin biosynthesis inhibitor, type 0, (16) a chitin biosynthesis inhibitor, type 1, (17) an ecdysis inhibitor, (18) an ecdysis hormone (ecdysone) receptor agonist, (19) an octopamine receptor agonist, (20) a mitochondrial electron transport system complex III inhibitor, (21) a mitochondrial electron transport system complex I inhibitor (METI), (22) a potential-dependent sodium channel blocker, (23) an acetyl-CoA carboxylase inhibitor, (24) a mitochondrial electron transport system complex IV inhibitor, (25) a mitochondrial electron transport system complex III inhibitor, (28) a ryanodine receptor modulator, (29) a chordotonal organ modulator the target site of which is unidentified, (30) a GABAergic chloride ion (chlorine ion) channel allosteric modulator, and (UN) having an unknown or indistinct mechanism of action may be exemplified.

Specific examples of the above-mentioned compound B will be shown hereinafter.

(1A) Acetylcholine esterase (AChE) inhibitor (carbamate-based)
alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC, xylylcarb.
aldoxycarb, allyxycarb, aminocarb, bufencarb, cloethocarb, fenothiocarb, promecarb.

(1B) Acetylcholine esterase (AChE) inhibitor (organophosphorus-based)
acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, bromophos-ethyl (bromophos-e), cyanofenphos, demeton-S-methylsulfone, dialifos, dichlofenthion, dioxabenzofos, etrimfos, fensulfothion, fonofos, formothion, iodofenphos, isazofos, isocarbofos, methacrifos, phosphocarb, pirimiphos-ethyl (pirimiphos-e), propaphos, prothoate, and sulprofos.

(2) GABAergic chloride ion (chlorine ion) channel blocker
chlordane, endosulfan, ethiprole, fipronil, acetoprole, camphechlor, dienochlor, heptachlor, pyrafluprole, pyriprole, and flufiprole.

(3A) Sodium channel modulator (pyrethroid-based)
acrinathrin, allethrin, d-cis-trans allethrin, d-trans allethrin, bifenthrin, bioallethrin, bioallethrin S-cyclopentenyl-isomer, bioresmethrin, cycloprothrin, cyfluthrin, β-cyfluthrin (beta-cyfluthrin), cyhalothrin, λ-cyhalothrin (lambda-cyhalothrin), γ-cyhalothrin (gamma-cyhalothrin), cypermethrin, α-cypermethrin (alpha-cypermethrin), β-cypermethrin (beta-cypermethrin), θ-cypermethrin (theta-cypermethrin), ξ-cypermethrin (zeta-cypermethrin), cyphenothrin[(1R)-trans-isomers], deltamethrin, empenthrin[(EZ)-(1R)-isomers], esfenvalerate, etofenprox, fenpropathrin, fenvalerate, flucythrinate, flumethrin, z-fluvalinate (tau-fluvalinate), halfenprox, imiprothrin, kadethrin, permethrin, phenothrin[(1R)-trans-isomer], prallethrin, pyrethrins, resmethrin, silafluofen, tefluthrin, tetramethrin, tetramethrin[(1R)-isomers], tralomethrin, transfluthrin, κ-bifenthrin (kappa-bifenthrin), biopermethrin, chloroprallethrin, dimefluthrin, fenfluthrin, fenpirithrin, flufenprox, heptafluthrin, meperfluthrin, ε-metofluthrin (epsilon-metofluthrin), momfluorothrin, ε-momfluorothrin (epsilon-momfluorothrin), trans-permethrin, profluthrin, protrifenbute, κ-tefluthrin (kappa-tefluthrin), terallethrin, tetramethylfluthrin, and bioethanomethrin.

(3B) Sodium channel modulator (DDTs)
DDT and methoxychlor.

(4) Nicotinic acetylcholine receptor (nAChR) competitive modulator
acetamiprid, clothianidin, dinotefuran, imidacloprid, nitenpyram, thiacloprid, thiamethoxam, nicotine, sulfoxaflor, flupyradifurone, triflumezopyrim, nithiazine, dicloromezotiaz, and flupyrimin.

(5) Nicotinic acetylcholine receptor (nAChR) allosteric modulator
spinetoram and spinosad.

(6) Glutamatergic chloride ion (chlorine ion) channel (GluCl) allosteric modulator
abamectin, emamectin, emamectin-benzoate, lepimectin, milbemectin, doramectin, eprinomectin, ivermectin, moxidectin, and selamectin.

(7) Juvenile hormone mimetic agent
hydroprene, kinoprene, methoprene, fenoxycarb, pyriproxyfen, diofenolan, epofenonane, and triprene.

(8) Other nonspecific (multisite) inhibitors
methyl bromide, alkyl halides, chloropicrin, sodium aluminum fluoride, sulfuryl fluoride, borax, boric acid, disodium octaborate, sodium borate, sodium metaborate, tartar emetic, dazomet, metam, metam sodium, and metam potassium.

(9) Chordotonal organ TRPV channel modulator
pymetrozine, pyrifluquinazon, and afidopyropen.

(10) Mite growth inhibitor
clofentezine, diflovidazin, hexythiazox, and etoxazole.

(11) Microorganism-derived insect midgut lining membrane destructive agent
*B. t.* subsp. *israelensis, B. t.* subsp. *aizawai, B. t.* subsp. *kurstaki, B. t.* subsp. *tenebrionis*, proteins contained in *B. t.* crops (*B. t.* crop proteins): Cry1Ab, Cry1Ac, Cry1Fa, Cry1A.105, Cry2Ab, Vip3A, mCry3A, Cry3Ab, Cry3Bb, and Cry34Ab1/Cry35Ab1, and *Bacillus sphaericus*.

(12) Mitochondrial ATP synthetase inhibitor
diafenthiuron, azocyclotin, cyhexatin, fenbutatin-oxide, propargite, and tetradifon.

(13) Oxidative phosphorylation uncoupler which disrupts proton gradients
chlorfenapyr, DNOC (4,6-dinitro-o-cresol), sulfluramid, binapacryl, dinobuton, and dinocap.

(14) Nicotinic acetylcholine receptor (nAChR) channel blocker
bensultap, cartap hydrochloride, thiocyclam, and thiosultap-sodium.

(15) Chitin biosynthesis inhibitor, Type 0
bistrifluron, chlorfluazuron, diflubenzuron, flucycloxuron, flufenoxuron, hexaflumuron, lufenuron, novaluron, noviflumuron, teflubenzuron, triflumuron, and fluazuron.

(16) Chitin biosynthesis inhibitor, Type 1
buprofezin.
(17) Ecdysis inhibitor
cyromazine.
(18) Ecdysis hormone (ecdysone) receptor agonist
chromafenozide, halofenozid, methoxyfenozide, and tebufenozide.
(19) Octopamine receptor agonist
amitraz and chlordimeform.
(20) Mitochondrial electron transport system complex III inhibitor
hydramethylnon, acequinocyl, fluacrypyrim, and bifenazate.
(21) Mitochondrial electron transport system complex I inhibitor (METI)
fenazaquin, fenpyroximate, pyridaben, pyrimidifen, tebufenpyrad, tolfenpyrad, and rotenone.
(22) Potential-dependent sodium channel blocker
indoxacarb and metaflumizone.
(23) Acetyl-CoA carboxylase inhibitor
spirodiclofen, spiromesifen, spirotetramat, and spiropidion.
(24) Mitochondrial electron transport system complex IV inhibitor
aluminum phosphide (Al-phosphide), calcium phosphide (Ca-phosphide), phosphine, zinc phosphide (Zn-phosphide), calcium cyanide (Ca-cyanide) sodium cyanide (Na-cyanide), and potassium cyanide (K-cyanide).
(25) Mitochondrial electron transport system complex II inhibitor
cyenopyrafen, cyflumetofen, and pyflubumide.
(28) Ryanodine receptor modulator
chlorantraniliprole, cyantraniliprole, cyclaniliprole, flubendiamide, cyhalodiamide, tetrachlorantraniliprole, and tetraniliprole.
(29) Chordotonal organ modulator the target site of which is unidentified
flonicamid.
(30) GABAergic chloride ion (chlorine ion) channel allosteric modulator
broflanilide, fluxametamide, isocycloseram, afoxolaner, fluralaner, lotilaner, and sarolaner.
(UN) azadirachtin, benzoximate, bromopropylate, chinomethionat, dicofol, lime sulfur, mancozeb, pyridalyl, sulfur, acynonapyr, amidofulmet, benzomate, benzpyrimoxan, chlorbenzilate, dicyclanil, fenoxacrim, fentrifanil, flometoquin, flubenzimine, flufenzine, fluhexafon, fluopyram, metoxadiazone, oxazosulfyl, tetrasul, triarathene, and tyclopyrazoflor.

The compound B is preferably hexythiazox, abamectin, fenpyroximate, acetamiprid, propargite, or acynonapyr.

The mass ratio of the compound A to the compound B used for the method of the present invention (compound A/compound B) is not particularly limited, but is preferably 200/1 to 1/200, more preferably 100/1 to 1/100, further preferably 50/1 to 1/50, and particularly preferably 10/1 to 1/10.

It is preferable to apply the compound A and the compound B especially at a mass ratio at which a synergistic effect is exhibited. The synergistic effect may be confirmed by the Colby method, which is mentioned below.

Tables 1 and 2 show specific examples of the combination of the compound A and the compound B and preferable examples of the mass ratio.

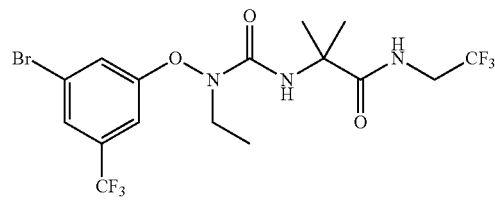

(II)

TABLE 1

| Component A + Component B | Preferable mass ratio |
| --- | --- |
| Compound of formula (II) + alanycarb | 10:1, 5:1, 4:1, 3:1, 2:1, 1:1, 1:2, 1:3, 1:4, 1:5, or 1:10 |
| Compound of formula (II) + aldicarb | 10:1, 5:1, 4:1, 3:1, 2:1, 1:1, 1:2, 1:3, 1:4, 1:5, or 1:10 |
| Compound of formula (II) + bendiocarb | 10:1, 5:1, 4:1, 3:1, 2:1, 1:1, 1:2, 1:3, 1:4, 1:5, or 1:10 |
| Compound of formula (II) + benfuracarb | 10:1, 5:1, 4:1, 3:1, 2:1, 1:1, 1:2, 1:3, 1:4, 1:5, or 1:10 |
| Compound of formula (II) + butocarboxim | 10:1, 5:1, 4:1, 3:1, 2:1, 1:1, 1:2, 1:3, 1:4, 1:5, or 1:10 |
| Compound of formula (II) + butoxycarboxim | 10:1, 5:1, 4:1, 3:1, 2:1, 1:1, 1:2, 1:3, 1:4, 1:5, or 1:10 |
| Compound of formula (II) + carbaryl | 10:1, 5:1, 4:1, 3:1, 2:1, 1:1, 1:2, 1:3, 1:4, 1:5, or 1:10 |
| Compound of formula (II) + carbofuran | 10:1, 5:1, 4:1, 3:1, 2:1, 1:1, 1:2, 1:3, 1:4, 1:5, or 1:10 |
| Compound of formula (II) + carbosulfan | 10:1, 5:1, 4:1, 3:1, 2:1, 1:1, 1:2, 1:3, 1:4, 1:5, or 1:10 |
| Compound of formula (II) + ethiofencarb | 10:1, 5:1, 4:1, 3:1, 2:1, 1:1, 1:2, 1:3, 1:4, 1:5, or 1:10 |
| Compound of formula (II) + fenobucarb | 10:1, 5:1, 4:1, 3:1, 2:1, 1:1, 1:2, 1:3, 1:4, 1:5, or 1:10 |
| Compound of formula (II) + formetanate | 10:1, 5:1, 4:1, 3:1, 2:1, 1:1, 1:2, 1:3, 1:4, 1:5, or 1:10 |
| Compound of formula (II) + furathiocarb | 10:1, 5:1, 4:1, 3:1, 2:1, 1:1, 1:2, 1:3, 1:4, 1:5, or 1:10 |
| Compound of formula (II) + isoprocarb | 10:1, 5:1, 4:1, 3:1, 2:1, 1:1, 1:2, 1:3, 1:4, 1:5, or 1:10 |
| Compound of formula (II) + methiocarb | 10:1, 5:1, 4:1, 3:1, 2:1, 1:1, 1:2, 1:3, 1:4, 1:5, or 1:10 |
| Compound of formula (II) + methomyl | 10:1, 5:1, 4:1, 3:1, 2:1, 1:1, 1:2, 1:3, 1:4, 1:5, or 1:10 |
| Compound of formula (II) + metolcarb | 10:1, 5:1, 4:1, 3:1, 2:1, 1:1, 1:2, 1:3, 1:4, 1:5, or 1:10 |
| Compound of formula (II) + oxamyl | 10:1, 5:1, 4:1, 3:1, 2:1, 1:1, 1:2, 1:3, 1:4, 1:5, or 1:10 |
| Compound of formula (II) + pirimicarb | 10:1, 5:1, 4:1, 3:1, 2:1, 1:1, 1:2, 1:3, 1:4, 1:5, or 1:10 |
| Compound of formula (II) + propoxur | 10:1, 5:1, 4:1, 3:1, 2:1, 1:1, 1:2, 1:3, 1:4, 1:5, or 1:10 |
| Compound of formula (II) + thiodicarb | 10:1, 5:1, 4:1, 3:1, 2:1, 1:1, 1:2, 1:3, 1:4, 1:5, or 1:10 |
| Compound of formula (II) + thiofanox | 10:1, 5:1, 4:1, 3:1, 2:1, 1:1, 1:2, 1:3, 1:4, 1:5, or 1:10 |
| Compound of formula (II) + triazamate | 10:1, 5:1, 4:1, 3:1, 2:1, 1:1, 1:2, 1:3, 1:4, 1:5, or 1:10 |
| Compound of formula (II) + trimethacarb | 10:1, 5:1, 4:1, 3:1, 2:1, 1:1, 1:2, 1:3, 1:4, 1:5, or 1:10 |
| Compound of formula (II) + XMC | 10:1, 5:1, 4:1, 3:1, 2:1, 1:1, 1:2, 1:3, 1:4, 1:5, or 1:10 |
| Compound of formula (II) + xylylcarb | 10:1, 5:1, 4:1, 3:1, 2:1, 1:1, 1:2, 1:3, 1:4, 1:5, or 1:10 |
| Compound of formula (II) + acephate | 10:1, 5:1, 4:1, 3:1, 2:1, 1:1, 1:2, 1:3, 1:4, 1:5, or 1:10 |
| Compound of formula (II) + azamethiphos | 10:1, 5:1, 4:1, 3:1, 2:1, 1:1, 1:2, 1:3, 1:4, 1:5, or 1:10 |
| Compound of formula (II) + azinphos-ethyl | 10:1, 5:1, 4:1, 3:1, 2:1, 1:1, 1:2, 1:3, 1:4, 1:5, or 1:10 |
| Compound of formula (II) + azinphos-methyl | 10:1, 5:1, 4:1, 3:1, 2:1, 1:1, 1:2, 1:3, 1:4, 1:5, or 1:10 |

TABLE 1-continued

| Component A + Component B | Preferable mass ratio |
|---|---|
| Compound of formula (II) + cadusafos | 10:1, 5:1, 4:1, 3:1, 2:1, 1:1, 1:2, 1:3, 1:4, 1:5, or 1:10 |
| Compound of formula (II) + chlorethoxyfos | 10:1, 5:1, 4:1, 3:1, 2:1, 1:1, 1:2, 1:3, 1:4, 1:5, or 1:10 |
| Compound of formula (II) + chlorfenvinphos | 10:1, 5:1, 4:1, 3:1, 2:1, 1:1, 1:2, 1:3, 1:4, 1:5, or 1:10 |
| Compound of formula (II) + chlormephos | 10:1, 5:1, 4:1, 3:1, 2:1, 1:1, 1:2, 1:3, 1:4, 1:5, or 1:10 |
| Compound of formula (II) + chlorpyrifos | 10:1, 5:1, 4:1, 3:1, 2:1, 1:1, 1:2, 1:3, 1:4, 1:5, or 1:10 |
| Compound of formula (II) + chlorpyrifos-methyl | 10:1, 5:1, 4:1, 3:1, 2:1, 1:1, 1:2, 1:3, 1:4, 1:5, or 1:10 |
| Compound of formula (II) + coumaphos | 10:1, 5:1, 4:1, 3:1, 2:1, 1:1, 1:2, 1:3, 1:4, 1:5, or 1:10 |
| Compound of formula (II) + cyanophos | 10:1, 5:1, 4:1, 3:1, 2:1, 1:1, 1:2, 1:3, 1:4, 1:5, or 1:10 |
| Compound of formula (II) + demeton-S-methyl | 10:1, 5:1, 4:1, 3:1, 2:1, 1:1, 1:2, 1:3, 1:4, 1:5, or 1:10 |
| Compound of formula (II) + diazinon | 10:1, 5:1, 4:1, 3:1, 2:1, 1:1, 1:2, 1:3, 1:4, 1:5, or 1:10 |
| Compound of formula (II) + dichlorvos/DDVP | 10:1, 5:1, 4:1, 3:1, 2:1, 1:1, 1:2, 1:3, 1:4, 1:5, or 1:10 |
| Compound of formula (II) + dicrotophos | 10:1, 5:1, 4:1, 3:1, 2:1, 1:1, 1:2, 1:3, 1:4, 1:5, or 1:10 |
| Compound of formula (II) + dimethoate | 10:1, 5:1, 4:1, 3:1, 2:1, 1:1, 1:2, 1:3, 1:4, 1:5, or 1:10 |
| Compound of formula (II) + dimethylvinphos | 10:1, 5:1, 4:1, 3:1, 2:1, 1:1, 1:2, 1:3, 1:4, 1:5, or 1:10 |
| Compound of formula (II) + disulfoton | 10:1, 5:1, 4:1, 3:1, 2:1, 1:1, 1:2, 1:3, 1:4, 1:5, or 1:10 |
| Compound of formula (II) + EPN | 10:1, 5:1, 4:1, 3:1, 2:1, 1:1, 1:2, 1:3, 1:4, 1:5, or 1:10 |
| Compound of formula (II) + ethion | 10:1, 5:1, 4:1, 3:1, 2:1, 1:1, 1:2, 1:3, 1:4, 1:5, or 1:10 |
| Compound of formula (II) + ethoprophos | 10:1, 5:1, 4:1, 3:1, 2:1, 1:1, 1:2, 1:3, 1:4, 1:5, or 1:10 |
| Compound of formula (II) + famphur | 10:1, 5:1, 4:1, 3:1, 2:1, 1:1, 1:2, 1:3, 1:4, 1:5, or 1:10 |
| Compound of formula (II) + fenamiphos | 10:1, 5:1, 4:1, 3:1, 2:1, 1:1, 1:2, 1:3, 1:4, 1:5, or 1:10 |
| Compound of formula (II) + fenitrothion | 10:1, 5:1, 4:1, 3:1, 2:1, 1:1, 1:2, 1:3, 1:4, 1:5, or 1:10 |
| Compound of formula (II) + fenthion | 10:1, 5:1, 4:1, 3:1, 2:1, 1:1, 1:2, 1:3, 1:4, 1:5, or 1:10 |
| Compound of formula (II) + fosthiazate | 10:1, 5:1, 4:1, 3:1, 2:1, 1:1, 1:2, 1:3, 1:4, 1:5, or 1:10 |
| Compound of formula (II) + heptenophos | 10:1, 5:1, 4:1, 3:1, 2:1, 1:1, 1:2, 1:3, 1:4, 1:5, or 1:10 |
| Compound of formula (II) + imicyafos | 10:1, 5:1, 4:1, 3:1, 2:1, 1:1, 1:2, 1:3, 1:4, 1:5, or 1:10 |
| Compound of formula (II) + isofenphos | 10:1, 5:1, 4:1, 3:1, 2:1, 1:1, 1:2, 1:3, 1:4, 1:5, or 1:10 |
| Compound of formula (II) + isopropyl O-(methoxyaminothio-phosphoryl)salicylate | 10:1, 5:1, 4:1, 3:1, 2:1, 1:1, 1:2, 1:3, 1:4, 1:5, or 1:10 |
| Compound of formula (II) + isoxathion | 10:1, 5:1, 4:1, 3:1, 2:1, 1:1, 1:2, 1:3, 1:4, 1:5, or 1:10 |
| Compound of formula (II) + malathion | 10:1, 5:1, 4:1, 3:1, 2:1, 1:1, 1:2, 1:3, 1:4, 1:5, or 1:10 |
| Compound of formula (II) + mecarbam | 10:1, 5:1, 4:1, 3:1, 2:1, 1:1, 1:2, 1:3, 1:4, 1:5, or 1:10 |
| Compound of formula (II) + methamidophos | 10:1, 5:1, 4:1, 3:1, 2:1, 1:1, 1:2, 1:3, 1:4, 1:5, or 1:10 |
| Compound of formula (II) + methidathion | 10:1, 5:1, 4:1, 3:1, 2:1, 1:1, 1:2, 1:3, 1:4, 1:5, or 1:10 |
| Compound of formula (II) + mevinphos | 10:1, 5:1, 4:1, 3:1, 2:1, 1:1, 1:2, 1:3, 1:4, 1:5, or 1:10 |
| Compound of formula (II) + monocrotophos | 10:1, 5:1, 4:1, 3:1, 2:1, 1:1, 1:2, 1:3, 1:4, 1:5, or 1:10 |
| Compound of formula (II) + naled | 10:1, 5:1, 4:1, 3:1, 2:1, 1:1, 1:2, 1:3, 1:4, 1:5, or 1:10 |
| Compound of formula (II) + omethoate | 10:1, 5:1, 4:1, 3:1, 2:1, 1:1, 1:2, 1:3, 1:4, 1:5, or 1:10 |
| Compound of formula (II) + oxydemeton-methyl | 10:1, 5:1, 4:1, 3:1, 2:1, 1:1, 1:2, 1:3, 1:4, 1:5, or 1:10 |
| Compound of formula (II) + parathion | 10:1, 5:1, 4:1, 3:1, 2:1, 1:1, 1:2, 1:3, 1:4, 1:5, or 1:10 |
| Compound of formula (II) + parathion-methyl | 10:1, 5:1, 4:1, 3:1, 2:1, 1:1, 1:2, 1:3, 1:4, 1:5, or 1:10 |
| Compound of formula (II) + phenthoate | 10:1, 5:1, 4:1, 3:1, 2:1, 1:1, 1:2, 1:3, 1:4, 1:5, or 1:10 |
| Compound of formula (II) + phorate | 10:1, 5:1, 4:1, 3:1, 2:1, 1:1, 1:2, 1:3, 1:4, 1:5, or 1:10 |
| Compound of formula (II) + phosalone | 10:1, 5:1, 4:1, 3:1, 2:1, 1:1, 1:2, 1:3, 1:4, 1:5, or 1:10 |
| Compound of formula (II) + phosmet | 10:1, 5:1, 4:1, 3:1, 2:1, 1:1, 1:2, 1:3, 1:4, 1:5, or 1:10 |
| Compound of formula (II) + phosphamidon | 10:1, 5:1, 4:1, 3:1, 2:1, 1:1, 1:2, 1:3, 1:4, 1:5, or 1:10 |
| Compound of formula (II) + phoxim | 10:1, 5:1, 4:1, 3:1, 2:1, 1:1, 1:2, 1:3, 1:4, 1:5, or 1:10 |
| Compound of formula (II) + pirimiphos-methyl | 10:1, 5:1, 4:1, 3:1, 2:1, 1:1, 1:2, 1:3, 1:4, 1:5, or 1:10 |
| Compound of formula (II) + profenofos | 10:1, 5:1, 4:1, 3:1, 2:1, 1:1, 1:2, 1:3, 1:4, 1:5, or 1:10 |
| Compound of formula (II) + propetamphos) | 10:1, 5:1, 4:1, 3:1, 2:1, 1:1, 1:2, 1:3, 1:4, 1:5, or 1:10 |
| Compound of formula (II) + prothiofos | 10:1, 5:1, 4:1, 3:1, 2:1, 1:1, 1:2, 1:3, 1:4, 1:5, or 1:10 |
| Compound of formula (II) + pyraclofos | 10:1, 5:1, 4:1, 3:1, 2:1, 1:1, 1:2, 1:3, 1:4, 1:5, or 1:10 |
| Compound of formula (II) + pyridaphenthion | 10:1, 5:1, 4:1, 3:1, 2:1, 1:1, 1:2, 1:3, 1:4, 1:5, or 1:10 |
| Compound of formula (II) + quinalphos | 10:1, 5:1, 4:1, 3:1, 2:1, 1:1, 1:2, 1:3, 1:4, 1:5, or 1:10 |
| Compound of formula (II) + sulfotep | 10:1, 5:1, 4:1, 3:1, 2:1, 1:1, 1:2, 1:3, 1:4, 1:5, or 1:10 |
| Compound of formula (II) + tebupirimfos | 10:1, 5:1, 4:1, 3:1, 2:1, 1:1, 1:2, 1:3, 1:4, 1:5, or 1:10 |
| Compound of formula (II) + temephos | 10:1, 5:1, 4:1, 3:1, 2:1, 1:1, 1:2, 1:3, 1:4, 1:5, or 1:10 |
| Compound of formula (II) + terbufos | 10:1, 5:1, 4:1, 3:1, 2:1, 1:1, 1:2, 1:3, 1:4, 1:5, or 1:10 |
| Compound of formula (II) + tetrachlorvinphos | 10:1, 5:1, 4:1, 3:1, 2:1, 1:1, 1:2, 1:3, 1:4, 1:5, or 1:10 |
| Compound of formula (II) + thiometon | 10:1, 5:1, 4:1, 3:1, 2:1, 1:1, 1:2, 1:3, 1:4, 1:5, or 1:10 |
| Compound of formula (II) + triazophos | 10:1, 5:1, 4:1, 3:1, 2:1, 1:1, 1:2, 1:3, 1:4, 1:5, or 1:10 |
| Compound of formula (II) + trichlorfon | 10:1, 5:1, 4:1, 3:1, 2:1, 1:1, 1:2, 1:3, 1:4, 1:5, or 1:10 |
| Compound of formula (II) + vamidothion | 10:1, 5:1, 4:1, 3:1, 2:1, 1:1, 1:2, 1:3, 1:4, 1:5, or 1:10 |
| Compound of formula (II) + chlordane | 10:1, 5:1, 4:1, 3:1, 2:1, 1:1, 1:2, 1:3, 1:4, 1:5, or 1:10 |
| Compound of formula (II) + endosulfan | 10:1, 5:1, 4:1, 3:1, 2:1, 1:1, 1:2, 1:3, 1:4, 1:5, or 1:10 |
| Compound of formula (II) + ethiprole | 10:1, 5:1, 4:1, 3:1, 2:1, 1:1, 1:2, 1:3, 1:4, 1:5, or 1:10 |
| Compound of formula (II) + fipronil | 10:1, 5:1, 4:1, 3:1, 2:1, 1:1, 1:2, 1:3, 1:4, 1:5, or 1:10 |
| Compound of formula (II) + flufiprole | 10:1, 5:1, 4:1, 3:1, 2:1, 1:1, 1:2, 1:3, 1:4, 1:5, or 1:10 |
| Compound of formula (II) + acrinathrin | 10:1, 5:1, 4:1, 3:1, 2:1, 1:1, 1:2, 1:3, 1:4, 1:5, or 1:10 |
| Compound of formula (II) + allethrin | 10:1, 5:1, 4:1, 3:1, 2:1, 1:1, 1:2, 1:3, 1:4, 1:5, or 1:10 |
| Compound of formula (II) + d-cis-trans allethrin | 10:1, 5:1, 4:1, 3:1, 2:1, 1:1, 1:2, 1:3, 1:4, 1:5, or 1:10 |
| Compound of formula (II) + d-trans allethrin | 10:1, 5:1, 4:1, 3:1, 2:1, 1:1, 1:2, 1:3, 1:4, 1:5, or 1:10 |
| Compound of formula (II) + bifenthrin | 10:1, 5:1, 4:1, 3:1, 2:1, 1:1, 1:2, 1:3, 1:4, 1:5, or 1:10 |
| Compound of formula (II) + bioallethrin | 10:1, 5:1, 4:1, 3:1, 2:1, 1:1, 1:2, 1:3, 1:4, 1:5, or 1:10 |
| Compound of formula (II) + bioallethrin S-cyclopentenyl-isomer | 10:1, 5:1, 4:1, 3:1, 2:1, 1:1, 1:2, 1:3, 1:4, 1:5, or 1:10 |
| Compound of formula (II) + bioresmethrin | 10:1, 5:1, 4:1, 3:1, 2:1, 1:1, 1:2, 1:3, 1:4, 1:5, or 1:10 |
| Compound of formula (II) + cycloprothrin | 10:1, 5:1, 4:1, 3:1, 2:1, 1:1, 1:2, 1:3, 1:4, 1:5, or 1:10 |
| Compound of formula (II) + cyfluthrin | 10:1, 5:1, 4:1, 3:1, 2:1, 1:1, 1:2, 1:3, 1:4, 1:5, or 1:10 |

TABLE 1-continued

| Component A + Component B | Preferable mass ratio |
|---|---|
| Compound of formula (II) + β-cyfluthrin | 10:1, 5:1, 4:1, 3:1, 2:1, 1:1, 1:2, 1:3, 1:4, 1:5, or 1:10 |
| Compound of formula (II) + cyhalothrin | 10:1, 5:1, 4:1, 3:1, 2:1, 1:1, 1:2, 1:3, 1:4, 1:5, or 1:10 |
| Compound of formula (II) + λ-cyhalothrin | 10:1, 5:1, 4:1, 3:1, 2:1, 1:1, 1:2, 1:3, 1:4, 1:5, or 1:10 |
| Compound of formula (II) + γ-cyhalothrin | 10:1, 5:1, 4:1, 3:1, 2:1, 1:1, 1:2, 1:3, 1:4, 1:5, or 1:10 |
| Compound of formula (II) + cypermethrin | 10:1, 5:1, 4:1, 3:1, 2:1, 1:1, 1:2, 1:3, 1:4, 1:5, or 1:10 |
| Compound of formula (II) + α-cypermethrin | 10:1, 5:1, 4:1, 3:1, 2:1, 1:1, 1:2, 1:3, 1:4, 1:5, or 1:10 |
| Compound of formula (II) + β-cypermethrin | 10:1, 5:1, 4:1, 3:1, 2:1, 1:1, 1:2, 1:3, 1:4, 1:5, or 1:10 |
| Compound of formula (II) + θ-cypermethrin | 10:1, 5:1, 4:1, 3:1, 2:1, 1:1, 1:2, 1:3, 1:4, 1:5, or 1:10 |
| Compound of formula (II) + ζ-cypermethrin | 10:1, 5:1, 4:1, 3:1, 2:1, 1:1, 1:2, 1:3, 1:4, 1:5, or 1:10 |
| Compound of formula (II) + cyphenothrin[(1R)-trans-isomers] | 10:1, 5:1, 4:1, 3:1, 2:1, 1:1, 1:2, 1:3, 1:4, 1:5, or 1:10 |
| Compound of formula (II) + deltamethrin | 10:1, 5:1, 4:1, 3:1, 2:1, 1:1, 1:2, 1:3, 1:4, 1:5, or 1:10 |
| Compound of formula (II) + empenthrin[(EZ)-(1R)-isomers] | 10:1, 5:1, 4:1, 3:1, 2:1, 1:1, 1:2, 1:3, 1:4, 1:5, or 1:10 |
| Compound of formula (II) + esfenvalerate | 10:1, 5:1, 4:1, 3:1, 2:1, 1:1, 1:2, 1:3, 1:4, 1:5, or 1:10 |
| Compound of formula (II) + etofenprox | 10:1, 5:1, 4:1, 3:1, 2:1, 1:1, 1:2, 1:3, 1:4, 1:5, or 1:10 |
| Compound of formula (II) + fenpropathrin | 10:1, 5:1, 4:1, 3:1, 2:1, 1:1, 1:2, 1:3, 1:4, 1:5, or 1:10 |
| Compound of formula (II) + fenvalerate | 10:1, 5:1, 4:1, 3:1, 2:1, 1:1, 1:2, 1:3, 1:4, 1:5, or 1:10 |
| Compound of formula (II) + flucythrinate | 10:1, 5:1, 4:1, 3:1, 2:1, 1:1, 1:2, 1:3, 1:4, 1:5, or 1:10 |
| Compound of formula (II) + flumethrin | 10:1, 5:1, 4:1, 3:1, 2:1, 1:1, 1:2, 1:3, 1:4, 1:5, or 1:10 |
| Compound of formula (II) + τ-fluvalinate | 10:1, 5:1, 4:1, 3:1, 2:1, 1:1, 1:2, 1:3, 1:4, 1:5, or 1:10 |
| Compound of formula (II) + halfenprox | 10:1, 5:1, 4:1, 3:1, 2:1, 1:1, 1:2, 1:3, 1:4, 1:5, or 1:10 |
| Compound of formula (II) + imiprothrin | 10:1, 5:1, 4:1, 3:1, 2:1, 1:1, 1:2, 1:3, 1:4, 1:5, or 1:10 |
| Compound of formula (II) + kadethrin | 10:1, 5:1, 4:1, 3:1, 2:1, 1:1, 1:2, 1:3, 1:4, 1:5, or 1:10 |
| Compound of formula (II) + permethrin | 10:1, 5:1, 4:1, 3:1, 2:1, 1:1, 1:2, 1:3, 1:4, 1:5, or 1:10 |
| Compound of formula (II) + phenothrin[(1R)-trans-isomer] | 10:1, 5:1, 4:1, 3:1, 2:1, 1:1, 1:2, 1:3, 1:4, 1:5, or 1:10 |
| Compound of formula (II) + prallethrin | 10:1, 5:1, 4:1, 3:1, 2:1, 1:1, 1:2, 1:3, 1:4, 1:5, or 1:10 |
| Compound of formula (II) + pyrethrins | 10:1, 5:1, 4:1, 3:1, 2:1, 1:1, 1:2, 1:3, 1:4, 1:5, or 1:10 |
| Compound of formula (II) + resmethrin | 10:1, 5:1, 4:1, 3:1, 2:1, 1:1, 1:2, 1:3, 1:4, 1:5, or 1:10 |
| Compound of formula (II) + silafluofen | 10:1, 5:1, 4:1, 3:1, 2:1, 1:1, 1:2, 1:3, 1:4, 1:5, or 1:10 |
| Compound of formula (II) + tefluthrin | 10:1, 5:1, 4:1, 3:1, 2:1, 1:1, 1:2, 1:3, 1:4, 1:5, or 1:10 |
| Compound of formula (II) + tetramethrin | 10:1, 5:1, 4:1, 3:1, 2:1, 1:1, 1:2, 1:3, 1:4, 1:5, or 1:10 |
| Compound of formula (II) + tetramethrin[(1R)-isomers] | 10:1, 5:1, 4:1, 3:1, 2:1, 1:1, 1:2, 1:3, 1:4, 1:5, or 1:10 |
| Compound of formula (II) + tralomethrin | 10:1, 5:1, 4:1, 3:1, 2:1, 1:1, 1:2, 1:3, 1:4, 1:5, or 1:10 |
| Compound of formula (II) + transfluthrin | 10:1, 5:1, 4:1, 3:1, 2:1, 1:1, 1:2, 1:3, 1:4, 1:5, or 1:10 |
| Compound of formula (II) + κ-bifenthrin | 10:1, 5:1, 4:1, 3:1, 2:1, 1:1, 1:2, 1:3, 1:4, 1:5, or 1:10 |
| Compound of formula (II) + chloroprallethrin | 10:1, 5:1, 4:1, 3:1, 2:1, 1:1, 1:2, 1:3, 1:4, 1:5, or 1:10 |
| Compound of formula (II) + heptafluthrin | 10:1, 5:1, 4:1, 3:1, 2:1, 1:1, 1:2, 1:3, 1:4, 1:5, or 1:10 |
| Compound of formula (II) + meperfluthrin | 10:1, 5:1, 4:1, 3:1, 2:1, 1:1, 1:2, 1:3, 1:4, 1:5, or 1:10 |
| Compound of formula (II) + ε-metofluthrin | 10:1, 5:1, 4:1, 3:1, 2:1, 1:1, 1:2, 1:3, 1:4, 1:5, or 1:10 |
| Compound of formula (II) + momfluorothrin | 10:1, 5:1, 4:1, 3:1, 2:1, 1:1, 1:2, 1:3, 1:4, 1:5, or 1:10 |
| Compound of formula (II) + κ-tefluthrin | 10:1, 5:1, 4:1, 3:1, 2:1, 1:1, 1:2, 1:3, 1:4, 1:5, or 1:10 |
| Compound of formula (II) + ε-momfluorothrin | 10:1, 5:1, 4:1, 3:1, 2:1, 1:1, 1:2, 1:3, 1:4, 1:5, or 1:10 |
| Compound of formula (II) + tetramethylfluthrin | 10:1, 5:1, 4:1, 3:1, 2:1, 1:1, 1:2, 1:3, 1:4, 1:5, or 1:10 |
| Compound of formula (II) + bioethanomethrin | 10:1, 5:1, 4:1, 3:1, 2:1, 1:1, 1:2, 1:3, 1:4, 1:5, or 1:10 |
| Compound of formula (II) + DDT | 10:1, 5:1, 4:1, 3:1, 2:1, 1:1, 1:2, 1:3, 1:4, 1:5, or 1:10 |
| Compound of formula (II) + methoxychlor | 10:1, 5:1, 4:1, 3:1, 2:1, 1:1, 1:2, 1:3, 1:4, 1:5, or 1:10 |
| Compound of formula (II) + acetamiprid | 10:1, 5:1, 4:1, 3:1, 2:1, 1:1, 1:2, 1:3, 1:4, 1:5, or 1:10 |
| Compound of formula (II) + clothianidin | 10:1, 5:1, 4:1, 3:1, 2:1, 1:1, 1:2, 1:3, 1:4, 1:5, or 1:10 |
| Compound of formula (II) + dinotefuran | 10:1, 5:1, 4:1, 3:1, 2:1, 1:1, 1:2, 1:3, 1:4, 1:5, or 1:10 |
| Compound of formula (II) + imidacloprid | 10:1, 5:1, 4:1, 3:1, 2:1, 1:1, 1:2, 1:3, 1:4, 1:5, or 1:10 |
| Compound of formula (II) + nitenpyram | 10:1, 5:1, 4:1, 3:1, 2:1, 1:1, 1:2, 1:3, 1:4, 1:5, or 1:10 |
| Compound of formula (II) + thiacloprid | 10:1, 5:1, 4:1, 3:1, 2:1, 1:1, 1:2, 1:3, 1:4, 1:5, or 1:10 |
| Compound of formula (II) + thiamethoxam | 10:1, 5:1, 4:1, 3:1, 2:1, 1:1, 1:2, 1:3, 1:4, 1:5, or 1:10 |
| Compound of formula (II) + nicotine | 10:1, 5:1, 4:1, 3:1, 2:1, 1:1, 1:2, 1:3, 1:4, 1:5, or 1:10 |
| Compound of formula (II) + sulfoxaflor | 10:1, 5:1, 4:1, 3:1, 2:1, 1:1, 1:2, 1:3, 1:4, 1:5, or 1:10 |
| Compound of formula (II) + flupyradifurone | 10:1, 5:1, 4:1, 3:1, 2:1, 1:1, 1:2, 1:3, 1:4, 1:5, or 1:10 |
| Compound of formula (II) + triflumezopyrim | 10:1, 5:1, 4:1, 3:1, 2:1, 1:1, 1:2, 1:3, 1:4, 1:5, or 1:10 |
| Compound of formula (II) + dicloromezotiaz | 10:1, 5:1, 4:1, 3:1, 2:1, 1:1, 1:2, 1:3, 1:4, 1:5, or 1:10 |
| Compound of formula (II) + flupyrimin | 10:1, 5:1, 4:1, 3:1, 2:1, 1:1, 1:2, 1:3, 1:4, 1:5, or 1:10 |
| Compound of formula (II) + spinetoram | 10:1, 5:1, 4:1, 3:1, 2:1, 1:1, 1:2, 1:3, 1:4, 1:5, or 1:10 |
| Compound of formula (II) + spinosad | 10:1, 5:1, 4:1, 3:1, 2:1, 1:1, 1:2, 1:3, 1:4, 1:5, or 1:10 |
| Compound of formula (II) + abamectin | 50:1, 40:1, 30:1, 25:1, 20:1, 10:1, 5:1, 1:1, 1:5, or 1:10 |
| Compound of formula (II) + emamectin-benzoate | 50:1, 40:1, 30:1, 25:1, 20:1, 10:1, 5:1, 1:1, 1:5, or 1:10 |
| Compound of formula (II) + lepimectin | 50:1, 40:1, 30:1, 25:1, 20:1, 10:1, 5:1, 1:1, 1:5, or 1:10 |
| Compound of formula (II) + milbemectin | 50:1, 40:1, 30:1, 25:1, 20:1, 10:1, 5:1, 1:1, 1:5, or 1:10 |
| Compound of formula (II) + doramectin | 50:1, 40:1, 30:1, 25:1, 20:1, 10:1, 5:1, 1:1, 1:5, or 1:10 |
| Compound of formula (II) + eprinomectin | 50:1, 40:1, 30:1, 25:1, 20:1, 10:1, 5:1, 1:1, 1:5, or 1:10 |
| Compound of formula (II) + ivermectin | 50:1, 40:1, 30:1, 25:1, 20:1, 10:1, 5:1, 1:1, 1:5, or 1:10 |
| Compound of formula (II) + moxidectin | 50:1, 40:1, 30:1, 25:1, 20:1, 10:1, 5:1, 1:1, 1:5, or 1:10 |
| Compound of formula (II) + selamectin | 50:1, 40:1, 30:1, 25:1, 20:1, 10:1, 5:1, 1:1, 1:5, or 1:10 |
| Compound of formula (II) + hydroprene | 10:1, 5:1, 4:1, 3:1, 2:1, 1:1, 1:2, 1:3, 1:4, 1:5, or 1:10 |
| Compound of formula (II) + kinoprene | 10:1, 5:1, 4:1, 3:1, 2:1, 1:1, 1:2, 1:3, 1:4, 1:5, or 1:10 |
| Compound of formula (II) + methoprene | 10:1, 5:1, 4:1, 3:1, 2:1, 1:1, 1:2, 1:3, 1:4, 1:5, or 1:10 |
| Compound of formula (II) + fenoxycarb | 10:1, 5:1, 4:1, 3:1, 2:1, 1:1, 1:2, 1:3, 1:4, 1:5, or 1:10 |
| Compound of formula (II) + pyriproxifen | 10:1, 5:1, 4:1, 3:1, 2:1, 1:1, 1:2, 1:3, 1:4, 1:5, or 1:10 |

TABLE 1-continued

| Component A + Component B | Preferable mass ratio |
|---|---|
| Compound of formula (II) + methyl bromide | 10:1, 5:1, 4:1, 3:1, 2:1, 1:1, 1:2, 1:3, 1:4, 1:5, or 1:10 |
| Compound of formula (II) + alkyl halides | 10:1, 5:1, 4:1, 3:1, 2:1, 1:1, 1:2, 1:3, 1:4, 1:5, or 1:10 |
| Compound of formula (II) + chloropicrin | 10:1, 5:1, 4:1, 3:1, 2:1, 1:1, 1:2, 1:3, 1:4, 1:5, or 1:10 |
| Compound of formula (II) + sodium aluminum fluoride | 10:1, 5:1, 4:1, 3:1, 2:1, 1:1, 1:2, 1:3, 1:4, 1:5, or 1:10 |
| Compound of formula (II) + sulfuryl fluoride | 10:1, 5:1, 4:1, 3:1, 2:1, 1:1, 1:2, 1:3, 1:4, 1:5, or 1:10 |
| Compound of formula (II) + borax | 10:1, 5:1, 4:1, 3:1, 2:1, 1:1, 1:2, 1:3, 1:4, 1:5, or 1:10 |
| Compound of formula (II) + boric acid | 10:1, 5:1, 4:1, 3:1, 2:1, 1:1, 1:2, 1:3, 1:4, 1:5, or 1:10 |
| Compound of formula (II) + disodium octaborate | 10:1, 5:1, 4:1, 3:1, 2:1, 1:1, 1:2, 1:3, 1:4, 1:5, or 1:10 |
| Compound of formula (II) + sodium borate | 10:1, 5:1, 4:1, 3:1, 2:1, 1:1, 1:2, 1:3, 1:4, 1:5, or 1:10 |
| Compound of formula (II) + sodium metaborate | 10:1, 5:1, 4:1, 3:1, 2:1, 1:1, 1:2, 1:3, 1:4, 1:5, or 1:10 |
| Compound of formula (II) + tartar emetic | 10:1, 5:1, 4:1, 3:1, 2:1, 1:1, 1:2, 1:3, 1:4, 1:5, or 1:10 |
| Compound of formula (II) + dazomet | 10:1, 5:1, 4:1, 3:1, 2:1, 1:1, 1:2, 1:3, 1:4, 1:5, or 1:10 |
| Compound of formula (II) + metam | 10:1, 5:1, 4:1, 3:1, 2:1, 1:1, 1:2, 1:3, 1:4, 1:5, or 1:10 |
| Compound of formula (II) + pymetrozine | 10:1, 5:1, 4:1, 3:1, 2:1, 1:1, 1:2, 1:3, 1:4, 1:5, or 1:10 |
| Compound of formula (II) + pyrifluquinazon | 10:1, 5:1, 4:1, 3:1, 2:1, 1:1, 1:2, 1:3, 1:4, 1:5, or 1:10 |
| Compound of formula (II) + afidopyropen | 10:1, 5:1, 4:1, 3:1, 2:1, 1:1, 1:2, 1:3, 1:4, 1:5, or 1:10 |
| Compound of formula (II) + clofentezine | 10:1, 5:1, 4:1, 3:1, 2:1, 1:1, 1:2, 1:3, 1:4, 1:5, or 1:10 |
| Compound of formula (II) + diflovidazin | 10:1, 5:1, 4:1, 3:1, 2:1, 1:1, 1:2, 1:3, 1:4, 1:5, or 1:10 |
| Compound of formula (II) + hexythiazox | 10:1, 5:1, 4:1, 3:1, 2:1, 1:1, 1:2, 1:3, 1:4, 1:5, or 1:10 |
| Compound of formula (II) + etoxazole | 10:1, 5:1, 4:1, 3:1, 2:1, 1:1, 1:2, 1:3, 1:4, 1:5, or 1:10 |
| Compound of formula (II) + B. t. subsp. *israelensis* | 10:1, 5:1, 4:1, 3:1, 2:1, 1:1, 1:2, 1:3, 1:4, 1:5, or 1:10 |
| Compound of formula (II) + B. t. subsp. *aizawai* | 10:1, 5:1, 4:1, 3:1, 2:1, 1:1, 1:2, 1:3, 1:4, 1:5, or 1:10 |
| Compound of formula (II) + B. t. subsp. *kurstaki* | 10:1, 5:1, 4:1, 3:1, 2:1, 1:1, 1:2, 1:3, 1:4, 1:5, or 1:10 |
| Compound of formula (II) + B. t. subsp. *tenebrionis* | 10:1, 5:1, 4:1, 3:1, 2:1, 1:1, 1:2, 1:3, 1:4, 1:5, or 1:10 |
| Compound of formula (II) + proteins contained in B. t. crops | 10:1, 5:1, 4:1, 3:1, 2:1, 1:1, 1:2, 1:3, 1:4, 1:5, or 1:10 |
| Compound of formula (II) + *Bacillus sphaericus* | 10:1, 5:1, 4:1, 3:1, 2:1, 1:1, 1:2, 1:3, 1:4, 1:5, or 1:10 |
| Compound of formula (II) + diafenthiuron | 10:1, 5:1, 4:1, 3:1, 2:1, 1:1, 1:2, 1:3, 1:4, 1:5, or 1:10 |
| Compound of formula (II) + azocyclotin | 10:1, 5:1, 4:1, 3:1, 2:1, 1:1, 1:2, 1:3, 1:4, 1:5, or 1:10 |
| Compound of formula (II) + cyhexatin | 10:1, 5:1, 4:1, 3:1, 2:1, 1:1, 1:2, 1:3, 1:4, 1:5, or 1:10 |
| Compound of formula (II) + fenbutatin-oxide | 10:1, 5:1, 4:1, 3:1, 2:1, 1:1, 1:2, 1:3, 1:4, 1:5, or 1:10 |
| Compound of formula (II) + propargite | 10:1, 5:1, 4:1, 3:1, 2:1, 1:1, 1:2, 1:3, 1:4, 1:5, or 1:10 |
| Compound of formula (II) + tetradifon | 10:1, 5:1, 4:1, 3:1, 2:1, 1:1, 1:2, 1:3, 1:4, 1:5, or 1:10 |
| Compound of formula (II) + chlorfenapyr | 10:1, 5:1, 4:1, 3:1, 2:1, 1:1, 1:2, 1:3, 1:4, 1:5, or 1:10 |
| Compound of formula (II) + DNOC (4,6-dinitro-o-cresol) | 10:1, 5:1, 4:1, 3:1, 2:1, 1:1, 1:2, 1:3, 1:4, 1:5, or 1:10 |
| Compound of formula (II) + sulfluramid | 10:1, 5:1, 4:1, 3:1, 2:1, 1:1, 1:2, 1:3, 1:4, 1:5, or 1:10 |
| Compound of formula (II) + bensultap | 10:1, 5:1, 4:1, 3:1, 2:1, 1:1, 1:2, 1:3, 1:4, 1:5, or 1:10 |
| Compound of formula (II) + cartap hydrochloride | 10:1, 5:1, 4:1, 3:1, 2:1, 1:1, 1:2, 1:3, 1:4, 1:5, or 1:10 |
| Compound of formula (II) + thiocyclam | 10:1, 5:1, 4:1, 3:1, 2:1, 1:1, 1:2, 1:3, 1:4, 1:5, or 1:10 |
| Compound of formula (II) + thiosultap-sodium | 10:1, 5:1, 4:1, 3:1, 2:1, 1:1, 1:2, 1:3, 1:4, 1:5, or 1:10 |
| Compound of formula (II) + bistrifluron | 10:1, 5:1, 4:1, 3:1, 2:1, 1:1, 1:2, 1:3, 1:4, 1:5, or 1:10 |
| Compound of formula (II) + chlorfluazuron | 10:1, 5:1, 4:1, 3:1, 2:1, 1:1, 1:2, 1:3, 1:4, 1:5, or 1:10 |
| Compound of formula (II) + diflubenzuron | 10:1, 5:1, 4:1, 3:1, 2:1, 1:1, 1:2, 1:3, 1:4, 1:5, or 1:10 |
| Compound of formula (II) + flucycloxuron | 10:1, 5:1, 4:1, 3:1, 2:1, 1:1, 1:2, 1:3, 1:4, 1:5, or 1:10 |
| Compound of formula (II) + flufenoxuron | 10:1, 5:1, 4:1, 3:1, 2:1, 1:1, 1:2, 1:3, 1:4, 1:5, or 1:10 |
| Compound of formula (II) + hexaflumuron | 10:1, 5:1, 4:1, 3:1, 2:1, 1:1, 1:2, 1:3, 1:4, 1:5, or 1:10 |
| Compound of formula (II) + lufenuron | 10:1, 5:1, 4:1, 3:1, 2:1, 1:1, 1:2, 1:3, 1:4, 1:5, or 1:10 |
| Compound of formula (II) + novaluron | 10:1, 5:1, 4:1, 3:1, 2:1, 1:1, 1:2, 1:3, 1:4, 1:5, or 1:10 |
| Compound of formula (II) + noviflumuron | 10:1, 5:1, 4:1, 3:1, 2:1, 1:1, 1:2, 1:3, 1:4, 1:5, or 1:10 |
| Compound of formula (II) + teflubenzuron | 10:1, 5:1, 4:1, 3:1, 2:1, 1:1, 1:2, 1:3, 1:4, 1:5, or 1:10 |
| Compound of formula (II) + triflumuron | 10:1, 5:1, 4:1, 3:1, 2:1, 1:1, 1:2, 1:3, 1:4, 1:5, or 1:10 |
| Compound of formula (II) + buprofezin | 10:1, 5:1, 4:1, 3:1, 2:1, 1:1, 1:2, 1:3, 1:4, 1:5, or 1:10 |
| Compound of formula (II) + cyromazine | 10:1, 5:1, 4:1, 3:1, 2:1, 1:1, 1:2, 1:3, 1:4, 1:5, or 1:10 |
| Compound of formula (II) + chromafenozide | 10:1, 5:1, 4:1, 3:1, 2:1, 1:1, 1:2, 1:3, 1:4, 1:5, or 1:10 |
| Compound of formula (II) + halofenozid | 10:1, 5:1, 4:1, 3:1, 2:1, 1:1, 1:2, 1:3, 1:4, 1:5, or 1:10 |
| Compound of formula (II) + methoxyfenozide | 10:1, 5:1, 4:1, 3:1, 2:1, 1:1, 1:2, 1:3, 1:4, 1:5, or 1:10 |
| Compound of formula (II) + tebufenozide | 10:1, 5:1, 4:1, 3:1, 2:1, 1:1, 1:2, 1:3, 1:4, 1:5, or 1:10 |
| Compound of formula (II) + amitraz | 10:1, 5:1, 4:1, 3:1, 2:1, 1:1, 1:2, 1:3, 1:4, 1:5, or 1:10 |
| Compound of formula (II) + hydramethylnon | 10:1, 5:1, 4:1, 3:1, 2:1, 1:1, 1:2, 1:3, 1:4, 1:5, or 1:10 |
| Compound of formula (II) + acequinocyl | 10:1, 5:1, 4:1, 3:1, 2:1, 1:1, 1:2, 1:3, 1:4, 1:5, or 1:10 |
| Compound of formula (II) + fluacrypyrim | 10:1, 5:1, 4:1, 3:1, 2:1, 1:1, 1:2, 1:3, 1:4, 1:5, or 1:10 |
| Compound of formula (II) + bifenazate | 10:1, 5:1, 4:1, 3:1, 2:1, 1:1, 1:2, 1:3, 1:4, 1:5, or 1:10 |
| Compound of formula (II) + fenazaquin | 10:1, 5:1, 4:1, 3:1, 2:1, 1:1, 1:2, 1:3, 1:4, 1:5, or 1:10 |
| Compound of formula (II) + fenpyroximate | 10:1, 5:1, 4:1, 3:1, 2:1, 1:1, 1:2, 1:3, 1:4, 1:5, or 1:10 |
| Compound of formula (II) + pyridaben | 10:1, 5:1, 4:1, 3:1, 2:1, 1:1, 1:2, 1:3, 1:4, 1:5, or 1:10 |
| Compound of formula (II) + pyrimidifen | 10:1, 5:1, 4:1, 3:1, 2:1, 1:1, 1:2, 1:3, 1:4, 1:5, or 1:10 |
| Compound of formula (II) + tebufenpyrad | 10:1, 5:1, 4:1, 3:1, 2:1, 1:1, 1:2, 1:3, 1:4, 1:5, or 1:10 |
| Compound of formula (II) + tolfenpyrad | 10:1, 5:1, 4:1, 3:1, 2:1, 1:1, 1:2, 1:3, 1:4, 1:5, or 1:10 |
| Compound of formula (II) + rotenone | 10:1, 5:1, 4:1, 3:1, 2:1, 1:1, 1:2, 1:3, 1:4, 1:5, or 1:10 |
| Compound of formula (II) + indoxacarb | 10:1, 5:1, 4:1, 3:1, 2:1, 1:1, 1:2, 1:3, 1:4, 1:5, or 1:10 |
| Compound of formula (II) + metaflumizone | 10:1, 5:1, 4:1, 3:1, 2:1, 1:1, 1:2, 1:3, 1:4, 1:5, or 1:10 |
| Compound of formula (II) + spirodiclofen | 10:1, 5:1, 4:1, 3:1, 2:1, 1:1, 1:2, 1:3, 1:4, 1:5, or 1:10 |
| Compound of formula (II) + spiromesifen | 10:1, 5:1, 4:1, 3:1, 2:1, 1:1, 1:2, 1:3, 1:4, 1:5, or 1:10 |
| Compound of formula (II) + spirotetramat | 10:1, 5:1, 4:1, 3:1, 2:1, 1:1, 1:2, 1:3, 1:4, 1:5, or 1:10 |
| Compound of formula (II) + spiropidion | 10:1, 5:1, 4:1, 3:1, 2:1, 1:1, 1:2, 1:3, 1:4, 1:5, or 1:10 |
| Compound of formula (II) + aluminum phosphide | 10:1, 5:1, 4:1, 3:1, 2:1, 1:1, 1:2, 1:3, 1:4, 1:5, or 1:10 |

TABLE 1-continued

| Component A + Component B | Preferable mass ratio |
|---|---|
| Compound of formula (II) + calcium phosphide | 10:1, 5:1, 4:1, 3:1, 2:1, 1:1, 1:2, 1:3, 1:4, 1:5, or 1:10 |
| Compound of formula (II) + phosphine | 10:1, 5:1, 4:1, 3:1, 2:1, 1:1, 1:2, 1:3, 1:4, 1:5, or 1:10 |
| Compound of formula (II) + zinc phosphide | 10:1, 5:1, 4:1, 3:1, 2:1, 1:1, 1:2, 1:3, 1:4, 1:5, or 1:10 |
| Compound of formula (II) + calcium cyanide | 10:1, 5:1, 4:1, 3:1, 2:1, 1:1, 1:2, 1:3, 1:4, 1:5, or 1:10 |
| Compound of formula (II) + sodium cyanide | 10:1, 5:1, 4:1, 3:1, 2:1, 1:1, 1:2, 1:3, 1:4, 1:5, or 1:10 |
| Compound of formula (II) + potassium cyanide | 10:1, 5:1, 4:1, 3:1, 2:1, 1:1, 1:2, 1:3, 1:4, 1:5, or 1:10 |
| Compound of formula (II) + cyenopyrafen | 10:1, 5:1, 4:1, 3:1, 2:1, 1:1, 1:2, 1:3, 1:4, 1:5, or 1:10 |
| Compound of formula (II) + cyflumetofen | 10:1, 5:1, 4:1, 3:1, 2:1, 1:1, 1:2, 1:3, 1:4, 1:5, or 1:10 |
| Compound of formula (II) + pyflubumide | 10:1, 5:1, 4:1, 3:1, 2:1, 1:1, 1:2, 1:3, 1:4, 1:5, or 1:10 |
| Compound of formula (II) + chlorantraniliprole | 10:1, 5:1, 4:1, 3:1, 2:1, 1:1, 1:2, 1:3, 1:4, 1:5, or 1:10 |
| Compound of formula (II) + cyantraniliprole | 10:1, 5:1, 4:1, 3:1, 2:1, 1:1, 1:2, 1:3, 1:4, 1:5, or 1:10 |
| Compound of formula (II) + cyclaniliprole | 10:1, 5:1, 4:1, 3:1, 2:1, 1:1, 1:2, 1:3, 1:4, 1:5, or 1:10 |
| Compound of formula (II) + flubendiamide | 10:1, 5:1, 4:1, 3:1, 2:1, 1:1, 1:2, 1:3, 1:4, 1:5, or 1:10 |
| Compound of formula (II) + cyhalodiamide | 10:1, 5:1, 4:1, 3:1, 2:1, 1:1, 1:2, 1:3, 1:4, 1:5, or 1:10 |
| Compound of formula (II) + tetrachlorantraniliprole | 10:1, 5:1, 4:1, 3:1, 2:1, 1:1, 1:2, 1:3, 1:4, 1:5, or 1:10 |
| Compound of formula (II) + tetraniliprole | 10:1, 5:1, 4:1, 3:1, 2:1, 1:1, 1:2, 1:3, 1:4, 1:5, or 1:10 |
| Compound of formula (II) + flonicamid | 10:1, 5:1, 4:1, 3:1, 2:1, 1:1, 1:2, 1:3, 1:4, 1:5, or 1:10 |
| Compound of formula (II) + broflanilide | 10:1, 5:1, 4:1, 3:1, 2:1, 1:1, 1:2, 1:3, 1:4, 1:5, or 1:10 |
| Compound of formula (II) + fluxametamide | 10:1, 5:1, 4:1, 3:1, 2:1, 1:1, 1:2, 1:3, 1:4, 1:5, or 1:10 |
| Compound of formula (II) + isocycloseram | 10:1, 5:1, 4:1, 3:1, 2:1, 1:1, 1:2, 1:3, 1:4, 1:5, or 1:10 |
| Compound of formula (II) + afoxolaner | 10:1, 5:1, 4:1, 3:1, 2:1, 1:1, 1:2, 1:3, 1:4, 1:5, or 1:10 |
| Compound of formula (II) + fluralaner | 10:1, 5:1, 4:1, 3:1, 2:1, 1:1, 1:2, 1:3, 1:4, 1:5, or 1:10 |
| Compound of formula (II) + lotilaner | 10:1, 5:1, 4:1, 3:1, 2:1, 1:1, 1:2, 1:3, 1:4, 1:5, or 1:10 |
| Compound of formula (II) + sarolaner | 10:1, 5:1, 4:1, 3:1, 2:1, 1:1, 1:2, 1:3, 1:4, 1:5, or 1:10 |
| Compound of formula (II) + azadirachtin | 10:1, 5:1, 4:1, 3:1, 2:1, 1:1, 1:2, 1:3, 1:4, 1:5, or 1:10 |
| Compound of formula (II) + benzoximate | 10:1, 5:1, 4:1, 3:1, 2:1, 1:1, 1:2, 1:3, 1:4, 1:5, or 1:10 |
| Compound of formula (II) + bromopropylate | 10:1, 5:1, 4:1, 3:1, 2:1, 1:1, 1:2, 1:3, 1:4, 1:5, or 1:10 |
| Compound of formula (II) + chinomethionat | 10:1, 5:1, 4:1, 3:1, 2:1, 1:1, 1:2, 1:3, 1:4, 1:5, or 1:10 |
| Compound of formula (II) + dicofol | 10:1, 5:1, 4:1, 3:1, 2:1, 1:1, 1:2, 1:3, 1:4, 1:5, or 1:10 |
| Compound of formula (II) + lime sulfur | 10:1, 5:1, 4:1, 3:1, 2:1, 1:1, 1:2, 1:3, 1:4, 1:5, or 1:10 |
| Compound of formula (II) + mancozeb | 10:1, 5:1, 4:1, 3:1, 2:1, 1:1, 1:2, 1:3, 1:4, 1:5, or 1:10 |
| Compound of formula (II) + pyridalyl | 10:1, 5:1, 4:1, 3:1, 2:1, 1:1, 1:2, 1:3, 1:4, 1:5, or 1:10 |
| Compound of formula (II) + sulfur | 10:1, 5:1, 4:1, 3:1, 2:1, 1:1, 1:2, 1:3, 1:4, 1:5, or 1:10 |
| Compound of formula (II) + acynonapyr | 10:1, 5:1, 4:1, 3:1, 2:1, 1:1, 1:2, 1:3, 1:4, 1:5, or 1:10 |
| Compound of formula (II) + benzpyrimoxan | 10:1, 5:1, 4:1, 3:1, 2:1, 1:1, 1:2, 1:3, 1:4, 1:5, or 1:10 |
| Compound of formula (II) + flometoquin | 10:1, 5:1, 4:1, 3:1, 2:1, 1:1, 1:2, 1:3, 1:4, 1:5, or 1:10 |
| Compound of formula (II) + fluhexafon | 10:1, 5:1, 4:1, 3:1, 2:1, 1:1, 1:2, 1:3, 1:4, 1:5, or 1:10 |
| Compound of formula (II) + oxazosulfyl | 10:1, 5:1, 4:1, 3:1, 2:1, 1:1, 1:2, 1:3, 1:4, 1:5, or 1:10 |
| Compound of formula (II) + tyclopyrazoflor | 10:1, 5:1, 4:1, 3:1, 2:1, 1:1, 1:2, 1:3, 1:4, 1:5, or 1:10 |

(III)

TABLE 2

| Component A + Component B | Preferable mass ratio |
|---|---|
| Compound of formula (III) + alanycarb | 10:1, 5:1, 4:1, 3:1, 2:1, 1:1, 1:2, 1:3, 1:4, 1:5, or 1:10 |
| Compound of formula (III) + aldicarb | 10:1, 5:1, 4:1, 3:1, 2:1, 1:1, 1:2, 1:3, 1:4, 1:5, or 1:10 |
| Compound of formula (III) + bendiocarb | 10:1, 5:1, 4:1, 3:1, 2:1, 1:1, 1:2, 1:3, 1:4, 1:5, or 1:10 |
| Compound of formula (III) + benfuracarb | 10:1, 5:1, 4:1, 3:1, 2:1, 1:1, 1:2, 1:3, 1:4, 1:5, or 1:10 |
| Compound of formula (III) + butocarboxim | 10:1, 5:1, 4:1, 3:1, 2:1, 1:1, 1:2, 1:3, 1:4, 1:5, or 1:10 |
| Compound of formula (III) + butoxycarboxim | 10:1, 5:1, 4:1, 3:1, 2:1, 1:1, 1:2, 1:3, 1:4, 1:5, or 1:10 |
| Compound of formula (III) + carbaryl | 10:1, 5:1, 4:1, 3:1, 2:1, 1:1, 1:2, 1:3, 1:4, 1:5, or 1:10 |
| Compound of formula (III) + carbofuran | 10:1, 5:1, 4:1, 3:1, 2:1, 1:1, 1:2, 1:3, 1:4, 1:5, or 1:10 |
| Compound of formula (III) + carbosulfan | 10:1, 5:1, 4:1, 3:1, 2:1, 1:1, 1:2, 1:3, 1:4, 1:5, or 1:10 |
| Compound of formula (III) + ethiofencarb | 10:1, 5:1, 4:1, 3:1, 2:1, 1:1, 1:2, 1:3, 1:4, 1:5, or 1:10 |
| Compound of formula (III) + fenobucarb | 10:1, 5:1, 4:1, 3:1, 2:1, 1:1, 1:2, 1:3, 1:4, 1:5, or 1:10 |
| Compound of formula (III) + formetanate | 10:1, 5:1, 4:1, 3:1, 2:1, 1:1, 1:2, 1:3, 1:4, 1:5, or 1:10 |
| Compound of formula (III) + furathiocarb | 10:1, 5:1, 4:1, 3:1, 2:1, 1:1, 1:2, 1:3, 1:4, 1:5, or 1:10 |
| Compound of formula (III) + isoprocarb | 10:1, 5:1, 4:1, 3:1, 2:1, 1:1, 1:2, 1:3, 1:4, 1:5, or 1:10 |
| Compound of formula (III) + methiocarb | 10:1, 5:1, 4:1, 3:1, 2:1, 1:1, 1:2, 1:3, 1:4, 1:5, or 1:10 |
| Compound of formula (III) + methomyl | 10:1, 5:1, 4:1, 3:1, 2:1, 1:1, 1:2, 1:3, 1:4, 1:5, or 1:10 |

TABLE 2-continued

| Component A + Component B | Preferable mass ratio |
| --- | --- |
| Compound of formula (III) + metolcarb | 10:1, 5:1, 4:1, 3:1, 2:1, 1:1, 1:2, 1:3, 1:4, 1:5, or 1:10 |
| Compound of formula (III) + oxamyl | 10:1, 5:1, 4:1, 3:1, 2:1, 1:1, 1:2, 1:3, 1:4, 1:5, or 1:10 |
| Compound of formula (III) + pirimicarb | 10:1, 5:1, 4:1, 3:1, 2:1, 1:1, 1:2, 1:3, 1:4, 1:5, or 1:10 |
| Compound of formula (III) + propoxur | 10:1, 5:1, 4:1, 3:1, 2:1, 1:1, 1:2, 1:3, 1:4, 1:5, or 1:10 |
| Compound of formula (III) + thiodicarb | 10:1, 5:1, 4:1, 3:1, 2:1, 1:1, 1:2, 1:3, 1:4, 1:5, or 1:10 |
| Compound of formula (III) + thiofanox | 10:1, 5:1, 4:1, 3:1, 2:1, 1:1, 1:2, 1:3, 1:4, 1:5, or 1:10 |
| Compound of formula (III) + triazamate | 10:1, 5:1, 4:1, 3:1, 2:1, 1:1, 1:2, 1:3, 1:4, 1:5, or 1:10 |
| Compound of formula (III) + trimethacarb | 10:1, 5:1, 4:1, 3:1, 2:1, 1:1, 1:2, 1:3, 1:4, 1:5, or 1:10 |
| Compound of formula (III) + XMC | 10:1, 5:1, 4:1, 3:1, 2:1, 1:1, 1:2, 1:3, 1:4, 1:5, or 1:10 |
| Compound of formula (III) + xylylcarb | 10:1, 5:1, 4:1, 3:1, 2:1, 1:1, 1:2, 1:3, 1:4, 1:5, or 1:10 |
| Compound of formula (III) + acephate | 10:1, 5:1, 4:1, 3:1, 2:1, 1:1, 1:2, 1:3, 1:4, 1:5, or 1:10 |
| Compound of formula (III) + azamethiphos | 10:1, 5:1, 4:1, 3:1, 2:1, 1:1, 1:2, 1:3, 1:4, 1:5, or 1:10 |
| Compound of formula (III) + azinphos-ethyl | 10:1, 5:1, 4:1, 3:1, 2:1, 1:1, 1:2, 1:3, 1:4, 1:5, or 1:10 |
| Compound of formula (III) + azinphos-methyl | 10:1, 5:1, 4:1, 3:1, 2:1, 1:1, 1:2, 1:3, 1:4, 1:5, or 1:10 |
| Compound of formula (III) + cadusafos | 10:1, 5:1, 4:1, 3:1, 2:1, 1:1, 1:2, 1:3, 1:4, 1:5, or 1:10 |
| Compound of formula (III) + chlorethoxyfos | 10:1, 5:1, 4:1, 3:1, 2:1, 1:1, 1:2, 1:3, 1:4, 1:5, or 1:10 |
| Compound of formula (III) + chlorfenvinphos | 10:1, 5:1, 4:1, 3:1, 2:1, 1:1, 1:2, 1:3, 1:4, 1:5, or 1:10 |
| Compound of formula (III) + chlormephos | 10:1, 5:1, 4:1, 3:1, 2:1, 1:1, 1:2, 1:3, 1:4, 1:5, or 1:10 |
| Compound of formula (III) + chlorpyrifos | 10:1, 5:1, 4:1, 3:1, 2:1, 1:1, 1:2, 1:3, 1:4, 1:5, or 1:10 |
| Compound of formula (III) + chlorpyrifos-methyl | 10:1, 5:1, 4:1, 3:1, 2:1, 1:1, 1:2, 1:3, 1:4, 1:5, or 1:10 |
| Compound of formula (III) + coumaphos | 10:1, 5:1, 4:1, 3:1, 2:1, 1:1, 1:2, 1:3, 1:4, 1:5, or 1:10 |
| Compound of formula (III) + cyanophos | 10:1, 5:1, 4:1, 3:1, 2:1, 1:1, 1:2, 1:3, 1:4, 1:5, or 1:10 |
| Compound of formula (III) + demeton-S-methyl | 10:1, 5:1, 4:1, 3:1, 2:1, 1:1, 1:2, 1:3, 1:4, 1:5, or 1:10 |
| Compound of formula (III) + diazinon | 10:1, 5:1, 4:1, 3:1, 2:1, 1:1, 1:2, 1:3, 1:4, 1:5, or 1:10 |
| Compound of formula (III) + dichlorvos/DDVP | 10:1, 5:1, 4:1, 3:1, 2:1, 1:1, 1:2, 1:3, 1:4, 1:5, or 1:10 |
| Compound of formula (III) + dicrotophos | 10:1, 5:1, 4:1, 3:1, 2:1, 1:1, 1:2, 1:3, 1:4, 1:5, or 1:10 |
| Compound of formula (III) + dimethoate | 10:1, 5:1, 4:1, 3:1, 2:1, 1:1, 1:2, 1:3, 1:4, 1:5, or 1:10 |
| Compound of formula (III) + dimethylvinphos | 10:1, 5:1, 4:1, 3:1, 2:1, 1:1, 1:2, 1:3, 1:4, 1:5, or 1:10 |
| Compound of formula (III) + disulfoton | 10:1, 5:1, 4:1, 3:1, 2:1, 1:1, 1:2, 1:3, 1:4, 1:5, or 1:10 |
| Compound of formula (III) + EPN | 10:1, 5:1, 4:1, 3:1, 2:1, 1:1, 1:2, 1:3, 1:4, 1:5, or 1:10 |
| Compound of formula (III) + ethion | 10:1, 5:1, 4:1, 3:1, 2:1, 1:1, 1:2, 1:3, 1:4, 1:5, or 1:10 |
| Compound of formula (III) + ethoprophos | 10:1, 5:1, 4:1, 3:1, 2:1, 1:1, 1:2, 1:3, 1:4, 1:5, or 1:10 |
| Compound of formula (III) + famphur | 10:1, 5:1, 4:1, 3:1, 2:1, 1:1, 1:2, 1:3, 1:4, 1:5, or 1:10 |
| Compound of formula (III) + fenamiphos | 10:1, 5:1, 4:1, 3:1, 2:1, 1:1, 1:2, 1:3, 1:4, 1:5, or 1:10 |
| Compound of formula (III) + fenitrothion | 10:1, 5:1, 4:1, 3:1, 2:1, 1:1, 1:2, 1:3, 1:4, 1:5, or 1:10 |
| Compound of formula (III) + fenthion | 10:1, 5:1, 4:1, 3:1, 2:1, 1:1, 1:2, 1:3, 1:4, 1:5, or 1:10 |
| Compound of formula (III) + fosthiazate | 10:1, 5:1, 4:1, 3:1, 2:1, 1:1, 1:2, 1:3, 1:4, 1:5, or 1:10 |
| Compound of formula (III) + heptenophos | 10:1, 5:1, 4:1, 3:1, 2:1, 1:1, 1:2, 1:3, 1:4, 1:5, or 1:10 |
| Compound of formula (III) + imicyafos | 10:1, 5:1, 4:1, 3:1, 2:1, 1:1, 1:2, 1:3, 1:4, 1:5, or 1:10 |
| Compound of formula (III) + isofenphos | 10:1, 5:1, 4:1, 3:1, 2:1, 1:1, 1:2, 1:3, 1:4, 1:5, or 1:10 |
| Compound of formula (III) + isopropyl O-(methoxyaminothio-phosphoryl)salicylate | 10:1, 5:1, 4:1, 3:1, 2:1, 1:1, 1:2, 1:3, 1:4, 1:5, or 1:10 |
| Compound of formula (III) + isoxathion | 10:1, 5:1, 4:1, 3:1, 2:1, 1:1, 1:2, 1:3, 1:4, 1:5, or 1:10 |
| Compound of formula (III) + malathion | 10:1, 5:1, 4:1, 3:1, 2:1, 1:1, 1:2, 1:3, 1:4, 1:5, or 1:10 |
| Compound of formula (III) + mecarbam | 10:1, 5:1, 4:1, 3:1, 2:1, 1:1, 1:2, 1:3, 1:4, 1:5, or 1:10 |
| Compound of formula (III) + methamidophos | 10:1, 5:1, 4:1, 3:1, 2:1, 1:1, 1:2, 1:3, 1:4, 1:5, or 1:10 |
| Compound of formula (III) + methidathion | 10:1, 5:1, 4:1, 3:1, 2:1, 1:1, 1:2, 1:3, 1:4, 1:5, or 1:10 |
| Compound of formula (III) + mevinphos | 10:1, 5:1, 4:1, 3:1, 2:1, 1:1, 1:2, 1:3, 1:4, 1:5, or 1:10 |
| Compound of formula (III) + monocrotophos | 10:1, 5:1, 4:1, 3:1, 2:1, 1:1, 1:2, 1:3, 1:4, 1:5, or 1:10 |
| Compound of formula (III) + naled | 10:1, 5:1, 4:1, 3:1, 2:1, 1:1, 1:2, 1:3, 1:4, 1:5, or 1:10 |
| Compound of formula (III) + omethoate | 10:1, 5:1, 4:1, 3:1, 2:1, 1:1, 1:2, 1:3, 1:4, 1:5, or 1:10 |
| Compound of formula (III) + oxydemeton-methyl | 10:1, 5:1, 4:1, 3:1, 2:1, 1:1, 1:2, 1:3, 1:4, 1:5, or 1:10 |
| Compound of formula (III) + parathion | 10:1, 5:1, 4:1, 3:1, 2:1, 1:1, 1:2, 1:3, 1:4, 1:5, or 1:10 |
| Compound of formula (III) + parathion-methyl | 10:1, 5:1, 4:1, 3:1, 2:1, 1:1, 1:2, 1:3, 1:4, 1:5, or 1:10 |
| Compound of formula (III) + phenthoate | 10:1, 5:1, 4:1, 3:1, 2:1, 1:1, 1:2, 1:3, 1:4, 1:5, or 1:10 |
| Compound of formula (III) + phorate | 10:1, 5:1, 4:1, 3:1, 2:1, 1:1, 1:2, 1:3, 1:4, 1:5, or 1:10 |
| Compound of formula (III) + phosalone | 10:1, 5:1, 4:1, 3:1, 2:1, 1:1, 1:2, 1:3, 1:4, 1:5, or 1:10 |
| Compound of formula (III) + phosmet | 10:1, 5:1, 4:1, 3:1, 2:1, 1:1, 1:2, 1:3, 1:4, 1:5, or 1:10 |
| Compound of formula (III) + phosphamidon | 10:1, 5:1, 4:1, 3:1, 2:1, 1:1, 1:2, 1:3, 1:4, 1:5, or 1:10 |
| Compound of formula (III) + phoxim | 10:1, 5:1, 4:1, 3:1, 2:1, 1:1, 1:2, 1:3, 1:4, 1:5, or 1:10 |
| Compound of formula (III) + pirimiphos-methyl | 10:1, 5:1, 4:1, 3:1, 2:1, 1:1, 1:2, 1:3, 1:4, 1:5, or 1:10 |
| Compound of formula (III) + profenofos | 10:1, 5:1, 4:1, 3:1, 2:1, 1:1, 1:2, 1:3, 1:4, 1:5, or 1:10 |
| Compound of formula (III) + propetamphos) | 10:1, 5:1, 4:1, 3:1, 2:1, 1:1, 1:2, 1:3, 1:4, 1:5, or 1:10 |
| Compound of formula (III) + prothiofos | 10:1, 5:1, 4:1, 3:1, 2:1, 1:1, 1:2, 1:3, 1:4, 1:5, or 1:10 |
| Compound of formula (III) + pyraclofos | 10:1, 5:1, 4:1, 3:1, 2:1, 1:1, 1:2, 1:3, 1:4, 1:5, or 1:10 |
| Compound of formula (III) + pyridaphenthion | 10:1, 5:1, 4:1, 3:1, 2:1, 1:1, 1:2, 1:3, 1:4, 1:5, or 1:10 |
| Compound of formula (III) + quinalphos | 10:1, 5:1, 4:1, 3:1, 2:1, 1:1, 1:2, 1:3, 1:4, 1:5, or 1:10 |
| Compound of formula (III) + sulfotep | 10:1, 5:1, 4:1, 3:1, 2:1, 1:1, 1:2, 1:3, 1:4, 1:5, or 1:10 |
| Compound of formula (III) + tebupirimfos | 10:1, 5:1, 4:1, 3:1, 2:1, 1:1, 1:2, 1:3, 1:4, 1:5, or 1:10 |
| Compound of formula (III) + temephos | 10:1, 5:1, 4:1, 3:1, 2:1, 1:1, 1:2, 1:3, 1:4, 1:5, or 1:10 |
| Compound of formula (III) + terbufos | 10:1, 5:1, 4:1, 3:1, 2:1, 1:1, 1:2, 1:3, 1:4, 1:5, or 1:10 |
| Compound of formula (III) + tetrachlorvinphos | 10:1, 5:1, 4:1, 3:1, 2:1, 1:1, 1:2, 1:3, 1:4, 1:5, or 1:10 |
| Compound of formula (III) + thiometon | 10:1, 5:1, 4:1, 3:1, 2:1, 1:1, 1:2, 1:3, 1:4, 1:5, or 1:10 |
| Compound of formula (III) + triazophos | 10:1, 5:1, 4:1, 3:1, 2:1, 1:1, 1:2, 1:3, 1:4, 1:5, or 1:10 |
| Compound of formula (III) + trichlorfon | 10:1, 5:1, 4:1, 3:1, 2:1, 1:1, 1:2, 1:3, 1:4, 1:5, or 1:10 |
| Compound of formula (III) + vamidothion | 10:1, 5:1, 4:1, 3:1, 2:1, 1:1, 1:2, 1:3, 1:4, 1:5, or 1:10 |
| Compound of formula (III) + chlordane | 10:1, 5:1, 4:1, 3:1, 2:1, 1:1, 1:2, 1:3, 1:4, 1:5, or 1:10 |
| Compound of formula (III) + endosulfan | 10:1, 5:1, 4:1, 3:1, 2:1, 1:1, 1:2, 1:3, 1:4, 1:5, or 1:10 |

TABLE 2-continued

| Component A + Component B | Preferable mass ratio |
|---|---|
| Compound of formula (III) + ethiprole | 10:1, 5:1, 4:1, 3:1, 2:1, 1:1, 1:2, 1:3, 1:4, 1:5, or 1:10 |
| Compound of formula (III) + fipronil | 10:1, 5:1, 4:1, 3:1, 2:1, 1:1, 1:2, 1:3, 1:4, 1:5, or 1:10 |
| Compound of formula (III) + flufiprole | 10:1, 5:1, 4:1, 3:1, 2:1, 1:1, 1:2, 1:3, 1:4, 1:5, or 1:10 |
| Compound of formula (III) + acrinathrin | 10:1, 5:1, 4:1, 3:1, 2:1, 1:1, 1:2, 1:3, 1:4, 1:5, or 1:10 |
| Compound of formula (III) + allethrin | 10:1, 5:1, 4:1, 3:1, 2:1, 1:1, 1:2, 1:3, 1:4, 1:5, or 1:10 |
| Compound of formula (III) + d-cis-trans allethrin | 10:1, 5:1, 4:1, 3:1, 2:1, 1:1, 1:2, 1:3, 1:4, 1:5, or 1:10 |
| Compound of formula (III) + d-trans allethrin | 10:1, 5:1, 4:1, 3:1, 2:1, 1:1, 1:2, 1:3, 1:4, 1:5, or 1:10 |
| Compound of formula (III) + bifenthrin | 10:1, 5:1, 4:1, 3:1, 2:1, 1:1, 1:2, 1:3, 1:4, 1:5, or 1:10 |
| Compound of formula (III) + bioallethrin | 10:1, 5:1, 4:1, 3:1, 2:1, 1:1, 1:2, 1:3, 1:4, 1:5, or 1:10 |
| Compound of formula (III) + bioallethrin S-cyclopentenyl-isomer | 10:1, 5:1, 4:1, 3:1, 2:1, 1:1, 1:2, 1:3, 1:4, 1:5, or 1:10 |
| Compound of formula (III) + bioresmethrin | 10:1, 5:1, 4:1, 3:1, 2:1, 1:1, 1:2, 1:3, 1:4, 1:5, or 1:10 |
| Compound of formula (III) + cycloprothrin | 10:1, 5:1, 4:1, 3:1, 2:1, 1:1, 1:2, 1:3, 1:4, 1:5, or 1:10 |
| Compound of formula (III) + cyfluthrin | 10:1, 5:1, 4:1, 3:1, 2:1, 1:1, 1:2, 1:3, 1:4, 1:5, or 1:10 |
| Compound of formula (III) + β-cyfluthrin | 10:1, 5:1, 4:1, 3:1, 2:1, 1:1, 1:2, 1:3, 1:4, 1:5, or 1:10 |
| Compound of formula (III) + cyhalothrin | 10:1, 5:1, 4:1, 3:1, 2:1, 1:1, 1:2, 1:3, 1:4, 1:5, or 1:10 |
| Compound of formula (III) + λ-cyhalothrin | 10:1, 5:1, 4:1, 3:1, 2:1, 1:1, 1:2, 1:3, 1:4, 1:5, or 1:10 |
| Compound of formula (III) + γ-cyhalothrin | 10:1, 5:1, 4:1, 3:1, 2:1, 1:1, 1:2, 1:3, 1:4, 1:5, or 1:10 |
| Compound of formula (III) + cypermethrin | 10:1, 5:1, 4:1, 3:1, 2:1, 1:1, 1:2, 1:3, 1:4, 1:5, or 1:10 |
| Compound of formula (III) + α-cypermethrin | 10:1, 5:1, 4:1, 3:1, 2:1, 1:1, 1:2, 1:3, 1:4, 1:5, or 1:10 |
| Compound of formula (III) + β-cypermethrin | 10:1, 5:1, 4:1, 3:1, 2:1, 1:1, 1:2, 1:3, 1:4, 1:5, or 1:10 |
| Compound of formula (III) + θ-cypermethrin | 10:1, 5:1, 4:1, 3:1, 2:1, 1:1, 1:2, 1:3, 1:4, 1:5, or 1:10 |
| Compound of formula (III) + ζ-cypermethrin | 10:1, 5:1, 4:1, 3:1, 2:1, 1:1, 1:2, 1:3, 1:4, 1:5, or 1:10 |
| Compound of formula (III) + cyphenothrin[(1R)-trans-isomers] | 10:1, 5:1, 4:1, 3:1, 2:1, 1:1, 1:2, 1:3, 1:4, 1:5, or 1:10 |
| Compound of formula (III) + deltamethrin | 10:1, 5:1, 4:1, 3:1, 2:1, 1:1, 1:2, 1:3, 1:4, 1:5, or 1:10 |
| Compound of formula (III) + empenthrin[(EZ)-(1R)-isomers] | 10:1, 5:1, 4:1, 3:1, 2:1, 1:1, 1:2, 1:3, 1:4, 1:5, or 1:10 |
| Compound of formula (III) + esfenvalerate | 10:1, 5:1, 4:1, 3:1, 2:1, 1:1, 1:2, 1:3, 1:4, 1:5, or 1:10 |
| Compound of formula (III) + etofenprox | 10:1, 5:1, 4:1, 3:1, 2:1, 1:1, 1:2, 1:3, 1:4, 1:5, or 1:10 |
| Compound of formula (III) + fenpropathrin | 10:1, 5:1, 4:1, 3:1, 2:1, 1:1, 1:2, 1:3, 1:4, 1:5, or 1:10 |
| Compound of formula (III) + fenvalerate | 10:1, 5:1, 4:1, 3:1, 2:1, 1:1, 1:2, 1:3, 1:4, 1:5, or 1:10 |
| Compound of formula (III) + flucythrinate | 10:1, 5:1, 4:1, 3:1, 2:1, 1:1, 1:2, 1:3, 1:4, 1:5, or 1:10 |
| Compound of formula (III) + flumethrin | 10:1, 5:1, 4:1, 3:1, 2:1, 1:1, 1:2, 1:3, 1:4, 1:5, or 1:10 |
| Compound of formula (III) + τ-fluvalinate | 10:1, 5:1, 4:1, 3:1, 2:1, 1:1, 1:2, 1:3, 1:4, 1:5, or 1:10 |
| Compound of formula (III) + halfenprox | 10:1, 5:1, 4:1, 3:1, 2:1, 1:1, 1:2, 1:3, 1:4, 1:5, or 1:10 |
| Compound of formula (III) + imiprothrin | 10:1, 5:1, 4:1, 3:1, 2:1, 1:1, 1:2, 1:3, 1:4, 1:5, or 1:10 |
| Compound of formula (III) + kadethrin | 10:1, 5:1, 4:1, 3:1, 2:1, 1:1, 1:2, 1:3, 1:4, 1:5, or 1:10 |
| Compound of formula (III) + permethrin | 10:1, 5:1, 4:1, 3:1, 2:1, 1:1, 1:2, 1:3, 1:4, 1:5, or 1:10 |
| Compound of formula (III) + phenothrin[(1R)-trans-isomer] | 10:1, 5:1, 4:1, 3:1, 2:1, 1:1, 1:2, 1:3, 1:4, 1:5, or 1:10 |
| Compound of formula (III) + prallethrin | 10:1, 5:1, 4:1, 3:1, 2:1, 1:1, 1:2, 1:3, 1:4, 1:5, or 1:10 |
| Compound of formula (III) + pyrethrins | 10:1, 5:1, 4:1, 3:1, 2:1, 1:1, 1:2, 1:3, 1:4, 1:5, or 1:10 |
| Compound of formula (III) + resmethrin | 10:1, 5:1, 4:1, 3:1, 2:1, 1:1, 1:2, 1:3, 1:4, 1:5, or 1:10 |
| Compound of formula (III) + silafluofen | 10:1, 5:1, 4:1, 3:1, 2:1, 1:1, 1:2, 1:3, 1:4, 1:5, or 1:10 |
| Compound of formula (III) + tefluthrin | 10:1, 5:1, 4:1, 3:1, 2:1, 1:1, 1:2, 1:3, 1:4, 1:5, or 1:10 |
| Compound of formula (III) + tetramethrin | 10:1, 5:1, 4:1, 3:1, 2:1, 1:1, 1:2, 1:3, 1:4, 1:5, or 1:10 |
| Compound of formula (III) + tetramethrin[(1R)-isomers] | 10:1, 5:1, 4:1, 3:1, 2:1, 1:1, 1:2, 1:3, 1:4, 1:5, or 1:10 |
| Compound of formula (III) + tralomethrin | 10:1, 5:1, 4:1, 3:1, 2:1, 1:1, 1:2, 1:3, 1:4, 1:5, or 1:10 |
| Compound of formula (III) + transfluthrin | 10:1, 5:1, 4:1, 3:1, 2:1, 1:1, 1:2, 1:3, 1:4, 1:5, or 1:10 |
| Compound of formula (III) + κ-bifenthrin | 10:1, 5:1, 4:1, 3:1, 2:1, 1:1, 1:2, 1:3, 1:4, 1:5, or 1:10 |
| Compound of formula (III) + chloroprallethrin | 10:1, 5:1, 4:1, 3:1, 2:1, 1:1, 1:2, 1:3, 1:4, 1:5, or 1:10 |
| Compound of formula (III) + heptafluthrin | 10:1, 5:1, 4:1, 3:1, 2:1, 1:1, 1:2, 1:3, 1:4, 1:5, or 1:10 |
| Compound of formula (III) + meperfluthrin | 10:1, 5:1, 4:1, 3:1, 2:1, 1:1, 1:2, 1:3, 1:4, 1:5, or 1:10 |
| Compound of formula (III) + ε-metofluthrin | 10:1, 5:1, 4:1, 3:1, 2:1, 1:1, 1:2, 1:3, 1:4, 1:5, or 1:10 |
| Compound of formula (III) + momfluorothrin | 10:1, 5:1, 4:1, 3:1, 2:1, 1:1, 1:2, 1:3, 1:4, 1:5, or 1:10 |
| Compound of formula (III) + κ-tefluthrin | 10:1, 5:1, 4:1, 3:1, 2:1, 1:1, 1:2, 1:3, 1:4, 1:5, or 1:10 |
| Compound of formula (III) + ε-momfluorothrin | 10:1, 5:1, 4:1, 3:1, 2:1, 1:1, 1:2, 1:3, 1:4, 1:5, or 1:10 |
| Compound of formula (III) + tetramethylfluthrin | 10:1, 5:1, 4:1, 3:1, 2:1, 1:1, 1:2, 1:3, 1:4, 1:5, or 1:10 |
| Compound of formula (III) + bioethanomethrin | 10:1, 5:1, 4:1, 3:1, 2:1, 1:1, 1:2, 1:3, 1:4, 1:5, or 1:10 |
| Compound of formula (III) + DDT | 10:1, 5:1, 4:1, 3:1, 2:1, 1:1, 1:2, 1:3, 1:4, 1:5, or 1:10 |
| Compound of formula (III) + methoxychlor | 10:1, 5:1, 4:1, 3:1, 2:1, 1:1, 1:2, 1:3, 1:4, 1:5, or 1:10 |
| Compound of formula (III) + acetamiprid | 10:1, 5:1, 4:1, 3:1, 2:1, 1:1, 1:2, 1:3, 1:4, 1:5, or 1:10 |
| Compound of formula (III) + clothianidin | 10:1, 5:1, 4:1, 3:1, 2:1, 1:1, 1:2, 1:3, 1:4, 1:5, or 1:10 |
| Compound of formula (III) + dinotefuran | 10:1, 5:1, 4:1, 3:1, 2:1, 1:1, 1:2, 1:3, 1:4, 1:5, or 1:10 |
| Compound of formula (III) + imidacloprid | 10:1, 5:1, 4:1, 3:1, 2:1, 1:1, 1:2, 1:3, 1:4, 1:5, or 1:10 |
| Compound of formula (III) + nitenpyram | 10:1, 5:1, 4:1, 3:1, 2:1, 1:1, 1:2, 1:3, 1:4, 1:5, or 1:10 |
| Compound of formula (III) + thiacloprid | 10:1, 5:1, 4:1, 3:1, 2:1, 1:1, 1:2, 1:3, 1:4, 1:5, or 1:10 |
| Compound of formula (III) + thiamethoxam | 10:1, 5:1, 4:1, 3:1, 2:1, 1:1, 1:2, 1:3, 1:4, 1:5, or 1:10 |
| Compound of formula (III) + nicotine | 10:1, 5:1, 4:1, 3:1, 2:1, 1:1, 1:2, 1:3, 1:4, 1:5, or 1:10 |
| Compound of formula (III) + sulfoxaflor | 10:1, 5:1, 4:1, 3:1, 2:1, 1:1, 1:2, 1:3, 1:4, 1:5, or 1:10 |
| Compound of formula (III) + flupyradifurone | 10:1, 5:1, 4:1, 3:1, 2:1, 1:1, 1:2, 1:3, 1:4, 1:5, or 1:10 |
| Compound of formula (III) + triflumezopyrim | 10:1, 5:1, 4:1, 3:1, 2:1, 1:1, 1:2, 1:3, 1:4, 1:5, or 1:10 |
| Compound of formula (III) + dicloromezotiaz | 10:1, 5:1, 4:1, 3:1, 2:1, 1:1, 1:2, 1:3, 1:4, 1:5, or 1:10 |
| Compound of formula (III) + flupyrimin | 10:1, 5:1, 4:1, 3:1, 2:1, 1:1, 1:2, 1:3, 1:4, 1:5, or 1:10 |
| Compound of formula (III) + spinetoram | 10:1, 5:1, 4:1, 3:1, 2:1, 1:1, 1:2, 1:3, 1:4, 1:5, or 1:10 |
| Compound of formula (III) + spinosad | 10:1, 5:1, 4:1, 3:1, 2:1, 1:1, 1:2, 1:3, 1:4, 1:5, or 1:10 |

TABLE 2-continued

| Component A + Component B | Preferable mass ratio |
|---|---|
| Compound of formula (III) + abamectin | 50:1, 40:1, 30:1, 25:1, 20:1, 10:1, 5:1, 1:1, 1:5, or 1:10 |
| Compound of formula (III) + emamectin-benzoate | 50:1, 40:1, 30:1, 25:1, 20:1, 10:1, 5:1, 1:1, 1:5, or 1:10 |
| Compound of formula (III) + lepimectin | 50:1, 40:1, 30:1, 25:1, 20:1, 10:1, 5:1, 1:1, 1:5, or 1:10 |
| Compound of formula (III) + milbemectin | 50:1, 40:1, 30:1, 25:1, 20:1, 10:1, 5:1, 1:1, 1:5, or 1:10 |
| Compound of formula (III) + doramectin | 50:1, 40:1, 30:1, 25:1, 20:1, 10:1, 5:1, 1:1, 1:5, or 1:10 |
| Compound of formula (III) + eprinomectin | 50:1, 40:1, 30:1, 25:1, 20:1, 10:1, 5:1, 1:1, 1:5, or 1:10 |
| Compound of formula (III) + ivermectin | 50:1, 40:1, 30:1, 25:1, 20:1, 10:1, 5:1, 1:1, 1:5, or 1:10 |
| Compound of formula (III) + moxidectin | 50:1, 40:1, 30:1, 25:1, 20:1, 10:1, 5:1, 1:1, 1:5, or 1:10 |
| Compound of formula (III) + selamectin | 50:1, 40:1, 30:1, 25:1, 20:1, 10:1, 5:1, 1:1, 1:5, or 1:10 |
| Compound of formula (III) + hydroprene | 10:1, 5:1, 4:1, 3:1, 2:1, 1:1, 1:2, 1:3, 1:4, 1:5, or 1:10 |
| Compound of formula (III) + kinoprene | 10:1, 5:1, 4:1, 3:1, 2:1, 1:1, 1:2, 1:3, 1:4, 1:5, or 1:10 |
| Compound of formula (III) + methoprene | 10:1, 5:1, 4:1, 3:1, 2:1, 1:1, 1:2, 1:3, 1:4, 1:5, or 1:10 |
| Compound of formula (III) + fenoxycarb | 10:1, 5:1, 4:1, 3:1, 2:1, 1:1, 1:2, 1:3, 1:4, 1:5, or 1:10 |
| Compound of formula (III) + pyriproxifen | 10:1, 5:1, 4:1, 3:1, 2:1, 1:1, 1:2, 1:3, 1:4, 1:5, or 1:10 |
| Compound of formula (III) + methyl bromide | 10:1, 5:1, 4:1, 3:1, 2:1, 1:1, 1:2, 1:3, 1:4, 1:5, or 1:10 |
| Compound of formula (III) + alkyl halides | 10:1, 5:1, 4:1, 3:1, 2:1, 1:1, 1:2, 1:3, 1:4, 1:5, or 1:10 |
| Compound of formula (III) + chloropicrin | 10:1, 5:1, 4:1, 3:1, 2:1, 1:1, 1:2, 1:3, 1:4, 1:5, or 1:10 |
| Compound of formula (III) + sodium aluminum fluoride | 10:1, 5:1, 4:1, 3:1, 2:1, 1:1, 1:2, 1:3, 1:4, 1:5, or 1:10 |
| Compound of formula (III) + sulfuryl fluoride | 10:1, 5:1, 4:1, 3:1, 2:1, 1:1, 1:2, 1:3, 1:4, 1:5, or 1:10 |
| Compound of formula (III) + borax | 10:1, 5:1, 4:1, 3:1, 2:1, 1:1, 1:2, 1:3, 1:4, 1:5, or 1:10 |
| Compound of formula (III) + boric acid | 10:1, 5:1, 4:1, 3:1, 2:1, 1:1, 1:2, 1:3, 1:4, 1:5, or 1:10 |
| Compound of formula (III) + disodium octaborate | 10:1, 5:1, 4:1, 3:1, 2:1, 1:1, 1:2, 1:3, 1:4, 1:5, or 1:10 |
| Compound of formula (III) + sodium borate | 10:1, 5:1, 4:1, 3:1, 2:1, 1:1, 1:2, 1:3, 1:4, 1:5, or 1:10 |
| Compound of formula (III) + sodium metaborate | 10:1, 5:1, 4:1, 3:1, 2:1, 1:1, 1:2, 1:3, 1:4, 1:5, or 1:10 |
| Compound of formula (III) + tartar emetic | 10:1, 5:1, 4:1, 3:1, 2:1, 1:1, 1:2, 1:3, 1:4, 1:5, or 1:10 |
| Compound of formula (III) + dazomet | 10:1, 5:1, 4:1, 3:1, 2:1, 1:1, 1:2, 1:3, 1:4, 1:5, or 1:10 |
| Compound of formula (III) + metam | 10:1, 5:1, 4:1, 3:1, 2:1, 1:1, 1:2, 1:3, 1:4, 1:5, or 1:10 |
| Compound of formula (III) + pymetrozine | 10:1, 5:1, 4:1, 3:1, 2:1, 1:1, 1:2, 1:3, 1:4, 1:5, or 1:10 |
| Compound of formula (III) + pyrifluquinazon | 10:1, 5:1, 4:1, 3:1, 2:1, 1:1, 1:2, 1:3, 1:4, 1:5, or 1:10 |
| Compound of formula (III) + afidopyropen | 10:1, 5:1, 4:1, 3:1, 2:1, 1:1, 1:2, 1:3, 1:4, 1:5, or 1:10 |
| Compound of formula (III) + clofentezine | 10:1, 5:1, 4:1, 3:1, 2:1, 1:1, 1:2, 1:3, 1:4, 1:5, or 1:10 |
| Compound of formula (III) + diflovidazin | 10:1, 5:1, 4:1, 3:1, 2:1, 1:1, 1:2, 1:3, 1:4, 1:5, or 1:10 |
| Compound of formula (III) + hexythiazox | 10:1, 5:1, 4:1, 3:1, 2:1, 1:1, 1:2, 1:3, 1:4, 1:5, or 1:10 |
| Compound of formula (III) + etoxazole | 10:1, 5:1, 4:1, 3:1, 2:1, 1:1, 1:2, 1:3, 1:4, 1:5, or 1:10 |
| Compound of formula (III) + B. t. subsp. *israelensis* | 10:1, 5:1, 4:1, 3:1, 2:1, 1:1, 1:2, 1:3, 1:4, 1:5, or 1:10 |
| Compound of formula (III) + B. t. subsp. *aizawai* | 10:1, 5:1, 4:1, 3:1, 2:1, 1:1, 1:2, 1:3, 1:4, 1:5, or 1:10 |
| Compound of formula (III) + B. t. subsp. *kurstaki* | 10:1, 5:1, 4:1, 3:1, 2:1, 1:1, 1:2, 1:3, 1:4, 1:5, or 1:10 |
| Compound of formula (III) + B. t. subsp. *tenebrionis* | 10:1, 5:1, 4:1, 3:1, 2:1, 1:1, 1:2, 1:3, 1:4, 1:5, or 1:10 |
| Compound of formula (III) + proteins contained in B. t. crops | 10:1, 5:1, 4:1, 3:1, 2:1, 1:1, 1:2, 1:3, 1:4, 1:5, or 1:10 |
| Compound of formula (III) + *Bacillus sphaericus* | 10:1, 5:1, 4:1, 3:1, 2:1, 1:1, 1:2, 1:3, 1:4, 1:5, or 1:10 |
| Compound of formula (III) + diafenthiuron | 10:1, 5:1, 4:1, 3:1, 2:1, 1:1, 1:2, 1:3, 1:4, 1:5, or 1:10 |
| Compound of formula (III) + azocyclotin | 10:1, 5:1, 4:1, 3:1, 2:1, 1:1, 1:2, 1:3, 1:4, 1:5, or 1:10 |
| Compound of formula (III) + cyhexatin | 10:1, 5:1, 4:1, 3:1, 2:1, 1:1, 1:2, 1:3, 1:4, 1:5, or 1:10 |
| Compound of formula (III) + fenbutatin-oxide | 10:1, 5:1, 4:1, 3:1, 2:1, 1:1, 1:2, 1:3, 1:4, 1:5, or 1:10 |
| Compound of formula (III) + propargite | 10:1, 5:1, 4:1, 3:1, 2:1, 1:1, 1:2, 1:3, 1:4, 1:5, or 1:10 |
| Compound of formula (III) + tetradifon | 10:1, 5:1, 4:1, 3:1, 2:1, 1:1, 1:2, 1:3, 1:4, 1:5, or 1:10 |
| Compound of formula (III) + chlorfenapyr | 10:1, 5:1, 4:1, 3:1, 2:1, 1:1, 1:2, 1:3, 1:4, 1:5, or 1:10 |
| Compound of formula (III) + DNOC (4,6-dinitro-o-cresol) | 10:1, 5:1, 4:1, 3:1, 2:1, 1:1, 1:2, 1:3, 1:4, 1:5, or 1:10 |
| Compound of formula (III) + sulfluramid | 10:1, 5:1, 4:1, 3:1, 2:1, 1:1, 1:2, 1:3, 1:4, 1:5, or 1:10 |
| Compound of formula (III) + bensultap | 10:1, 5:1, 4:1, 3:1, 2:1, 1:1, 1:2, 1:3, 1:4, 1:5, or 1:10 |
| Compound of formula (III) + cartap hydrochloride | 10:1, 5:1, 4:1, 3:1, 2:1, 1:1, 1:2, 1:3, 1:4, 1:5, or 1:10 |
| Compound of formula (III) + thiocyclam | 10:1, 5:1, 4:1, 3:1, 2:1, 1:1, 1:2, 1:3, 1:4, 1:5, or 1:10 |
| Compound of formula (III) + thiosultap-sodium | 10:1, 5:1, 4:1, 3:1, 2:1, 1:1, 1:2, 1:3, 1:4, 1:5, or 1:10 |
| Compound of formula (III) + bistrifluron | 10:1, 5:1, 4:1, 3:1, 2:1, 1:1, 1:2, 1:3, 1:4, 1:5, or 1:10 |
| Compound of formula (III) + chlorfluazuron | 10:1, 5:1, 4:1, 3:1, 2:1, 1:1, 1:2, 1:3, 1:4, 1:5, or 1:10 |
| Compound of formula (III) + diflubenzuron | 10:1, 5:1, 4:1, 3:1, 2:1, 1:1, 1:2, 1:3, 1:4, 1:5, or 1:10 |
| Compound of formula (III) + flucycloxuron | 10:1, 5:1, 4:1, 3:1, 2:1, 1:1, 1:2, 1:3, 1:4, 1:5, or 1:10 |
| Compound of formula (III) + flufenoxuron | 10:1, 5:1, 4:1, 3:1, 2:1, 1:1, 1:2, 1:3, 1:4, 1:5, or 1:10 |
| Compound of formula (III) + hexaflumuron | 10:1, 5:1, 4:1, 3:1, 2:1, 1:1, 1:2, 1:3, 1:4, 1:5, or 1:10 |
| Compound of formula (III) + lufenuron | 10:1, 5:1, 4:1, 3:1, 2:1, 1:1, 1:2, 1:3, 1:4, 1:5, or 1:10 |
| Compound of formula (III) + novaluron | 10:1, 5:1, 4:1, 3:1, 2:1, 1:1, 1:2, 1:3, 1:4, 1:5, or 1:10 |
| Compound of formula (III) + noviflumuron | 10:1, 5:1, 4:1, 3:1, 2:1, 1:1, 1:2, 1:3, 1:4, 1:5, or 1:10 |
| Compound of formula (III) + teflubenzuron | 10:1, 5:1, 4:1, 3:1, 2:1, 1:1, 1:2, 1:3, 1:4, 1:5, or 1:10 |
| Compound of formula (III) + triflumuron | 10:1, 5:1, 4:1, 3:1, 2:1, 1:1, 1:2, 1:3, 1:4, 1:5, or 1:10 |
| Compound of formula (III) + buprofezin | 10:1, 5:1, 4:1, 3:1, 2:1, 1:1, 1:2, 1:3, 1:4, 1:5, or 1:10 |
| Compound of formula (III) + cyromazine | 10:1, 5:1, 4:1, 3:1, 2:1, 1:1, 1:2, 1:3, 1:4, 1:5, or 1:10 |
| Compound of formula (III) + chromafenozide | 10:1, 5:1, 4:1, 3:1, 2:1, 1:1, 1:2, 1:3, 1:4, 1:5, or 1:10 |
| Compound of formula (III) + halofenozid | 10:1, 5:1, 4:1, 3:1, 2:1, 1:1, 1:2, 1:3, 1:4, 1:5, or 1:10 |
| Compound of formula (III) + methoxyfenozide | 10:1, 5:1, 4:1, 3:1, 2:1, 1:1, 1:2, 1:3, 1:4, 1:5, or 1:10 |
| Compound of formula (III) + tebufenozide | 10:1, 5:1, 4:1, 3:1, 2:1, 1:1, 1:2, 1:3, 1:4, 1:5, or 1:10 |
| Compound of formula (III) + amitraz | 10:1, 5:1, 4:1, 3:1, 2:1, 1:1, 1:2, 1:3, 1:4, 1:5, or 1:10 |
| Compound of formula (III) + hydramethylnon | 10:1, 5:1, 4:1, 3:1, 2:1, 1:1, 1:2, 1:3, 1:4, 1:5, or 1:10 |
| Compound of formula (III) + acequinocyl | 10:1, 5:1, 4:1, 3:1, 2:1, 1:1, 1:2, 1:3, 1:4, 1:5, or 1:10 |
| Compound of formula (III) + fluacrypyrim | 10:1, 5:1, 4:1, 3:1, 2:1, 1:1, 1:2, 1:3, 1:4, 1:5, or 1:10 |
| Compound of formula (III) + bifenazate | 10:1, 5:1, 4:1, 3:1, 2:1, 1:1, 1:2, 1:3, 1:4, 1:5, or 1:10 |

TABLE 2-continued

| Component A + Component B | Preferable mass ratio |
|---|---|
| Compound of formula (III) + fenazaquin | 10:1, 5:1, 4:1, 3:1, 2:1, 1:1, 1:2, 1:3, 1:4, 1:5, or 1:10 |
| Compound of formula (III) + fenpyroximate | 10:1, 5:1, 4:1, 3:1, 2:1, 1:1, 1:2, 1:3, 1:4, 1:5, or 1:10 |
| Compound of formula (III) + pyridaben | 10:1, 5:1, 4:1, 3:1, 2:1, 1:1, 1:2, 1:3, 1:4, 1:5, or 1:10 |
| Compound of formula (III) + pyrimidifen | 10:1, 5:1, 4:1, 3:1, 2:1, 1:1, 1:2, 1:3, 1:4, 1:5, or 1:10 |
| Compound of formula (III) + tebufenpyrad | 10:1, 5:1, 4:1, 3:1, 2:1, 1:1, 1:2, 1:3, 1:4, 1:5, or 1:10 |
| Compound of formula (III) + tolfenpyrad | 10:1, 5:1, 4:1, 3:1, 2:1, 1:1, 1:2, 1:3, 1:4, 1:5, or 1:10 |
| Compound of formula (III) + rotenone | 10:1, 5:1, 4:1, 3:1, 2:1, 1:1, 1:2, 1:3, 1:4, 1:5, or 1:10 |
| Compound of formula (III) + indoxacarb | 10:1, 5:1, 4:1, 3:1, 2:1, 1:1, 1:2, 1:3, 1:4, 1:5, or 1:10 |
| Compound of formula (III) + metaflumizone | 10:1, 5:1, 4:1, 3:1, 2:1, 1:1, 1:2, 1:3, 1:4, 1:5, or 1:10 |
| Compound of formula (III) + spirodiclofen | 10:1, 5:1, 4:1, 3:1, 2:1, 1:1, 1:2, 1:3, 1:4, 1:5, or 1:10 |
| Compound of formula (III) + spiromesifen | 10:1, 5:1, 4:1, 3:1, 2:1, 1:1, 1:2, 1:3, 1:4, 1:5, or 1:10 |
| Compound of formula (III) + spirotetramat | 10:1, 5:1, 4:1, 3:1, 2:1, 1:1, 1:2, 1:3, 1:4, 1:5, or 1:10 |
| Compound of formula (III) + spiropidion | 10:1, 5:1, 4:1, 3:1, 2:1, 1:1, 1:2, 1:3, 1:4, 1:5, or 1:10 |
| Compound of formula (III) + aluminum phosphide | 10:1, 5:1, 4:1, 3:1, 2:1, 1:1, 1:2, 1:3, 1:4, 1:5, or 1:10 |
| Compound of formula (III) + calcium phosphide | 10:1, 5:1, 4:1, 3:1, 2:1, 1:1, 1:2, 1:3, 1:4, 1:5, or 1:10 |
| Compound of formula (III) + phosphine | 10:1, 5:1, 4:1, 3:1, 2:1, 1:1, 1:2, 1:3, 1:4, 1:5, or 1:10 |
| Compound of formula (III) + zinc phosphide | 10:1, 5:1, 4:1, 3:1, 2:1, 1:1, 1:2, 1:3, 1:4, 1:5, or 1:10 |
| Compound of formula (III) + calcium cyanide | 10:1, 5:1, 4:1, 3:1, 2:1, 1:1, 1:2, 1:3, 1:4, 1:5, or 1:10 |
| Compound of formula (III) + sodium cyanide | 10:1, 5:1, 4:1, 3:1, 2:1, 1:1, 1:2, 1:3, 1:4, 1:5, or 1:10 |
| Compound of formula (III) + potassium cyanide | 10:1, 5:1, 4:1, 3:1, 2:1, 1:1, 1:2, 1:3, 1:4, 1:5, or 1:10 |
| Compound of formula (III) + cyenopyrafen | 10:1, 5:1, 4:1, 3:1, 2:1, 1:1, 1:2, 1:3, 1:4, 1:5, or 1:10 |
| Compound of formula (III) + cyflumetofen | 10:1, 5:1, 4:1, 3:1, 2:1, 1:1, 1:2, 1:3, 1:4, 1:5, or 1:10 |
| Compound of formula (III) + pyflubumide | 10:1, 5:1, 4:1, 3:1, 2:1, 1:1, 1:2, 1:3, 1:4, 1:5, or 1:10 |
| Compound of formula (III) + chlorantraniliprole | 10:1, 5:1, 4:1, 3:1, 2:1, 1:1, 1:2, 1:3, 1:4, 1:5, or 1:10 |
| Compound of formula (III) + cyantraniliprole | 10:1, 5:1, 4:1, 3:1, 2:1, 1:1, 1:2, 1:3, 1:4, 1:5, or 1:10 |
| Compound of formula (III) + cyclaniliprole | 10:1, 5:1, 4:1, 3:1, 2:1, 1:1, 1:2, 1:3, 1:4, 1:5, or 1:10 |
| Compound of formula (III) + flubendiamide | 10:1, 5:1, 4:1, 3:1, 2:1, 1:1, 1:2, 1:3, 1:4, 1:5, or 1:10 |
| Compound of formula (III) + cyhalodiamide | 10:1, 5:1, 4:1, 3:1, 2:1, 1:1, 1:2, 1:3, 1:4, 1:5, or 1:10 |
| Compound of formula (III) + tetrachlorantraniliprole | 10:1, 5:1, 4:1, 3:1, 2:1, 1:1, 1:2, 1:3, 1:4, 1:5, or 1:10 |
| Compound of formula (III) + tetraniliprole | 10:1, 5:1, 4:1, 3:1, 2:1, 1:1, 1:2, 1:3, 1:4, 1:5, or 1:10 |
| Compound of formula (III) + flonicamid | 10:1, 5:1, 4:1, 3:1, 2:1, 1:1, 1:2, 1:3, 1:4, 1:5, or 1:10 |
| Compound of formula (III) + broflanilide | 10:1, 5:1, 4:1, 3:1, 2:1, 1:1, 1:2, 1:3, 1:4, 1:5, or 1:10 |
| Compound of formula (III) + fluxametamide | 10:1, 5:1, 4:1, 3:1, 2:1, 1:1, 1:2, 1:3, 1:4, 1:5, or 1:10 |
| Compound of formula (III) + isocycloseram | 10:1, 5:1, 4:1, 3:1, 2:1, 1:1, 1:2, 1:3, 1:4, 1:5, or 1:10 |
| Compound of formula (III) + afoxolaner | 10:1, 5:1, 4:1, 3:1, 2:1, 1:1, 1:2, 1:3, 1:4, 1:5, or 1:10 |
| Compound of formula (III) + fluralaner | 10:1, 5:1, 4:1, 3:1, 2:1, 1:1, 1:2, 1:3, 1:4, 1:5, or 1:10 |
| Compound of formula (III) + lotilaner | 10:1, 5:1, 4:1, 3:1, 2:1, 1:1, 1:2, 1:3, 1:4, 1:5, or 1:10 |
| Compound of formula (III) + sarolaner | 10:1, 5:1, 4:1, 3:1, 2:1, 1:1, 1:2, 1:3, 1:4, 1:5, or 1:10 |
| Compound of formula (III) + azadirachtin | 10:1, 5:1, 4:1, 3:1, 2:1, 1:1, 1:2, 1:3, 1:4, 1:5, or 1:10 |
| Compound of formula (III) + benzoximate | 10:1, 5:1, 4:1, 3:1, 2:1, 1:1, 1:2, 1:3, 1:4, 1:5, or 1:10 |
| Compound of formula (III) + bromopropylate | 10:1, 5:1, 4:1, 3:1, 2:1, 1:1, 1:2, 1:3, 1:4, 1:5, or 1:10 |
| Compound of formula (III) + chinomethionat | 10:1, 5:1, 4:1, 3:1, 2:1, 1:1, 1:2, 1:3, 1:4, 1:5, or 1:10 |
| Compound of formula (III) + dicofol | 10:1, 5:1, 4:1, 3:1, 2:1, 1:1, 1:2, 1:3, 1:4, 1:5, or 1:10 |
| Compound of formula (III) + lime sulfur | 10:1, 5:1, 4:1, 3:1, 2:1, 1:1, 1:2, 1:3, 1:4, 1:5, or 1:10 |
| Compound of formula (III) + mancozeb | 10:1, 5:1, 4:1, 3:1, 2:1, 1:1, 1:2, 1:3, 1:4, 1:5, or 1:10 |
| Compound of formula (III) + pyridalyl | 10:1, 5:1, 4:1, 3:1, 2:1, 1:1, 1:2, 1:3, 1:4, 1:5, or 1:10 |
| Compound of formula (III) + sulfur | 10:1, 5:1, 4:1, 3:1, 2:1, 1:1, 1:2, 1:3, 1:4, 1:5, or 1:10 |
| Compound of formula (III) + acynonapyr | 10:1, 5:1, 4:1, 3:1, 2:1, 1:1, 1:2, 1:3, 1:4, 1:5, or 1:10 |
| Compound of formula (III) + benzpyrimoxan | 10:1, 5:1, 4:1, 3:1, 2:1, 1:1, 1:2, 1:3, 1:4, 1:5, or 1:10 |
| Compound of formula (III) + flometoquin | 10:1, 5:1, 4:1, 3:1, 2:1, 1:1, 1:2, 1:3, 1:4, 1:5, or 1:10 |
| Compound of formula (III) + fluhexafon | 10:1, 5:1, 4:1, 3:1, 2:1, 1:1, 1:2, 1:3, 1:4, 1:5, or 1:10 |
| Compound of formula (III) + oxazosulfyl | 10:1, 5:1, 4:1, 3:1, 2:1, 1:1, 1:2, 1:3, 1:4, 1:5, or 1:10 |
| Compound of formula (III) + tyclopyrazoflor | 10:1, 5:1, 4:1, 3:1, 2:1, 1:1, 1:2, 1:3, 1:4, 1:5, or 1:10 |

In the method of the present invention, the compound A may be first applied, and the compound B may be subsequently applied. The compound B may be first applied, and the compound A may be subsequently applied. The compound A and the compound B may be applied simultaneously. The compound A and the compound B may be mixed and applied.

In the method of the present invention, the below-mentioned active ingredient contained in other chemicals such as a fungicide, a plant growth regulator, a synergist, a fertilizer, a soil conditioner, and feed for animals (hereinafter referred to as a "compound C") may be applied with the compound A and the compound B. The order of application is not particularly limited, and the compound A, the compound B, and the compound C may be applied, for example, in the order of the compound A, compound B, and compound C; the compound A, the compound C, and the compound B; the compound C, the compound A, and the compound B; the compound C, the compound B, and the compound A; the compound B, the compound C, and the compound A; or the compound B, the compound A, and the compound C. The compound A, the compound B, and the compound C may be simultaneously applied.

Although the compound A may be applied as a technical product, it is preferable to apply a composition containing the compound A (chemical composition A). Although the compound B may be applied as a technical product, it is preferable to apply a composition containing the compound B (chemical composition B). The compound C may be applied as a technical product, or a composition containing the compound C (chemical composition C) may be applied.

The chemical composition A, the chemical composition B, and the chemical composition C may be formulated into well-known forms. The chemical composition A, the chemical composition B, and the chemical composition C may be formulated into a form which a common agricultural chemical or an animal drug can take, such as a wettable powder, a granule, a dusting powder, a tablet, an emulsion, a water-soluble powder, a suspension, a granular wettable powder, a flowable, a microcapsule, aerosol, a propellant, a spray, a smoke mist agent, a heat transpiratory preparation, a fumigant, and a bait agent. The chemical composition A, the chemical composition B, and/or the chemical composition C may be a composition in which the compound A, the compound B, and/or the compound C, respectively, is impregnated into a base material such as a porous ceramic plate, a nonwoven fabric, and paper.

The amount of the compound A contained in the chemical composition A, the amount of the compound B contained in the chemical composition B, and the amount of the compound C contained in the chemical composition C are not particularly limited, but are usually 0.1 to 80% by mass with respect to the chemical composition A, the chemical composition B, and the chemical composition C, respectively. The content of the compound A, the content of the compound B, and the content of the compound C in the chemical composition A, the chemical composition B, and the chemical composition C having a dosage form such as an emulsion, a liquid chemical, a wettable powder (for example, a granular wettable powder), an aqueous suspension preparation, or a microemulsion are preferably 1 to 80% by mass and more preferably 10 to 50% by mass with respect to the chemical composition A, the chemical composition B, and the chemical composition C, respectively. The content of the compound A, the content of the compound B, and the content of compound C in the chemical composition A, the chemical composition B, and the chemical composition C having a dosage form such as an oily chemical and a dusting powder are preferably 0.1 to 50% by mass and more preferably 0.1 to 20% by mass with respect to the chemical composition A, the chemical composition B, and the chemical composition C, respectively. The content of the compound A, the content of the compound B, and the content of compound C in the chemical composition A, the chemical composition B, and the chemical composition C having a dosage form such as a granule, a tablet, and a jumbo agent are preferably 0.5 to 50% by mass and more preferably 0.5 to 10% by mass with respect to the chemical composition A, the chemical composition B, and the chemical composition C, respectively.

The chemical composition A, the chemical composition B, and the chemical composition C may contain a liquid medium, a base material, additives, and/or a carrier which are mentioned below besides the compound A, the compound B, and the compound C, respectively.

When the compound A and the compound B (and the compound C if necessary) are simultaneously applied, it is preferable to prepare a composition containing the compound A and the compound B (and the compound C if necessary) (a pest control agent composition of the present invention) and apply the composition.

The total amount of the compound A and the compound B (and the compound C if necessary) contained in the pest control agent composition of the present invention varies a little depending on the dosage form, but is usually 0.1 to 80% by mass with respect to the pest control agent composition. The total content of the compound A and the compound B (and the compound C if necessary) in the pest control agent composition having a dosage form such as an emulsion, a liquid chemical, a wettable powder (for example, a granular wettable powder), an aqueous suspension preparation, and a microemulsion is preferably 1 to 80% by mass and more preferably 10 to 50% by mass with respect to the pest control agent composition. The total content of the compound A and the compound B (and the compound C if necessary) in the pest control agent composition having a dosage form such as an oily chemical and a dusting powder is preferably 0.1 to 50% by mass and more preferably about 0.1 to 20% by mass with respect to the pest control agent composition. The total content of the compound A and the compound B (and the compound C if necessary) in the pest control agent composition having a dosage form such as a granule, a tablet, and a jumbo agent is preferably 0.5 to 50% by mass and more preferably 0.5 to 10% by mass with respect to the pest control agent composition.

In the pest control agent composition of the present invention, the mass ratio of the compound A to the compound B (compound A/compound B) is not particularly limited, but is preferably 200/1 to 1/200, more preferably 100/1 to 1/100, further preferably 50/1 to 1/50, and particularly preferably 10/1 to 1/10. It is preferable to incorporate the compound A and the compound B especially at a mass ratio at which a synergistic effect is exhibited. The synergistic effect may be confirmed by the Colby method, which is mentioned below.

The pest control agent composition of the present invention may contain a liquid medium, a base material, additives, and/or a carrier besides the compound A, the compound B, and the compound C. A liquid medium, a base material, additives, and/or a carrier which can be used for the present invention may be suitably selected from substances known until now depending on the dosage form.

As the additives and the carrier which can be used in a solid preparation, vegetable powder such as soybean flour and flour; mineral fine powder such as diatomite, apatite, gypsum, talc, bentonite, pyrophyllite, and clay; organic and inorganic compounds such as soda benzoate, urea, and mirabilite may be exemplified.

As the liquid medium which can be used in a liquid preparation, a petroleum aromatic hydrocarbon such as kerosene and xylene; cyclohexane; cyclohexanone; dimethylformamide; dimethyl sulfoxide; alcohol; acetone; trichloroethylene; methyl isobutyl ketone; mineral oil; vegetable oil; water; or the like may be exemplified.

As a carrier which can be used at the time of formulation into the propellant, butane gas, LPG, dimethyl ether, carbonic acid gas, or the like may be exemplified.

As the base material which can be used for poison bait, a feed component such as grain powder, vegetable oil, sugar, and crystalline cellulose; an antioxidant such as dibutylhydroxytoluene and nordihydroguaiaretic acid; a preservative such as dehydroacetic acid; an agent for preventing children or pets from eating the poison bait accidentally such as red pepper powder; an insect pest attractant perfume such as cheese perfume and onion perfume; or the like may be exemplified.

A surfactant may be used as an additive. As the surfactant, for example, a nonionic surfactant such as an alkyl phenyl ether to which polyoxyethylene is added, an alkyl ether to which polyoxyethylene is added, a higher fatty acid ester to which polyoxyethylene is added, a sorbitan higher fatty acid ester to which polyoxyethylene is added, and tristyryl phenyl ether to which polyoxyethylene is added; a sulfuric ester salt of an alkyl phenyl ether to which polyoxyethylene is added; an alkylbenzenesulfonic acid salt; a sulfuric ester salt of a higher alcohol; an alkylnaphthalenesulfonic acid salt; a polycarboxylic acid salt; a lignin sulfonic acid salt; a formaldehyde condensate of an alkylnaphthalenesulfonic acid salt; an isobutylene-maleic anhydride copolymer; or the like may be exemplified.

For example, active ingredients of fungicides illustrated by the action mechanism classification of fungicides based on FRAC may be exemplified. The following active ingredients may be specifically exemplified.

(1) Nucleic acid biosynthesis inhibitors:
  (a) RNA polymerase I inhibitors: benalaxyl, benalaxyl-M, furalaxyl, metalaxyl, metalaxyl-M, oxadixyl, clozylacon, and ofurace;
  (b) adenosine deaminase inhibitors: bupirimate, dimethirimol, and ethirimol;
  (c) DNA/RNA synthesis inhibitors: hymexazol and octhilinone;
  (d) DNA topoisomerase II inhibitors: oxolinic acid.
(2) Mitotic inhibitors and cell division inhibitors:
  (a) β-tubulin polymerization inhibitors: benomyl, carbendazim, chlorfenazole, fuberidazole, thiabendazole, thiophanate, thiophanate-methyl, diethofencarb, zoxamide, and ethaboxam;
  (b) cell division inhibitors: pencycuron;
  (c) spectrin-like protein delocalization inhibitors: fluopicolide and fluopimomide.
(3) Respiration inhibitors:
  (a) complex I NADH oxidation-reduction enzyme inhibitors: diflumetorim and tolfenpyrad;
  (b) complex II succinate dehydrogenase inhibitors: benodanil, flutolanil, mepronil, isofetamid, fluopyram, fenfuram, furmecyclox, carboxin, oxycarboxin, thifluzamide, benzovindiflupyr, bixafen, fluxapyroxad, furametpyr, isopyrazam, penflufen, penthiopyrad, sedaxane, boscalid, pyraziflumid, pydiflumetofen, isoflucypram, and inpyrfluxam;
  (c) complex III ubiquinol oxidase Qo inhibitors: azoxystrobin, coumoxystrobin, coumethoxystrobin, enoxastrobin, flufenoxystrobin, picoxystrobin, pyraoxystrobin, pyraclostrobin, pyrametostrobin, triclopyricarb, kresoxim-methyl, trifloxystrobin, dimoxystrobin, fenaminstrobin, metominostrobin, orysastrobin, famoxadone, fluoxastrobin, fenamidone, pyribencarb, mandestrobin, and metyltetraprole;
  (d) complex III ubiquinol reductase Qi inhibitors: cyazofamid, amisulbrom, and fenpicoxamid;
  (e) oxidative phosphorylation uncoupling agents: binapacryl, meptyldinocap, dinocap, fluazinam, and ferimzone;
  (f) oxidative phosphorylation inhibitors (ATP synthetase inhibitors): fentin acetate, fentin chloride, and fentin hydroxide;
  (g) ATP production inhibitors: silthiofam;
  (h) complex III: Qx (unknown) inhibitor of cytochrome bc1 (ubiquinone reductase): ametoctradin.
(4) Amino acid and protein synthesis inhibitors
  (a) methionine biosynthesis inhibitors: andoprim, cyprodinil, mepanipyrim, and pyrimethanil;
  (b) protein synthesis inhibitors: blasticidin-S, kasugamycin, kasugamycin hydrochloride, streptomycin, and oxytetracycline.
(5) Signal transduction inhibitors:
  (a) signal transduction inhibitors: quinoxyfen and proquinazid;
  (b) MAP/histidine kinase inhibitors in osmotic signal transduction: fenpiclonil, fludioxonil, chlozolinate, dimethachlone, iprodione, procymidone, and vinclozolin.
(6) Lipid and cell membrane synthesis inhibitors:
  (a) phospholipid biosynthesis, methyltransferase inhibitors: edifenphos, iprobenfos, pyrazophos, and isoprothiolane;
  (b) lipid peroxidation agents: biphenyl, chloroneb, dichloran, quintozene, tecnazene, tolclofos-methyl, and etridiazole;
  (c) agents that act on cell membranes: iodocarb, propamocarb, propamocarb-hydrochloride, propamocarb-fosetylate, and prothiocarb;
  (d) microorganisms that disrupt cell membranes of pathogens: *Bacillus subtilis, Bacillus subtilis* strain QST713, *Bacillus subtilis* strain FZB24, *Bacillus subtilis* strain MBI600, *Bacillus subtilis* strain D747, and *Bacillus amyloliquefaciens;*
  (e) agents that disrupt cell membranes: *Melaleuca alternifolia* (tea tree) extract, plant oils (mixtures), eugenol, geraniol, and thymol.
(7) Cell membrane sterol biosynthesis inhibitors:
  (a) C14-demethylation inhibitors in sterol biosynthesis: triforine, pyrifenox, pyrisoxazole, fenarimol, flurprimidol, nuarimol, imazalil, imazalil-sulfate, oxpoconazole fumarate, pefurazoate, prochloraz, triflumizole, viniconazole, azaconazole, bitertanol, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, penconazole, propiconazole, simeconazole, tebuconazole, tetraconazole, triadimefon, triadimenol, triticonazole, prothioconazole, voriconazole, and mefentrifluconazole;
  (b) Δ4 reductase and sterol Δ8→Δ7-isomerase inhibitors in sterol biosynthesis: aldimorph, dodemorph, dodemorph acetate, fenpropimorph, tridemorph, fenpropidin, piperalin, and spiroxamine;
  (c) 3-keto reductase inhibitors in C4-demethylation in sterol biosynthesis system: fenhexamid and fenpyrazamine;
  (d) squalene epoxidase inhibitors in sterol biosynthesis system: pyributicarb, naftifine, and terbinafine.
(8) Cell wall synthesis inhibitors
  (a) trehalase inhibitors: validamycin;
  (b) chitin synthetase inhibitors: polyoxins and polyoxorim;
  (c) cellulose synthetase inhibitors: dimethomorph, flumorph, pyrimorph, benthiavalicarb-isopropyl, iprovalicarb, valifenalate, and mandipropamid.
(9) Melanin biosynthesis inhibitors
  (a) melanin biosynthesis reductase inhibitors: fthalide, pyroquilon, and tricyclazole;
  (b) melanin biosynthesis anhydrase inhibitors: carpropamid, diclocymet, and fenoxanil;
  (c) melanin biosynthesis polyketide synthesis inhibitors: tolprocarb.
(10) Host plant resistance inducers:
  (a) agents that act on salicylic acid synthesis pathway: acibenzolar-S-methyl;
  (b) others: probenazole, tiadinil, isotianil, dichlobentiazox, laminarin, and *Reynoutria sachalinensis* extract.
(11) Agents with unknown mode of action: cymoxanil, fosetyl-aluminum, phosphoric acid (phosphate), tecloftalam, triazoxide, flusulfamide, diclomezine, methasulfocarb, cyflufenamid, metrafenone, pyriofenone, dodine, dodine free base, and flutianil.

(12) Agents having multiple active sites: copper (copper salt), bordeaux mixture, copper hydroxide, copper naphthalate, copper oxide, copper oxychloride, copper sulfate, sulfur, sulfur products, calcium polysulfide, ferbam, mancozeb, maneb, mancopper, metiram, polycarbamate, propineb, thiram, zineb, ziram, captan, captafol, folpet, chlorothalonil, dichlofluanid, tolylfluanid, guazatine, iminoctadine triacetate, iminoctadine trialbesilate, anilazine, dithianon, quinomethionate, and fluoroimide.

(13) Other agents: DBEDC, fluorofolpet, guazatine acetate, bis(8-quinolinolato)copper (II), propamidine, chloropicrin, cyprofuram, agrobacterium, bethoxazin, diphenylamine, methyl isothiocyanate (MITC), mildiomycin, capsaicin, cufraneb, cyprosulfamide, dazomet, debacarb, dichlorophen, flumetover, fosetyl-calcium, fosetyl-sodium, irumamycin, natamycin, nitrothal isopropyl, oxamocarb, pyrrolnitrin, tebufloquin, tolnifanide, zarilamide, algophase, amicarthiazol, oxathiapiprolin, fluoxapiprolin, metiram zinc, benthiazole, trichlamide, uniconazole, oxyfenthiin, picarbutrazox, dichlobentiazox, ipfentrifluconazole, dipymetitrone, quinofumelin, thiuram, ambam, *Agrobacterium radiobacter*, *Coniothyrium minitans*, *Pseudomonas fluorescens*, *Pseudomonas rhodesiae*, *Talaromyces flavus*, *Trichoderma atroviride*, avirulent *Erwinia carotovora* (*Erwinia carotovora* subsp. *carotovora*), *Bacillus simplex*, *Variovorax paradoxus*, *Lactobacillus plantarum*, florylpicoxamid, pyrapropoyne, fluindapyr, aminopyrifen, pyridachlometyl, and ipflufenoquin.

As an active ingredient of a plant growth regulator, for example, the following and the like may be exemplified.

Abscisic acid, kinetin, benzylaminopurine, 1,3-diphenylurea, forchlorfenuron, thidiazuron, chlorfenuron, dihydrozeatin, gibberellin A, gibberellin A4, gibberellin A7, gibberellin A3, 1-methylcyclopropane, N-acetyl aminoethoxyvinyl glycine (also called aviglycine), aminooxyacetate, silver nitrate, cobalt chloride, IAA, 4-CPA, cloprop, 2,4-D, MCPB, indole-3-butyrate, dichlorprop, phenothiol, 1-naphthyl acetamide, ethychlozate, cloxyfonac, maleic acid hydrazide, 2,3,5-triiodobenzoic acid, salicylic acid, methyl salicylate, (−)-jasmonic acid, methyl jasmonate, (+)-strigol, (+)-deoxystrigol, (+)-orobanchol, (+)-sorgolactone, 4-oxo-4-(2-phenylethyl)aminobutyric acid, ethephon, chlormequat, mepiquat chloride, benzyladenine, 5-aminolevulinic acid, and daminozide.

The method for applying the chemical composition A, the chemical composition B, and the chemical composition C is not particularly limited. For example, chemical compositions having dosage forms of a wettable powder, an emulsion, a flowable agent, a water-soluble powder, and a granular wettable powder may be applied by diluting the chemical compositions with water to predetermined concentrations, preparing solutions, suspensions, or emulsions, and sprinkling the dilutions on plants or soil. Chemical compositions having dosage forms of a dusting powder and granules may be applied by scattering the chemical compositions on plants or soil. Chemical compositions having dosage forms such as poison bait and an antimite sheet may be applied by placing the chemical compositions at desired places or hanging the compositions from desired places. In chemical compositions having dosage forms such as aerosol and a smoke mist agent, the chemical compositions may be applied using devices such as a sprayer.

The chemical composition A, the chemical composition B, and the chemical composition C may be applied by a well-known veterinary technique (local, oral, parenteral, or subcutaneous administration). As the veterinary technique, a method for orally administering the compositions to animals with tablets or capsules, or the like or as a mixture with feed; a method for administering the compositions to animals with immersion liquids, suppositories, injections (intramuscular injections, subcutaneous injections, intravenous injections, intraabdominal injections, or the like), or the like; a method for locally administering the compositions by spraying an oily or aqueous liquid chemical, pouring on, spotting on, or the like; a method for locally administering the compositions by kneading an ectoparasite control agent into a resin, molding the kneaded material into suitable shapes such as a collar and an ear tag, equipping animals therewith; or the like is exemplified.

The pest control agent set of the present invention is produced by gathering the chemical composition A and the chemical composition B into one without mixing the chemical composition A and the chemical composition B. The pest control agent set of the present invention may be produced by gathering the composition A, the chemical composition B, and a chemical composition D containing a compound D which is suitable depending on the type of the pest which is an object to be controlled into one without mixing the chemical composition A, the chemical composition B, and the chemical composition D. As the compound D, for example, active ingredients contained in other chemicals such as a fungicide, an insecticide or an acaricide, a nematocide, a plant growth regulator, a synergist, a fertilizer, a soil conditioner, and feed for animals may be exemplified.

The chemical composition D may be formulated into a well-known form. The chemical composition D may be formulated into a form which a common agricultural chemical or an animal drug can take, such as a wettable powder, a granule, a dusting powder, a tablet, an emulsion, a water-soluble powder, a suspension, a granular wettable powder, a flowable, a microcapsule, aerosol, a propellant, a spray, a smoke mist agent, a heat transpiratory preparation, a fumigant, and a bait agent. The chemical composition D may be a composition in which the compound D is impregnated into a base material such as a porous ceramic plate, a nonwoven fabric, and paper.

The amount of the compound D contained in the chemical composition D is not particularly limited, but is usually 0.1 to 80% by mass with respect to the chemical composition D. The content of the compound D in the chemical composition D having a dosage form such as an emulsion, a liquid chemical, a wettable powder (for example, granular wettable powder), an aqueous suspension preparation, and a microemulsion is preferably 1 to 80% by mass and more preferably 10 to 50% by mass with respect to the chemical composition D. The content of the compound D in the chemical composition D having a dosage form such as an oily chemical and a dusting powder is preferably 0.1 to 50% by mass and more preferably 0.1 to 20% by mass with respect to the chemical composition D. The content of the compound D in the chemical composition D having a dosage form such as a granule, a tablet, and a jumbo agent is preferably 0.5 to 50% by mass and more preferably 0.5 to 10% by mass with respect to the chemical composition D. The chemical composition D may contain the above-mentioned liquid medium, base material, additives, and/or carrier besides the compound D.

The pest control agent set of the present invention may be produced by gathering a measuring cup or a measuring dropper, a mixing tank, gloves, a mask, protective goggles, and the like besides the chemical composition A, the chemical composition B, and the chemical composition D, if necessary, into one. The pest control agent set of the present invention may be produced by gathering the pest control agent composition of the present invention and at least one selected from the group consisting of a measuring cup, a measuring dropper, a mixing tank, gloves, a mask, and protective goggles into one.

The form in which the items are gathered is not particularly limited. For example, a set obtained by storing the compositions in bags, boxes, bottles, cans, or the like individually and storing the compositions in one container such as a bag or a box together may be exemplified.

The amount applied to an object is not particularly limited, and may be suitably set depending on the type of the object to be controlled, control time, and the like. For example, the application may be performed, for example, so that the total amount of the compound A and the compound B is 0.01 to 1000 mg with respect to 1 kg of a host animal for controlling mites which are parasitic on animals which are domestic animals such as a cow and a pig and pets such as a dog and a cat.

As the object of application, a plant such as grain; a vegetable; a root vegetable; a potato; a tree such as a fruit tree, tea, coffee, or cacao; pasture; lawn; a flowering plant; a foliage plant; or a cotton plant may be exemplified. The plant as the application object is not limited depending on whether the plant is a foundation seed, a variety, an improved variety, an agrotype, a mutant, a hybrid body, a genetically modified organism (GMO), or the like. In the method of the present invention, the compositions may be applied to the whole plant or a part of a plant such as a leaf, a stem, a stalk, a flower, a bud, a fruit, a seed, a sprout, a root, a tuber, a tuberous root, a shoot, and a cutting. Seed treatment, foliage spraying, soil application, water surface application, or the like may be performed to control various agricultural insect pests and mites.

As the object of application, a warm-blooded animal such as a pet animal such as a dog and a cat; a pet bird; a domestic animal such as a cow, a horse, a pig, and a sheep; and a fowl or an insect such as a honeybee, a stag beetle, and a beetle which can be a host animal of an ectoparasite may be exemplified.

The pests which may be controlled by the controlling method of the present invention are not particularly limited. For example, a sanitary insect pest, a stored grain insect pest, a clothing insect pest, a house insect pest, a parasite, a crop insect pest, or the like may be exemplified. Mites are included in these.

The controlling method of the present invention may be performed in all the growth stages of pests which are objects to be controlled. The method of the present invention may be performed, for example, on an egg, a nymph, a larva, a pupa, and an imago.

Examples of the insect pest which is an object to be controlled will be shown below.

(1) Butterflies or moths of the order Lepidoptera
(1-a) moths of the family Arctiidae, for example, *Hyphantria cunea* and *Lemyra imparilis*;
(1-b) moths of the family Bucculatricidae, for example, *Bucculatrix pyrivorella*;
(1-c) moths of the family Carposinidae, for example, *Carposina sasakii*;
(1-d) moths of the family Crambidae, for example, *Diaphania* indica and *Diaphania nitidalis* of *Diaphania* spp.; for example, *Ostrinia furnacalis*, *Ostrinia nubilalis*, and *Ostrinia scapulalis* of *Ostrinia* spp.; and *Chilo suppressalis*, *Cnaphalocrocis medinalis*, *Conogethes punctiferalis*, *Diatraea grandiosella*, *Glyphodes pyloalis*, *Hellula undalis*, and *Parapediasia teterrella* of other spp.;
(1-e) moths of the family Gelechiidae, for example, *Helcystogramma triannulella*, *Pectinophora gossypiella*, *Phthorimaea operculella*, and *Sitotroga cerealella*;
(1-f) moths of the family Geometridae, for example, *Ascotis selenaria*;
(1-g) moths of the family Gracillariidae, for example, *Caloptilia theivora*, *Phyllocnistis citrella*, and *Phyllonorycter ringoniella*;
(1-h) butterflies of the family Hesperiidae, for example, *Parnara guttata*;
(1-i) moths of the family Lasiocampidae, for example, *Malacosoma neustria*;
(1-j) moths of the family Lymantriidae, for example, *Lymantria dispar* and *Lymantria monacha* of *Lymantria* spp.; and *Euproctis pseudoconspersa* and *Orgyia thyellina* of other spp.;
(1-k) moths of the family Lyonetiidae, for example, *Lyonetia clerkella* and *Lyonetia prunifoliella malinella* of *Lyonetia* spp.;
(1-l) moths of the family Noctuidae, for example, *Spodoptera depravata*, *Spodoptera eridania*, *Spodoptera exigua*, *Spodoptera frugiperda*, *Spodoptera littoralis*, and *Spodoptera litura* of *Spodoptera* spp.;
for example, *Autographa gamma* and *Autographa nigrisigna* of *Autographa* spp.;
for example, *Agrotis ipsilon* and *Agrotis segetum* of *Agrotis* spp.;
for example, *Helicoverpa armigera*, *Helicoverpa assulta*, and *Helicoverpa zea* of *Helicoverpa* spp.;
for example, *Heliothis armigera* and *Heliothis virescens* of *Heliothis* spp.; and
*Aedia leucomelas*, *Ctenoplusia agnata*, *Eudocima tyrannus*, *Mamestra brassicae*, *Mythimna separata*, *Naranga aenescens*, *Panolis japonica*, *Peridroma saucia*, *Pseudoplusia includens*, and *Trichoplusia ni* of other spp.;
(1-m) moths of the family Nolidae, for example, *Earias insulana*;
(1-n) butterflies of the family Pieridae, for example, *Pieris brassicae* and *Pieris rapae crucivora* of *Pieris* spp.;
(1-o) moths of the family Plutellidae, for example, *Acrolepiopsis sapporensis* and *Acrolepiopsis suzukiella* of *Acrolepiopsis* spp.; and
*Plutella xylostella* of other spp.;
(1-p) moths of the family Pyralidae, for example, *Cadra cautella*, *Elasmopalpus lignosellus*, *Etiella zinckenella*, and *Galleria mellonella*;
(1-q) moths of the family Sphingidae, for example, *Manduca quinquemaculata* and *Manduca sexta* of *Manduca* spp.;
(1-r) moths of the family Stathmopodidae, for example, *Stathmopoda masinissa*;
(1-s) moths of the family Tineidae, for example, *Tinea translucens*;
(1-t) moths of the family Tortricidae, for example, *Adoxophyes honmai* and *Adoxophyes orana* of *Adoxophyes* spp.;
for example, *Archips breviplicanus* and *Archips fuscocupreanus* of *Archips* spp.; and
*Choristoneura fumiferana*, *Cydia pomonella*, *Eupoecilia ambiguella*, *Grapholitha molesta*, *Homona magn-*

*anima, Leguminivora glycinivorella, Lobesia botrana, Matsumuraeses phaseoli, Pandemis heparana,* and *Sparganothis pilleriana* of other spp.;
(1-u) moths of the family Yponomeutidae, for example, *Argyresthia conjugella.*
(2) Insect pests of the order Thysanoptera
(2-a) insect pests of the family Phlaeothripidae, for example, *Ponticulothrips diospyrosi;*
(2-b) insect pests of the family Thripidae, for example, *Frankliniella intonsa* and *Frankliniella occidentalis* of *Frankliniella* spp.;
for example, *Thrips palmi* and *Thrips tabaci* of *Thrips* spp.; and
*Heliothrips haemorrhoidalis* and *Scirtothrips dorsalis* of other spp.
(3) Insect pests of the order Hemiptera
(3-A) the suborder Archaeorrhyncha
(3-A-a) insect pests of the family Delphacidae, for example, *Laodelphax striatella, Nilaparvata lugens, Perkinsiella saccharicida,* and *Sogatella furcifera.*
(3-B) the suborder Clypeorrhyncha
(3-B-a) insect pests of the family Cicadellidae, for example, *Empoasca fabae, Empoasca nipponica, Empoasca onukii,* and *Empoasca sakaii* of *Empoasca* spp.; and *Arboridia apicalis, Balclutha saltuella, Epiacanthus stramineus, Macrosteles striifrons,* and *Nephotettix cinctinceps* of other spp.
(3-C) the suborder Heteroptera
(3-C-a) insect pests of the family Alydidae, for example, *Riptortus clavatus;*
(3-C-b) insect pests of the family Coreidae, for example, *Cletus punctiger* and *Leptocorisa chinensis;*
(3-C-c) insect pests of the family Lygaeidae, for example, *Blissus leucopterus, Cavelerius saccharivorus,* and *Togo hemipterus;*
(3-C-d) insect pests of the family Miridae, for example, *Halticus insularis, Lygus lineolaris, Psuedatomoscelis seriatus, Stenodema sibiricum, Stenotus rubrovittatus,* and *Trigonotylus caelestialium;*
(3-C-e) insect pests of the family Pentatomidae, for example, *Nezara antennata* and *Nezara viridula* of *Nezara* spp.;
for example, *Eysarcoris aeneus, Eysarcoris lewisi,* and *Eysarcoris ventralis* of *Eysarcoris* spp.; and *Dolycoris baccarum, Eurydema rugosum, Glaucias subpunctatus, Halyomorpha halys, Piezodorus hybneri, Plautia crossota,* and *Scotinophora lurida* of other spp.;
(3-C-f) insect pests of the family Pyrrhocoridae, for example, *Dysdercus cingulatus;*
(3-C-g) insect pests of the family Rhopalidae, for example, *Rhopalus msculatus;*
(3-C-h) insect pests of the family Scutelleridae, for example, *Eurygaster integriceps;*
(3-C-i) insect pests of the family Tingidae, for example, *Stephanitis nashi.*
(3-D) the suborder Sternorrhyncha
(3-D-a) insect pests of the family Adelgidae, for example, *Adelges laricis;*
(3-D-b) insect pests of the family Aleyrodidae, for example, *Bemisia argentifolii* and *Bemisia tabaci* of *Bemisia* spp.; and
*Aleurocanthus spiniferus, Dialeurodes citri,* and *Trialeurodes vaporariorum* of other spp.;
(3-D-c) insect pests of the family Aphididae, for example, *Aphis craccivora, Aphis fabae, Aphis forbesi, Aphis gossypii, Aphis pomi, Aphis sambuci,* and *Aphis spiraecola* of *Aphis* spp.;
for example, *Rhopalosiphum maidis* and *Rhopalosiphum padi* of *Rhopalosiphum* spp.;
for example, *Dysaphis plantaginea* and *Dysaphis radicola* of *Dysaphis* spp.;
for example, *Macrosiphum avenae* and *Macrosiphum euphorbiae* of *Macrosiphum* spp.;
for example, *Myzus cerasi, Myzus persicae,* and *Myzus varians* of *Myzus* spp.; and
*Acyrthosiphon pisum, Aulacorthum solani, Brachycaudus helichrysi, Brevicoryne brassicae, Chaetosiphon fragaefolii, Hyalopterus pruni, Hyperomyzus lactucae, Lipaphis erysimi, Megoura viciae, Metopolophium dirhodum, Nasonovia ribis-nigri, Phorodon humuli, Schizaphis graminum, Sitobion avenae,* and *Toxoptera aurantii* of other spp.;
(3-D-d) insect pests of the family Coccidae, for example, *Ceroplastes ceriferus* and *Ceroplastes rubens* of *Ceroplastes* spp.;
(3-D-e) insect pests of the family Diaspididae, *Pseudaulacaspis pentagona* and *Pseudaulacaspis prunicola* of *Pseudaulacaspis* spp.;
for example, *Unaspis euonymi* and *Unaspis yanonensis* of *Unaspis* spp.; and
*Aonidiella aurantii, Comstockaspis perniciosa, Fiorinia theae,* and *Pseudaonidia paeoniae* of other spp.;
(3-D-f) insect pests of the family Margarodidae, for example, *Drosicha corpulenta* and *Icerya purchasi;*
(3-D-g) insect pests of the family Phylloxeridae, for example, *Viteus vitifolii;*
(3-D-h) insect pests of the family Pseudococcidae, for example, *Planococcus citri* and *Planococcus kuraunhiae* of *Planococcus* spp.; and
*Phenacoccus solani* and *Pseudococcus comstocki* of other spp.;
(3-D-i) insect pests of the family Psyllidae, for example, *Psylla mali* and *Psylla pyrisuga* of *Psylla* spp.; and *Diaphorina citri* of other spp.
(4) Insect pests of the order Coleoptera
(4-a) insect pests of the family Anobiidae, for example, *Lasioderma serricorne;*
(4-b) insect pests of the family Attelabidae, for example, *Byctiscus betulae* and *Rhynchites heros;*
(4-c) insect pests of the family Bostrichidae, for example, *Lyctus brunneus;*
(4-d) insect pests of the family Brentidae, for example, *Cylas formicarius;*
(4-e) insect pests of the family Buprestidae, for example, *Agrilus sinuatus;*
(4-f) insect pests of the family Cerambycidae, for example, *Anoplophora malasiaca, Monochamus alternatus, Psacothea hilaris,* and *Xylotrechus pyrrhoderus;*
(4-g) insect pests of the family Chrysomelidae, for example, *Bruchus pisorum* and *Bruchus rufimanus* of *Bruchus* spp.;
for example, *Diabrotica barberi, Diabrotica undecimpunctata,* and *Diabrotica virgifera* of *Diabrotica* spp.;
for example, *Phyllotreta nemorum* and *Phyllotreta striolata* of *Phyllotreta* spp.; and
*Aulacophora femoralis, Callosobruchus chinensis, Cassida nebulosa, Chaetocnema concinna, Leptinotarsa decemlineata, Oulema oryzae,* and *Psylliodes angusticollis* of other spp.;
(4-h) insect pests of the family Coccinellidae, for example, *Epilachna varivestis* and *Epilachna vigintioctopunctata* of *Epilachna* spp.;
(4-i) insect pests of the family Curculionidae, for example, *Anthonomus grandis* and *Anthonomus pomo-*

*rum* of *Anthonomus* spp.; for example, *Sitophilus granarius* and *Sitophilus zeamais* of *Sitophilus* spp.; and *Echinocnemus squameus, Euscepes postfasciatus, Hylobius abietis, Hypera postica, Lissohoptrus oryzophilus, Otiorhynchus sulcatus, Sitona lineatus,* and *Sphenophorus venatus* of other spp.;

(4-j) insect pests of the family Elateridae, for example, *Melanotus fortnumi* and *Melanotus tamsuyensis* of *Melanotus* spp.;

(4-k) insect pests of the family Nitidulidae, for example, *Epuraea domina;*

(4-l) insect pests of the family Scarabaeidae, for example, *Anomala cuprea* and *Anomala rufocuprea* of *Anomala* spp.; and *Cetonia aurata, Gametis jucunda, Heptophylla picea, Melolontha melolontha,* and *Popillia japonica* of other spp.;

(4-m) insect pests of the family Scolytidae, for example, *Ips typographus;*

(4-n) insect pests of the family Staphylinidae, for example, *Paederus fuscipes;*

(4-o) insect pests of the family Tenebrionidae, for example, *Tenebrio molitor* and *Tribolium castaneum;*

(4-p) insect pests of the family Trogossitidae, for example, *Tenebroides mauritanicus.*

(5) Insect pests of the order Diptera (5-A) the suborder Brachycera (5-A-a) insect pests of the family Agromyzidae, for example, *Liriomyza bryoniae, Liriomyza chinensis, Liriomyza sativae,* and *Liriomyza trifolii* of *Liriomyza* spp.; and

*Chromatomyia horticola* and *Agromyza oryzae* of other spp.;

(5-A-b) insect pests of the family Anthomyiidae, for example, *Delia platura* and *Delia radicum* of *Delia* spp.; and *Pegomya cunicularia* of other spp.;

(5-A-c) insect pests of the family Drosophilidae, for example, *Drosophila melanogaster* and *Drosophila suzukii* of *Drosophila* spp.;

(5-A-d) insect pests of the family Ephydridae, for example, *Hydrellia griseola;*

(5-A-e) insect pests of the family Psilidae, for example, *Psila rosae;*

(5-A-f) insect pests of the family Tephritidae, for example, *Bactrocera cucurbitae* and *Bactrocera dorsalis* of *Bactrocera* spp.;

for example, *Rhagoletis cerasi* and *Rhagoletis pomonella* of *Rhagoletis* spp.; and

*Ceratitis capitata* and *Dacus oleae* of other spp.

(5-B) the suborder Nematocera (5-B-a) insect pests of the family Cecidomyiidae, for example, *Asphondylia yushimai, Contarinia sorghicola, Mayetiola destructor,* and *Sitodiplosis mosellana.*

(6) Insect pests of the order Orthoptera (6-a) insect pests of the family Acrididae, for example, *Schistocerca americana* and *Schistocerca gregaria* of *Schistocerca* spp.; and

*Chortoicetes terminifera, Dociostaurus maroccanus, Locusta migratoria, Locustana pardalina, Nomadacris septemfasciata,* and *Oxya yezoensis* of other spp.;

(6-b) insect pests of the family Gryllidae, for example, *Acheta domestica* and *Teleogryllus emma;*

(6-c) insect pests of the family Gryllotalpidae, for example, *Gryllotalpa orientalis;*

(6-d) insect pests of the family Tettigoniidae, for example, *Tachycines asynamorus.*

(7) Acari (7-A) Acaridida of the order Astigmata (7-A-a) mites of the family Acaridae, for example, *Rhizoglyphus echinopus* and *Rhizoglyphus robini* of *Rhizoglyphus* spp.;

for example, *Tyrophagus neiswanderi, Tyrophagus perniciosus, Tyrophagus putrescentiae,* and *Tyrophagus similis* of *Tyrophagus* spp.; and

*Acarus siro, Aleuroglyphus ovatus,* and *Mycetoglyphus fungivorus* of other spp.;

(7-B) Actinedida of the order Prostigmata (7-B-a) mites of the family Tetranychidae, for example, *Bryobia praetiosa* and *Bryobia rubrioculus* of *Bryobia* spp.;

for example, *Eotetranychus asiaticus, Eotetranychus boreus, Eotetranychus celtis, Eotetranychus geniculatus, Eotetranychus kankitus, Eotetranychus pruni, Eotetranychus shii, Eotetranychus smithi, Eotetranychus suginamensis,* and *Eotetranychus uncatus* of *Eotetranychus* spp.;

for example, *Oligonychus hondoensis, Oligonychus ilicis, Oligonychus karamatus, Oligonychus mangiferus, Oligonychus orthius, Oligonychus perseae, Oligonychus pustulosus, Oligonychus shinkajii,* and *Oligonychus ununguis* of *Oligonychus* spp.;

for example, *Panonychus citri, Panonychus mori,* and *Panonychus ulmi* of *Panonychus* spp.;

for example, *Tetranychus cinnabarinus, Tetranychus evansi, Tetranychus kanzawai, Tetranychus ludeni, Tetranychus quercivorus, Tetranychus phaselus, Tetranychus urticae,* and *Tetranychus viennensis* of *Tetranychus* spp.;

for example, *Aponychus corpuzae* and *Aponychus firmianae* of *Aponychus* spp.;

for example, *Sasanychus akitanus* and *Sasanychus pusillus* of *Sasanychus* spp.;

for example, *Schizotetranychus celarius, Schizotetranychus longus, Schizotetranychus miscanthi, Schizotetranychus recki,* and *Schizotetranychus schizopus* of *Schizotetranychus* spp.; and

*Tetranychina harti, Tuckerella pavoniformis,* and *Yezonychus sapporensis* of other spp.;

(7-B-b) mites of the family Tenuipalpidae, for example, *Brevipalpus lewisi, Brevipalpus obovatus, Brevipalpus phoenicis, Brevipalpus russulus,* and *Brevipalpus californicus* of *Brevipalpus* spp.;

for example, *Tenuipalpus pacificus* and *Tenuipalpus zhizhilashviliae* of *Tenuipalpus* spp.; and

*Dolichotetranychus floridanus* of other spp.;

(7-B-c) mites of the family Eriophyidae, for example, *Aceria diospyri, Aceria ficus, Aceria japonica, Aceria kuko, Aceria paradianthi, Aceria tiyingi, Aceria tulipae,* and *Aceria zoysiea* of *Aceria* spp.;

for example, *Eriophyes chibaensis* and *Eriophyes emarginatae* of *Eriophyes* spp.;

for example, *Aculops lycopersici* and *Aculops pelekassi* of *Aculops* spp.;

for example, *Aculus fockeui* and *Aculus schlechtendali* of *Aculus* spp.; and

*Acaphylla theavagrans, Calacarus carinatus, Colomerus vitis, Calepitrimerus vitis, Epitrimerus pyri, Paraphytoptus kikus, Paracalacarus podocarpi,* and *Phyllocotruta citri* of other spp.;

(7-B-d) mites of the family Tarsonemidae, for example, *Tarsonemus bilobatus* and *Tarsonemus waitei* of *Tarsonemus* spp.; and

*Phytonemus pallidus* and *Polyphagotarsonemus latus* of other spp.;

(7-B-e) mites of the family Penthaleidae, for example, *Penthaleus erythrocephalus* and *Penthaleus major* of *Penthaleus* spp.

Ectoparasites which are objects to be controlled include ectoparasites which parasitize the backs, armpits, lower abdomens, inner thighs, or the like of host animals and live by obtaining nutrients such as blood or dandruff from the animals and ectoparasites which come flying to the backs, rumps, or the like of host animals and live by obtaining nutrients such as blood or dandruff from the animals. As the ectoparasite, for example, mites, lice, fleas, a mosquito, a stable fly, a flesh fly, or the like may be exemplified. Specific examples of the ectoparasite will be shown below.

(1) Acari
mites of the family Dermanyssidae, mites of the family Macronyssidae, mites of the family Laelapidae, mites of the family Varroidae, mites of the family Argasidae, mites of the family Ixodidae, mites of the family Psoroptidae, mites of the family Sarcoptidae, mites of the family Knemidokoptidae, mites of the family Demodixidae, and mites of the family Trombiculidae.

(2) The order Phthiraptera
lice of the family Haematopinidae, lice of the family Linognathidae, bird lice of the family Menoponidae, bird lice of the family Philopteridae, and bird lice of the family Trichodectidae.

(3) The order Siphonaptera
fleas of the family Pulicidae, for example, *Ctenocephalides canis* and *Ctenocephalides felis* of *Ctenocephalides* spp.;
fleas of the family Tungidae, fleas of the family Ceratophyllidae, and fleas of the family Leptopsyllidae.

(4) The order Hemiptera
insects of the family Cimicidae, insects of the family Reduviidae, and insects of the family Triatominae.

(5) Insect pests of the order Diptera
mosquitos of the family Culicidae, black flies of the family Simuliidae, biting midges of the family Ceratopogonidae, horseflies of the family Tabanidae, flies of the family Muscidae, tsetse flies of the family Glossinidae, flesh flies of the family Sarcophagidae, flies of the family Hippoboscidae, flies of the family Calliphoridae, and flies of the family Oestridae.

The present invention is additionally excellent in control effect on insect pests that have a stinger or venom and harm humans and animals, insect pests that mediate various pathogens or disease-causing microorganisms, or insect pests that cause discomfort to humans (toxic pests, sanitary insect pests, obnoxious pests, and the like).

Specific examples thereof will be shown below.
(1) Insect pests of the order Hymenoptera
bees of the family Argidae, bees of the family Cynipidae, bees of the family Diprionidae, ants of the family Formicidae, bees of the family Mutillidae, and bees of the family Vespidae.

(2) Other insect pests
Blattodea, termites, Araneae, centipedes, millipedes, crustacea, and *Cimex lectularius*.

Although some Formulation Examples of the chemical composition will be shown, additives and the added ratio should not be limited to these Examples, and may be varied widely. "Part" in the Formulation Examples represents "part by mass". The compound A is used as an active ingredient in the chemical composition A. The compound B is used as an active ingredient in the chemical composition B. The compound C is used as an active ingredient in the chemical composition C. The compound D is used as an active ingredient in the chemical composition D. The compound A and the compound B, and the compound C if needed are used as an active ingredient in the pest control agent composition of the present invention.

Formulation Examples for agriculture and horticulture will be shown.

Formulation Example 1 (Wettable Powder)

| | |
|---|---|
| Active ingredient | 40 parts |
| Diatomite | 53 parts |
| Higher alcohol sulfuric ester | 4 parts |
| Alkylnaphthalenesulfonic acid salt | 3 parts |

The above was uniformly mixed and fine pulverized to obtain a wettable powder containing 40% of the active ingredient.

Formulation Example 2 (Emulsion)

| | |
|---|---|
| Active ingredient | 30 parts |
| Xylene | 33 parts |
| Dimethylformamide | 30 parts |
| Polyoxyethylene alkyl aryl ether | 7 parts |

The above was mixed and dissolved to obtain an emulsion containing 30% of the active ingredient.

Formulation Example 3 (Flowable Agent)

| | |
|---|---|
| Active ingredient | 30 parts |
| Polyoxyethylene styryl phenyl ether | 4 parts |
| Alkylsulfosuccinic acid salt | 1 part |
| Alkylene glycol | 5 parts |
| Thickener | 20 parts |
| Water | Balance |

The above was mixed to obtain a flowable agent containing 30% of the active ingredient.

Formulation Example 4 (Flowable Agent)

| | |
|---|---|
| Active ingredient | 20 parts |
| Polyoxyethylene tristyryl phenyl ether | 2.5 parts |
| Polyoxyethylene polyoxypropylene alkyl ether | 0.5 parts |
| Thickener | 0.6 parts |
| Trimethylolpropane | 20 parts |
| Alkylene glycol | 5 parts |
| Water | Balance |

The above was mixed to obtain a flowable agent containing 20% of the active ingredient.

Formulation Examples for the prevention of epidemics and for animals will be shown.

Formulation Example 5 (Granules)

| | |
|---|---|
| Active ingredient | 5 parts |
| Kaolin | 94 parts |
| White carbon | 1 part |

The active ingredient is dissolved in an organic solvent and the solution is sprayed on the carrier, the solvent is then evaporated at reduced pressure. This type of granules may be mixed with feed for animals.

Formulation Example 6 (Infusion)

| Active ingredient | 0.1 to 1 part |
|---|---|
| Peanut oil | Balance |

After preparation, the mixture is sterile filtered with a sterilization filter.

Formulation Example 7 (Pour-on Agent)

| Active ingredient | 5 parts |
|---|---|
| Myristic ester | 10 parts |
| Isopropanol | Balance |

Formulation Example 8 (Spot-on Agent)

| Active ingredient | 10 to 15 parts |
|---|---|
| Palmitic ester | 10 parts |
| Isopropanol | Balance |

Formulation Example 9 (Spray-on Agent)

| Active ingredient | 1 part |
|---|---|
| Propylene glycol | 10 parts |
| Isopropanol | Balance |

Then, Production Example of a compound of formula (I) will be shown.

Production Example 1

Production of 2-{3-[3-bromo-5-(trifluoromethyl)phenoxy]-3-ethylureido}-2-methyl-N-(2,2,2-trifluoroethyl)propanamide (Compound of Formula (II))

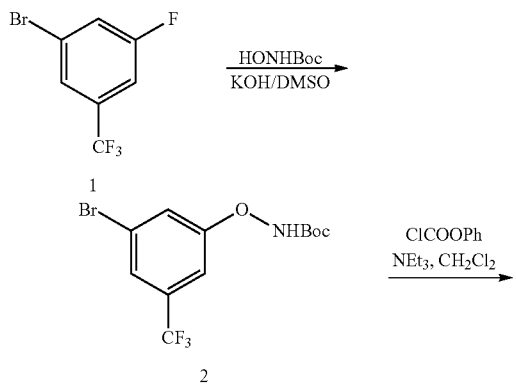
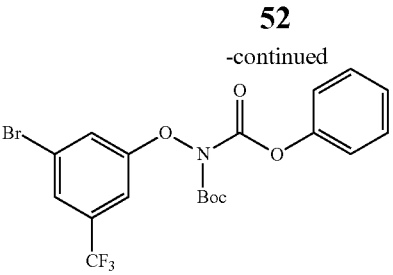

(Step 1) Synthesis of tert-butyl N-[3-bromo-5-(trifluoromethyl)phenoxy]carbamate (Compound 2)

First, 1-bromo-3-fluoro-5-(trifluoromethyl)benzene (50.0 g) and boc-hydroxylamine (32.9 g) were dissolved in DMSO (40 ml), potassium hydroxide (32.6 g) was added, and the mixture was stirred at room temperature for 5 hours. After the reaction, ammonium chloride water was added, followed by extraction with diethyl ether. Magnesium sulfate was added to the obtained organic layer for drying and filtered, and the solvent was then distilled off at reduced pressure to obtain a compound 2 (75.6 g).

¹H-NMR (CDCl₃/TMS, δ (ppm)) 7.58 (s, 1H), 7.47-7.46 (m, 1H), 7.43 (s, 1H), 7.30 (s, 1H), 1.51 (s, 9H).

(Step 2) Synthesis of phenyl N-{[3-bromo-5-(trifluoromethyl) phenoxy]carbamate (Compound 4)

The compound 2 (75.6 g) was dissolved in 824 ml of dichloromethane, and under ice cooling, triethylamine (31.3 g) was added, phenyl chloroformate (36.3 g) was added dropwise, and the mixture was stirred for 2 hours under ice cooling. After the reaction, ammonium chloride water was added, and the dichloromethane layer was separated. Magnesium sulfate was added to this for drying and filtered, the solvent was then distilled off at reduced pressure to obtain a compound 3.

¹H-NMR (CDCl₃/TMS, δ (ppm)) 7.53 (s, 1H), 7.45 (s, 1H), 7.44-7.36 (m, 2H), 7.28-7.25 (m, 2H), 7.14-7.12 (m, 2H), 1.52 (s, 9H).

Then, 160 ml of dichloromethane was added to the obtained compound 3, 79 ml of trifluoroacetic acid was added dropwise under ice cooling, and the mixture was stirred at room temperature for 4 hours. The reaction liquid was neutralized with a saturated aqueous sodium hydrogen carbonate solution, followed by extraction with ethyl acetate. Magnesium sulfate was added to the obtained organic layer for drying and filtered, and the solvent was then distilled off at reduced pressure. The precipitated crystal was washed with hexane to obtain a compound 4 (73.0 g, 3 step yield: 94%).

¹H-NMR (CDCl₃/TMS, δ (ppm)) 8.08 (s, 1H), 7.55-7.54 (m, 1H), 7.48 (s, 1H), 7.42-7.38 (m, 3H), 7.29-7.25 (m, 1H), 7.20-7.18 (m, 2H).

(Step 3) Synthesis of ethyl 2-{3-[3-bromo-5-(trifluoromethyl)phenoxy]ureido}-2-methylpropanoate (Compound 5)

Ethyl 2-amino-2-methylpropionate (6.10 g) was added to a solution of the compound 4 (16.9 g) in THF (100 ml), and the mixture was stirred for 7 hours at 60° C. After the reaction, the solvent was distilled off at reduced pressure. The obtained residue was purified by silica gel column chromatography to obtain a compound 5 (11.9 g, yield: 64%).

¹H-NMR (CDCl₃/TMS, δ (ppm)) 7.95 (s, 1H), 7.58 (s, 1H), 7.48 (s, 1H), 7.40 (s, 1H), 6.33 (s, 1H), 4.21 (q, 2H), 1.61 (s, 6H), 1.27 (t, 3H).

(Step 4) Synthesis of ethyl 2-{3-[3-bromo-5-(trifluoromethyl) phenoxy]-3-ethylureido}-2-methylpropanoate (Compound 6)

The compound 5 (11.9 g) was dissolved in DMF (92 ml), potassium carbonate (9.56 g) and iodoethane (4.49 g) were added, and the mixture was stirred for 5 hours under ice cooling. After the reaction, ammonium chloride water was added, followed by extraction with ethyl acetate, and the organic layer was dried over magnesium sulfate and filtered, the solvent was then distilled off at reduced pressure. The obtained residue was purified by silica gel column chromatography to obtain the title compound 6 (10.8 g, yield: 85%).

¹H-NMR (CDCl₃/TMS, δ (ppm)) 7.54 (s, 1H), 7.48 (s, 1H), 7.36 (s, 1H), 6.24 (s, 1H), 4.20 (q, 2H), 3.66 (d, 2H), 1.57 (s, 6H), 1.28 (t, 3H), 1.17 (t, 3H).

(Step 5) Synthesis of 2-{3-[3-bromo-5-(trifluoromethyl) phenoxy]-3-ethylureido}-2-methylpropanoic acid (Compound 7)

Lithium hydroxide monohydrate (1.93 g) was added to a solution of the compound 6 (15.6 g) in THF/methanol/water (85 ml/21 ml/21 ml), and the mixture was stirred for 10 hours. After the reaction, 7% HCl (24.0 g) was added, followed by extraction with ethyl acetate. Magnesium sulfate was added to the obtained organic layer for drying and filtered, and the solvent was then distilled off at reduced pressure. The precipitated crystal was washed with hexane to obtain a compound 7 (13.6 g, yield: 93%).

¹H-NMR (CDCl₃/TMS, δ (ppm)) 7.54-7.53 (m, 1H), 7.50 (s, 1H), 7.36 (dd, 1H), 6.05 (s, 1H), 3.67 (q, 2H), 1.60 (s, 6H), 1.17 (t, 3H).

(Step 6) Synthesis of 2-{3-[3-bromo-5-(trifluoromethyl)phenoxy]-3-ethylureido}-2-methyl-N-(2,2,2-trifluoroethyl)propanamide Diisopropylethylamine (0.88 g), trifluoroethylamine (0.26 g), and TBTU (0.87 g) were added to a solution of the compound 7 (0.70 g) in DMSO (8 ml), and the mixture was stirred at room temperature overnight. After the reaction, ammonium chloride water was added, followed by extraction with ethyl acetate, and the organic layer was dried over magnesium sulfate and filtered, and the solvent was then distilled off at reduced pressure. The obtained residue was purified by silica gel column chromatography to obtain the title compound of formula (II) (0.83 g, yield: 99%).

¹H-NMR (CDCl₃/TMS, δ (ppm)) 7.51 (s, 2H), 7.33 (s, 1H), 7.12 (t, 1H), 5.99 (s, 1H), 3.94 (dq, 2H), 3.67 (q, 2H), 1.57 (s, 6H), 1.17 (t, 3H).

Then, an effect when the controlling method of the present invention was implemented will be shown by the following Test Example.

Test Example 1

Test for Confirming Effect on *Tetranychus urticae*

Ten *Tetranychus urticae* female imagoes were inoculated on kidney bean leaves placed in each petri dish on the day before chemical solution treatment.

A flowable agent containing the compound A was diluted with water containing RABIDEN 3S diluted 5000 times to prepare chemical solutions A containing the compound A at twice concentrations described in Table 3, respectively.

A preparation containing the compound B or a flowable agent containing the compound B was diluted with water containing RABIDEN 3S diluted 5000 times to prepare chemical solutions B containing the compound B at twice concentrations described in Table 3, respectively.

{Preparations Used in Test Examples and Containing the Compound B}

Test numbers a and b: hexythiazox: Nissorun wettable powder (produced by Nippon Soda Co., Ltd.)

Test numbers c and d: abamectin: Agri-Mek (produced by Syngenta Japan K.K.)

Test numbers e and f: fenpyroximate: DANITRON flowable (produced by NIHON NOHYAKU CO., LTD.)

Test numbers g and h: acetamiprid: MOSPILAN water soluble powder (produced by Nippon Soda Co., Ltd.)

Test number i: propargite: Omite wettable powder (produced by NIHON NOHYAKU CO., LTD.)

A mixed solution obtained by mixing the chemical solution A and the chemical solution B in an equivalent amount was sprinkled on a petri dish containing kidney bean leaves on which *Tetranychus urticae* was inoculated at 2 mg per 1 cm² with a rotary sprinkling tower (AB mixture application plot).

The chemical solution A and the chemical solution B were twice diluted with the water containing RABIDEN 3S diluted 5000 times to obtain a chemical solution A' and a chemical solution B', respectively.

The chemical solution A' was sprinkled on another petri dish containing kidney bean leaves on which *Tetranychus urticae* was inoculated at 2 mg per 1 cm² with a rotatory sprinkling tower (A single application plot). The Chemical solution B' was sprinkled on another petri dish containing kidney bean leaves on which *Tetranychus urticae* was inoculated at 2 mg per 1 cm² with a rotatory sprinkling tower (B single application plot).

Then, the petri dishes on which the chemical solutions were sprinkled were placed in a thermostatic chamber at a temperature of 25° C. and a humidity of 60%. All the imagoes were removed after 3 days elapsed from the sprinkling. Then, the petri dishes from which the imagoes were removed were placed in a thermostatic chamber at a temperature of 25° C. and a humidity of 60%. When 10 days elapsed from the sprinkling, the survival numbers of the next generation were investigated, and the effectivenesses were calculated.

Effectiveness $(\%)=(Cn-Tn)/Cn\times 100$

Cn: Survival numbers of next generation in non-treatment plot after 10 days
Tn: Survival numbers of next generation in treatment plot after 10 days To show the degree of a synergistic effect, the "effectiveness expectation" was calculated based on the Colby method. When the effectiveness is higher than the "effectiveness expectation", it is determined that there is a synergistic effect.

Expectation of effectiveness $(\%)(E)=X+Y-XY/100$

X: measurement of effectiveness in B single application plot (%)
Y: measurement of effectiveness in A single application plot (%)

Table 3 shows the test results.

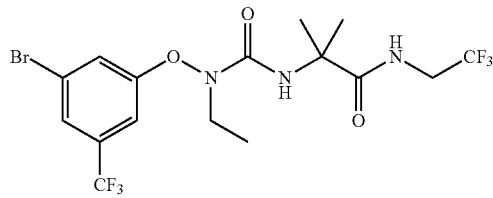

(II)

TABLE 3

| Test number | Chemical A | Chemical B | Effectiveness Found [%] | Expectation [%] |
|---|---|---|---|---|
| a | Compound (II) 4.7 ppm | | 74 | — |
| | | hexythiazox 1 ppm | 58 | — |
| | Compound (II) 4.7 ppm | hexythiazox 1 ppm | 99 | 89 |
| b | Compound (II) 2.3 ppm | | 52 | — |
| | | hexythiazox 1 ppm | 58 | — |
| | Compound (II) 2.3 ppm | hexythiazox 1 ppm | 95 | 80 |
| c | Compound (II) 4.7 ppm | | 74 | — |
| | | abamectin 0.07 ppm | 42 | — |
| | Compound (II) 4.7 ppm | abamectin 0.07 ppm | 91 | 85 |
| d | Compound (II) 2.3 ppm | | 52 | — |
| | | abamectin 0.07 ppm | 42 | — |
| | Compound (II) 2.3 ppm | abamectin 0.07 ppm | 82 | 72 |
| e | Compound (II) 4.7 ppm | | 74 | — |
| | | fenpyroximate 2.5 ppm | 67 | — |
| | Compound (II) 4.7 ppm | fenpyroximate 2.5 ppm | 98 | 91 |
| f | Compound (II) 2.3 ppm | | 52 | — |
| | | fenpyroximate 2.5 ppm | 67 | — |
| | Compound (II) 2.3 ppm | fenpyroximate 2.5 ppm | 90 | 84 |
| g | Compound (II) 4.7 ppm | | 74 | — |
| | | acetamiprid 100 ppm | 5 | — |
| | Compound (II) 4.7 ppm | acetamiprid 100 ppm | 87 | 75 |
| h | Compound (II) 2.3 ppm | | 52 | — |
| | | acetamiprid 100 ppm | 5 | — |
| | Compound (II) 2.3 ppm | acetamiprid 100 ppm | 83 | 54 |
| i | Compound (II) 2.3 ppm | | 52 | — |
| | | propargite 5 ppm | 24 | — |
| | Compound (II) 2.3 ppm | propargite 5 ppm | 78 | 66 |
| j | Compound (II) 2.3 ppm | | 52 | — |
| | | acynonapyr 0.4 ppm | 58 | — |
| | Compound (II) 2.3 ppm | acynonapyr 0.4 ppm | 83 | 66 |

As shown in the Test Example, a synergistic effect is exhibited by applying the compound A with the compound B to an object. The pest controlling method of the present invention and the pest control agent composition of the present invention enable controlling pests such as insects and mites more safely at a lower dosage.

The invention claimed is:
1. A pest controlling method, comprising applying to a subject at least one compound of formula (II):

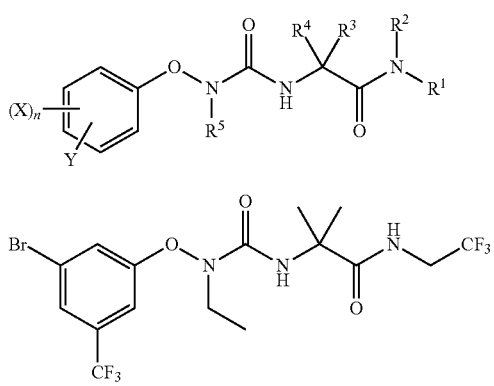

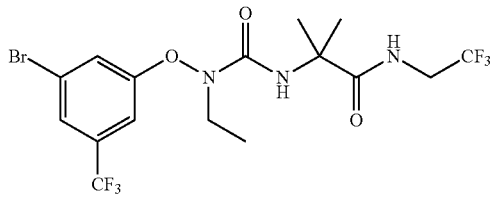

or a salt thereof,
with an insecticidal or acaricidal active component which is at least one of the following compounds: hexythiazox, abamectin, fenpyroximate, acetamiprid, propargite or acynonapyr.

2. The pest controlling method according to claim 1, wherein the pest is an insect or a mite.

3. A pest control agent composition, comprising:
at least one compound of formula (II):

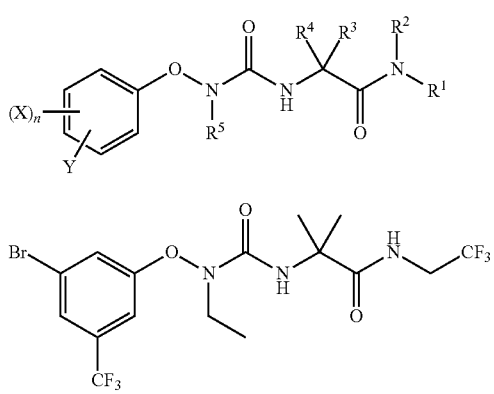

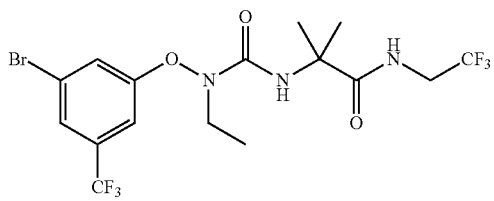

or a salt thereof; and
an insecticidal or acaricidal active component which is at least one of the following compounds: hexythiazox, abamectin, fenpyroximate, acetamiprid, propargite or acynonapyr.

4. The pest control agent composition according to claim 3, wherein the pest is an insect or a mite.

5. A pest control agent set, wherein the pest control agent set is produced by combining into a set at least one compound of formula (II):

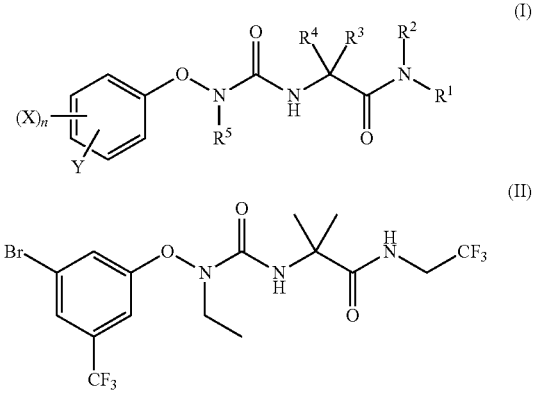

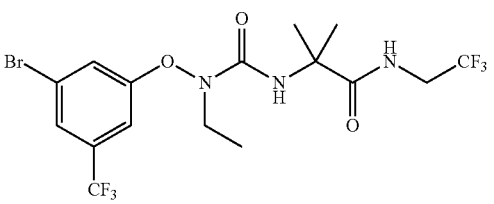

or a salt thereof,
and
a composition comprising an insecticidal or acaricidal active component which is at least one of the following compounds: hexythiazox, abamectin, fenpyroximate, acetamiprid, propargite or acynonapyr,
wherein the compound of formula (II) or the salt thereof and the composition comprising the insecticidal or acaricidal active component are not mixed together in the set.

6. The pest control agent set according to claim 5, wherein the pest control agent set has been produced by further adding into the set at least one item, which is a measuring cup, a measuring dropper, a mixing tank, gloves, a mask, or protective goggles.

7. A pest control agent set, wherein the pest control agent set has been produced by combining into a set the pest control agent composition according to claim 3 and at least one item, which is a measuring cup, a measuring dropper, a mixing tank, gloves, a mask, or protective goggles.

8. The pest control agent set according to claim 5, wherein the pests are insects or mites.

* * * * *